United States Patent
Jin et al.

(10) Patent No.: US 10,371,416 B2
(45) Date of Patent: Aug. 6, 2019

(54) SPECTRALLY SELECTIVE COATINGS FOR OPTICAL SURFACES

(71) Applicant: The Regents of the University of California, Oakland, CA (US)

(72) Inventors: Sungho Jin, San Diego, CA (US); Renkun Chen, San Diego, CA (US); Zhaowei Liu, San Diego, CA (US); Tae Kyoung Kim, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 163 days.

(21) Appl. No.: 14/398,722

(22) PCT Filed: May 6, 2013

(86) PCT No.: PCT/US2013/039783
§ 371 (c)(1),
(2) Date: Nov. 3, 2014

(87) PCT Pub. No.: WO2013/166521
PCT Pub. Date: Nov. 7, 2013

(65) Prior Publication Data
US 2015/0107582 A1    Apr. 23, 2015

Related U.S. Application Data

(60) Provisional application No. 61/659,383, filed on Jun. 13, 2012, provisional application No. 61/643,199, filed on May 4, 2012.

(51) Int. Cl.
*F24S 70/225*    (2018.01)
*F24S 70/30*    (2018.01)
(Continued)

(52) U.S. Cl.
CPC .......... *F24S 70/225* (2018.05); *B05D 5/06* (2013.01); *B82Y 20/00* (2013.01); *F24S 10/70* (2018.05);
(Continued)

(58) Field of Classification Search
None
See application file for complete search history.

(56) References Cited

U.S. PATENT DOCUMENTS 4,082,413 A * 4/1978 Austin ............... F24J 2/48
126/908
4,310,596 A * 1/1982 Van Buskirk ........ C09D 127/16
427/160
(Continued)

FOREIGN PATENT DOCUMENTS

WO    2010027753 A2    3/2010

OTHER PUBLICATIONS

Berkowitz, Ami, U.S. Appl. No. 61/546,550, Manufacturable Spark Erosion Apparatus for Nanoparticles, Method of Fabrication, and Articles Fabricated from Nanoparticles, filed Oct. 12, 2011.*
(Continued)

*Primary Examiner* — Stephone B Allen
*Assistant Examiner* — James McGee
(74) *Attorney, Agent, or Firm* — Perkins Coie LLP

(57) ABSTRACT

Techniques, systems, devices and materials are disclosed for spectrally selective coatings for optical surfaces having high solar absorptivity, low infrared emissivity, and strong durability at elevated temperatures. In one aspect, a spectrally selective coating includes a substrate formed of a light absorbing material, and a composite material formed over the substrate and including nanoparticles dispersed in a dielectric material, in which the composite material forms a coating capable of absorbing solar energy in a selected (Continued)

spectrum and reflecting the solar energy in another selected spectrum.

12 Claims, 25 Drawing Sheets

(51) Int. Cl.
    *F24S 70/25* (2018.01)
    *G02B 1/14* (2015.01)
    *G02B 1/118* (2015.01)
    *G02B 5/20* (2006.01)
    *G02B 5/22* (2006.01)
    *B05D 5/06* (2006.01)
    *G02B 1/00* (2006.01)
    *G02B 5/00* (2006.01)
    *B82Y 20/00* (2011.01)
    *F24S 70/60* (2018.01)
    *F24S 70/20* (2018.01)
    *F24S 20/20* (2018.01)
    *F24S 10/70* (2018.01)

(52) U.S. Cl.
    CPC .............. *F24S 20/20* (2018.05); *F24S 70/20* (2018.05); *F24S 70/25* (2018.05); *F24S 70/30* (2018.05); *F24S 70/60* (2018.05); *G02B 1/005* (2013.01); *G02B 1/118* (2013.01); *G02B 1/14* (2015.01); *G02B 5/003* (2013.01); *G02B 5/206* (2013.01); *G02B 5/207* (2013.01); *G02B 5/208* (2013.01); *G02B 5/22* (2013.01); *G02B 2207/101* (2013.01); *Y02E 10/44* (2013.01); *Y10T 428/2438* (2015.01); *Y10T 428/24372* (2015.01); *Y10T 428/24388* (2015.01); *Y10T 428/24413* (2015.01); *Y10T 428/24421* (2015.01); *Y10T 428/24893* (2015.01); *Y10T 428/24909* (2015.01)

(56) References Cited

U.S. PATENT DOCUMENTS

| | | | | |
|---|---|---|---|---|
| 6,783,653 | B2* | 8/2004 | Mahoney | C23C 28/00 205/191 |
| 8,129,211 | B2 | 3/2012 | Kim et al. | |
| 2006/0207647 | A1 | 9/2006 | Tsakalakos et al. | |
| 2009/0141343 | A1 | 6/2009 | Leard | |
| 2010/0258111 | A1* | 10/2010 | Shah | C23C 26/00 126/635 |
| 2010/0313875 | A1* | 12/2010 | Kennedy | F24S 10/45 126/652 |
| 2011/0203650 | A1 | 8/2011 | Furusawa | |
| 2012/0118723 | A1* | 5/2012 | Mao | B01J 21/063 204/157.52 |
| 2014/0291296 | A1* | 10/2014 | Jin | B23H 1/04 219/69.16 |

OTHER PUBLICATIONS

Allred, D. et al., "Spectrally Selective Surfaces by Chemical Vapor-Deposition", Sol Energ Mater, 1985, 12(2), pp. 87-129.
Andersson, et al., "Nickel Pigmented Anodic Aluminum-Oxide for Selective Absorption of Solar-Energy", J Appl Phys, 1980. 51(1): 754.
Arancibia-Bulnes, C.A. et al., "Solar absorptance and thermal emittance of cermets with large particles", J Phys D Appl Phys, 2000, 33(19): 2489.
Beerbaum, S. et al., "Solar thermal power generation in India—a techno-economic analysis", Renew Energ, 2000, 21(2), pp. 153-174.
Booth, D.C. et al., "Stabilized CVD Amorphous Silicon for High-Temperature Photothermal Solar-Energy Conversion", Sol Energ Mater, 1979, 2(1), pp. 107-124.
Carver, G.E., "CVD Molybdenum Thin-Films in Photothermal Solar Converters", Sol Energ Mater, 1979, 1(5-6), pp. 357-367.
Chou, X. et al., "Preparation and dielectric properties of B2O3—Li2O-doped BaZr0.35Ti0.65O3 ceramics sintered at a low temperature", Ceram Int, 2008, 34(4), pp. 911-915.
Deng, et al., "Recent advances in direct solar thermal power generation", J Renew Sustain Ener, 2009, 1(5), 052701.
Donnadieu, A. et al., "Optical Performance of Absorber-Reflector Combinations for Photothermal Solar-Energy Conversion", Journal of the Optical Society of America, 1978, 68(3), pp. 292-297.
Granqvist, C.G. et al., "Selective Absorption of Solar-Energy in Ultrafine Metal Particles—Model Calculations", J Appl Phys, 1979, 50(2), pp. 1058-1065.
He, C. et al., "Activity and Thermal Stability Improvements of Glucose Oxidase upon Adsorption on Core-Shell PMMA-BSA Nanoparticles", Langmuir, 2009, 25(23), pp. 13456-13460.
Herman, H. et al., "Thermal spray: Current status and future trends", Mrs Bull, 2000, 25(7), pp. 17-25.
Kar, S. et al., "Rapid Synthesis of Core/Shell ZnS:Mn/Si Nanotetrapods by a Catalyst-Free Thermal Evaporation Route", Acs Applied Materials & Interfaces, 2009, 1(7), pp. 1420-1426.
Karlsson, B. et al., "Materials for Solar-Transmitting Heat-Reflecting Coatings", Thin Solid Films, 1982, 90(4), pp. 409-410.
Karuppiah, N. et al., "Characterization of electrodeposited nickel-cobalt based selective black coatings: Scanning Electron Microscopic Studies", B Electrochem, 2002, pp. 295-298.
Kennedy, C.E., "Review of Mid- to High-Temperature Solar Selective Absorber Materials", NREL/TP-520-31267, in NREL Technical Report, 2002.
Kennedy, et al., "Progress in Development of High-temperautre Solar-Selective Coating", in 2005 International Solar Energy Conference. 2005. Orlando, Florida.
Kim, H.W. et al., "Characteristics of GaN-core/Au-shell heterenanowires: Effects of thermal annealing on the structural and photoluminescence properties", Vacuum, 2009, 84(1), pp. 254-257.
Kolb, G.J. et al. "Power Tower Technology Roadmap and Cost Reduction Plan", 2011, Sandia National Laboratories Report: SAND2011-2419.
Koltun, M. et al., "Stable Selective Coating Black Nickel for Solar Collector Surfaces", Sol Energ Mat Sol C, 1994, 33(1), pp. 41-44.
Kosugi, T. et al., "Economic evaluation of solar thermal hybrid H(2)O turbine power generation systems", Energy, 2003, 28(3), pp. 185-198.
Lira-Cantu, M. et al., "Electrochemical deposition of black nickel solar absorber coatings on stainless steel AISI316L for thermal solar cells", Sol Energ Mat Sol C, 2005, 87(1-4), pp. 685-694.
Ma, C. et al., "Extraordinary light focusing and Fourier transform properties of gradient-index metalenses", Phys Rev B, 2011, 84(19), p. 195142-1.
Martin, P.J. et al., "Spectrally Selective Pbs Films Produced by Ion-Beam Sputtering", Thin Solid Films, 1982, 87(3), pp. 203-206.
McDonald, G.E., "Spectral Reflectance Properties of Black Chrome for Use as a Solar Selective Coating", Sol Energy, 1975, 17(2), pp. 119-122.
Pak, P.S. et al., "A Hybrid Power-Generation System Utilizing Solar Thermal-Energy with Co2 Recovery Based on Oxygen Combustion Method", Energ Conyers Manage, 1995, 36(6-9), pp. 823-826.
Patel, S.N. et al., "Optimization and Thermal-Degradation Study of Black Nickel Solar Collector Coatings", Sol Energ Mater, 1985, 11(5-6), pp. 381-399.
Price, H. e al., "Advances in parabolic trough solar power technology", J Sol Energ-T Asme, 2002, 124(2), pp. 109-125.
Randich, E et al. "Chemically Vapor-Deposited ZrB2 as a Selective Solar-Absorber", Thin Solid Films, 1981, 83(4), pp. 393-398.
Schmidt, R.N. et al., "High-Temperature Space-Stable Selective Solar Absorber Coatings", Appl Optics, 1965, 4(8), pp. 917-925.
Seraphin, B.O., "Chemical Vapor-Deposition of Spectrally Selective Surfaces for High-Temperature Photothermal Conversion", Thin Solid Films, 1979, 57(2), pp. 293-297.

(56) References Cited

OTHER PUBLICATIONS

Smith, D.R. et al., "A Gradient index metamaterials", Phys Rey E, 2004, 71(3).
Teixeira, V. et al., "Spectrally selective composite coatings of Cr—Cr2O3 and Mo—Al2O3 for solar energy applications", Thin Solid Films, 2001, 392(2), pp. 320-326.
Thomas, L.K. et al., "Spectrally Selective Black Tungsten Films", Thin Solid Films, 1983, 105(3), pp. 203-211.
Thornton, J.A. et al., "Thermal-Stability Studies of Sputter-Deposited Multilayer Selective Absorber Coatings", Thin Solid Films, 1982, 96(2), pp. 175-183.
Tsoutsos, T. et al., "Technical and economical evaluation of solar thermal power generation", Renew Energ, 2003, 28(6), pp. 873-886.
Wang, C.Y. et al., "High-temperature properties of a low dielectric constant organic spin-on glass for multilevel interconnects", Appl Spectrosc, 2001, 55(10), pp. 1347-1351.
Yan, Q. et al., "Evaluation of solar aided thermal power generation with various power plants", Int J Energ Res, 2011, 35(10), pp. 909-922.
Zhang, X. et al., "Superlenses to overcome the diffraction limit", Nat Mater, 2008, 7(6), pp. 435-441.
Zhou, X. et al., "A Novel Solar Thermal Power Plant with Floating Chimney Stiffened onto a Mountainside and Potential of the Power Generation in China's Deserts", Heat Transfer Eng, 2009, 30(5), pp. 400-407.
International Search Report and Written Opinion, PCT Application No. PCT/US2013/039783, dated Sep. 25, 2013, 14 pages.
Wang, U., The Rise of Concentrating Solar Thermal Power Renewable Energy World: http://www.renewableenergyworld.com/rea/news/article/2011/06/the-rise-of-concentrating-solar-thermal-power.
Mar et al., "Low-Cost Coatings for Flat-Plate Solar Collectors", Thin Solid Films, 1976, vol. 39, pp. 95-103.
Orel, Z. et al., "Spectrally Selective Sno2-F Film on Glass and Black Enameled Steel Substrates—Spray Pyrolytical Deposition and Optical-Properties", Sol Energ Mat Sol C, 1992, vol. 26, pp. 105-116.
Price et al., "Developments in High-Temperature Parabolic Trough Receiver Technology", in Proceedings of the International Solar Energy Conference, 2004, Oregon.

\* cited by examiner

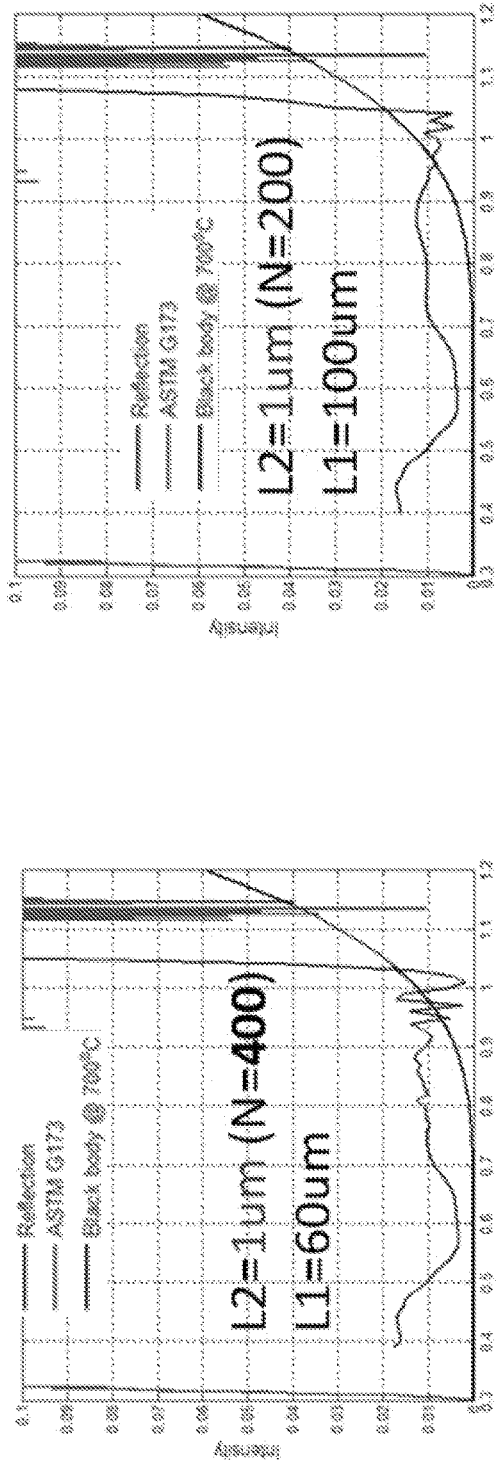
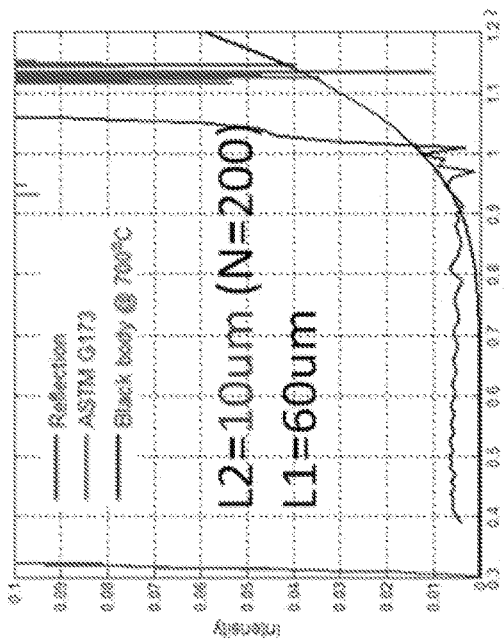
FIG. 1C
FIG. 1D
FIG. 1E

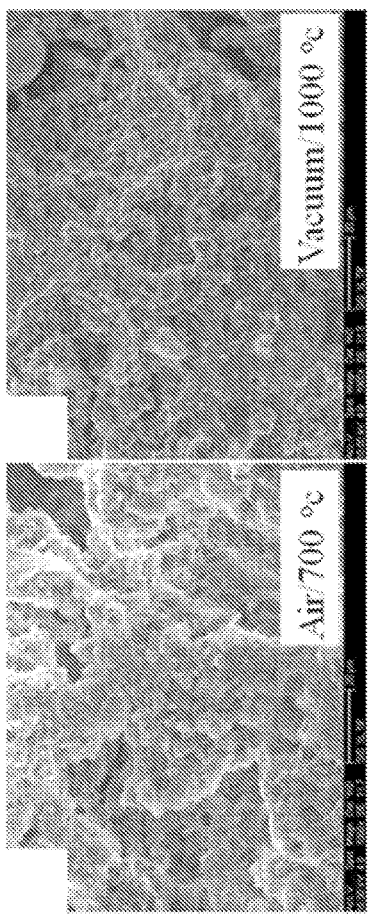
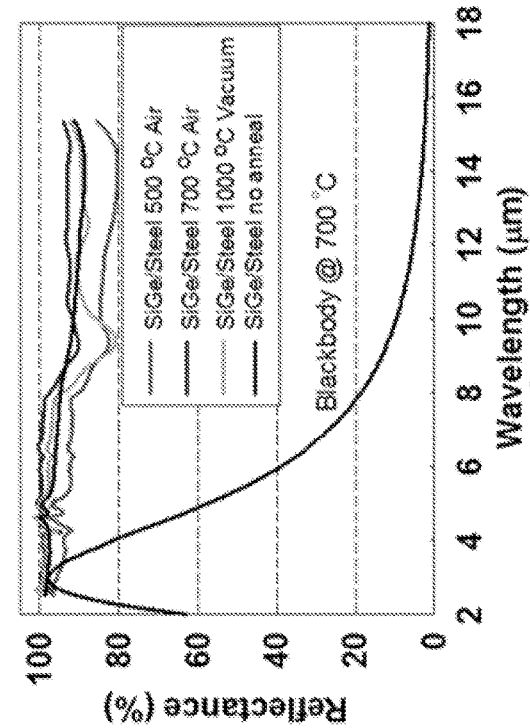
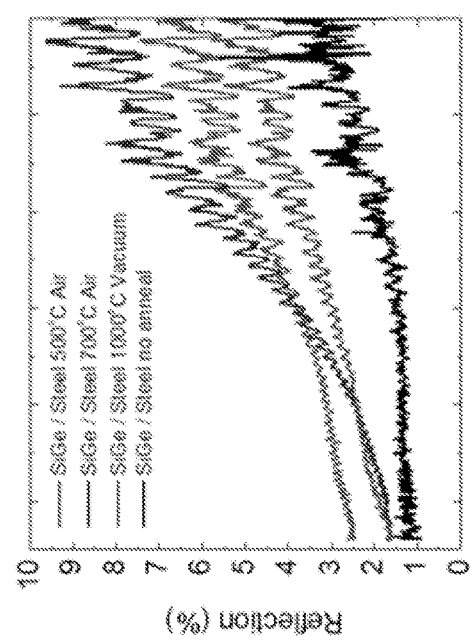
FIG. 13A  FIG. 13B  FIG. 13C  FIG. 13D  FIG. 13E

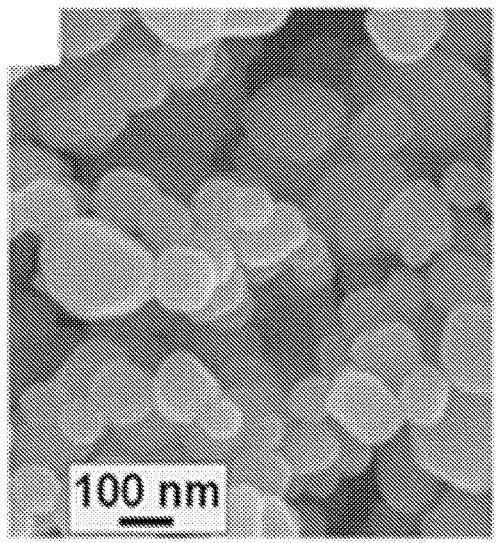
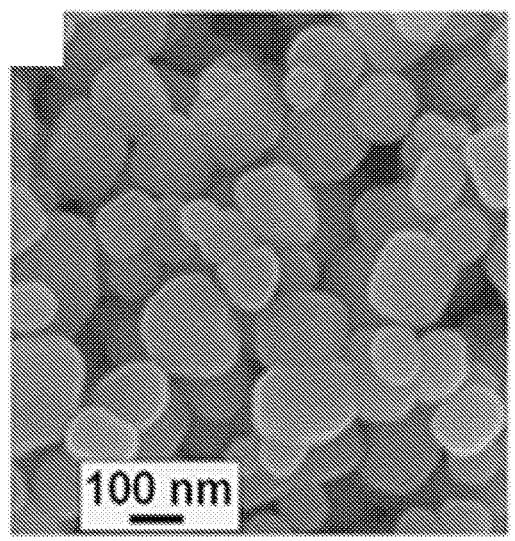
FIG. 14A  FIG. 14B
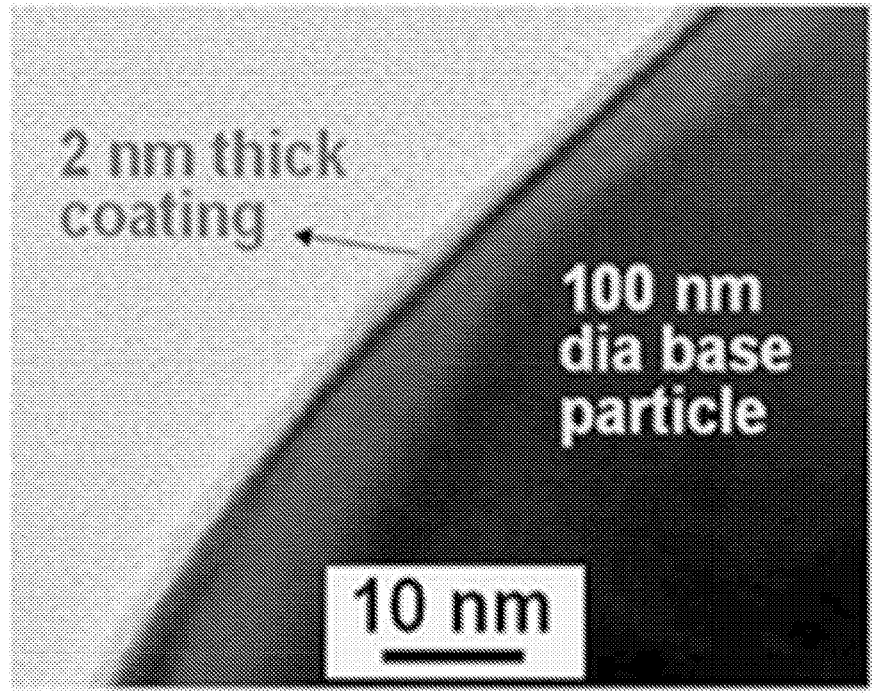
FIG. 14C

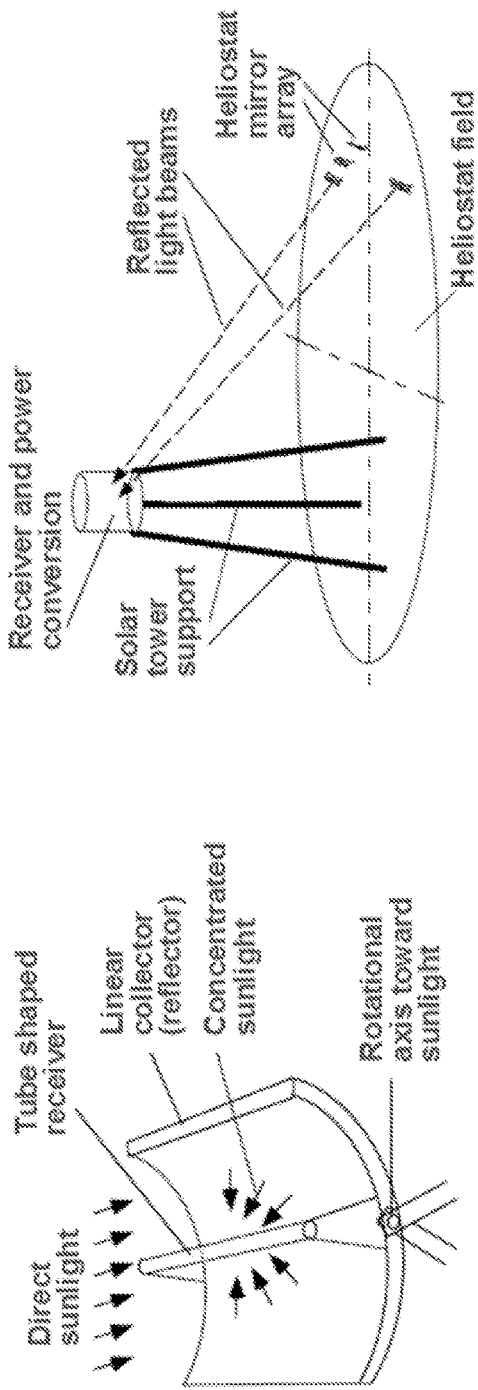
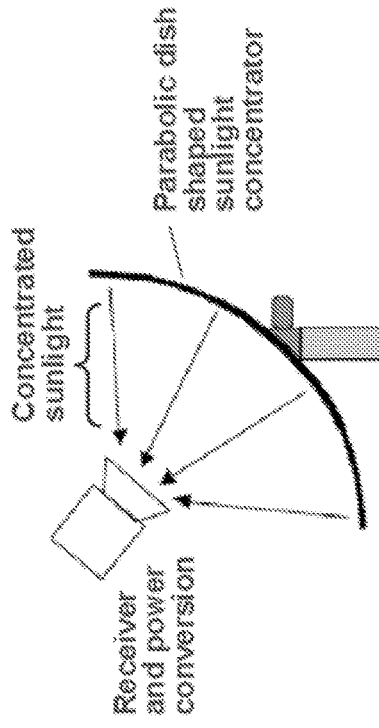
FIG. 26A
FIG. 26B
FIG. 26C

SPECTRALLY SELECTIVE COATINGS FOR OPTICAL SURFACES

CROSS REFERENCE TO RELATED APPLICATIONS

This patent document is a 35 USC § 371 National Stage application of International Application No. PCT/US2013/039783, filed on May 6, 2013, which claims the benefit of priority of both U.S. Provisional Patent Application No. 61/643,199, filed on May 4, 2012, and U.S. Provisional Patent Application No. 61/659,383, filed on Jun. 13, 2012. The entire contents of the before-mentioned patent applications are incorporated by reference as part of the disclosure of this document.

STATEMENT REGARDING FEDERALLY SPONSORED RESEARCH OR DEVELOPMENT

This invention was made with government support under grant DE-EE0005802 awarded by the Department of Energy (DOE). The government has certain rights in the invention.

TECHNICAL FIELD

This patent document relates to materials and coatings, including their applications for solar thermal technologies.

BACKGROUND

A photovoltaic device is an electrical device that converts the energy of light directly into electricity by the photovoltaic effect. Photovoltaic devices include photovoltaic cells that can generate and support an electric current when the cell is exposed to light, e.g., without electrical connection to an external voltage source. For example, when light such as sunlight is incident upon a material surface of the photovoltaic cell (e.g., a semiconductor material like silicon), the electrons present in the valence band of the material absorb the light energy, and thereby undergo an excitation by absorption of energy, causing a jump to the conduction band and becoming free electrons. The excited free electrons can diffuse, in which some can diffuse to a junction where they are accelerated into a different material, e.g., such as an electrical conductor, by a built-in potential. If electrical conductors are attached to the positive and negative sides, forming an electrical circuit, the electrons can be captured in the form of an electric current that can be used to power a load of the photovoltaic device.

Solar thermal energy (STE) systems and devices use solar energy to produce thermal energy (e.g., heat). STE systems and devices directly convert solar light energy to heat, rather than conversion to electricity as in photovoltaics. STE devices typically utilize solar energy much more efficiently than photovoltaics devices. Solar thermal energy systems can be classified as low-, medium-, or high-temperature systems based on the STE collectors used to convert solar energy to heat. Examples of low-temperature solar thermal energy systems include flat plate STE collectors used to heat swimming pools or provide space heating, in which the STE collectors use air or water as the medium to transfer the heat to their destination. Examples of medium-temperature solar thermal energy systems also include flat plate STE collectors, but can be used for heating water or air for larger residential and commercial use. High-temperature solar thermal energy systems include STE collectors that use mirrors or lenses to concentrate solar energy to produce heat energy to drive turbines or other mechanisms for electric power production.

SUMMARY

Techniques, systems, devices and materials are disclosed for implementing spectrally selective coatings for optical surfaces having high ultraviolet (UV) and visible light absorptivity and low infrared (IR) emissivity.

In one aspect of the disclosed technology, a spectrally selective coating includes a substrate formed of a light absorbing material, and a composite material formed over the substrate and including nanoparticles dispersed in a dielectric material, the composite material forming a coating capable of absorbing solar energy in a selected spectrum and reflecting the solar energy in another selected spectrum.

In another aspect, a method of fabricating a spectrally selective coating includes forming a nanoparticle-dispersed solution including nanoparticles contained within a solvent fluid including a dielectric material, depositing the nanoparticle-dispersed solution onto a surface of a light absorbing material, and drying or curing the nanoparticle-dispersed solution to form a coating having a particular spectral absorptivity and spectral emissivity, the coating formed of a composite material including the nanoparticles embedded in the dielectric material.

In another aspect, a spectrally selective coating includes a base layer including a composite material which includes particles configured as at least one of nanoparticles or microparticles dispersed in a dielectric material, the base layer capable of attaching to a substrate formed of a light absorbing material, and a surface layer of the composite material formed over the base layer and structured to form pillar structures extending outward, wherein the distribution of particles per volume in the dielectric material includes less particles in the surface layer than that of the base layer, in which the surface layer and base layer form a coating capable of absorbing solar energy in a selected spectrum including visible light and ultraviolet light and reflecting the solar energy in another selected spectrum including infrared energy.

In another aspect, a spectrally selective coating includes a base layer formed of a composite material including nanoparticles dispersed in a dielectric material, the base layer capable of attaching to a substrate formed of a light absorbing material, and a surface layer formed of the composite material over the base layer and structured to form pillar structures extending outward with a tapered diameter and having a height to thickness ratio of substantially 10 or larger, in which the surface layer and base layer form a coating capable of absorbing solar energy in a selected spectrum and reflecting the solar energy in another selected spectrum.

Implementations of the spectrally selective coating can optionally include one or more of the following features. For example, the selected spectrum can include visible light and ultraviolet light and the another selected spectrum can include infrared energy. For example, the pillar structures can be configured in an array to provide the surface layer with a substantially uniform surface roughness, or in other examples, the pillar structures can be randomly configured to provide the surface layer with a nonuniform surface roughness. For example, the pillar structures can be configured to extend outward in a range between 100 nm to 50 µm. In some implementations, the substrate formed of the light absorbing material can be a surface of a solar thermal energy collector device. For examples, the nanoparticles can be formed of a semiconductor material including at least one of silicon (Si), germanium (Ge), SiGe, silicon boride, metal silicides, PbTe, PbSe, or PbS; a metal including at least one of tungsten (W), chromium (Cr), nickel (Ni), or molybdenum (Mo); and/or a carbon material. In some implementations of the spectrally selective coating, for example, the nanoparticles can be configured to have a dimension in a range between 20 nm to 2 µm. For example, the dielectric material can be formed of a ceramic oxide or fluoride material including at least one of silicon oxide, aluminum oxide, cesium oxide, or magnesium fluoride. In some examples, the nanoparticles can be distributed uniformly in the pillar structures and in the base layer. In some implementations, for example, the spectrally selective coating can exhibit a solar absorptivity ($\alpha_{s,eff}$) of 0.95 or greater and an infrared emissivity ($\varepsilon_{IR,eff}$) of 0.1 or less. In some implementations of the spectrally selective coating, the nanoparticles can include a protective coating structured to provide resistance to oxidation of the nanoparticles, e.g., in which the protective coating includes silicon boride or borosilicate. For example, the nanoparticles can be configured in a core-shell geometry, for example, with a shell thickness in a range of 5-50 nm, and/or with the oxidation rate of the nanoparticles reduced by at least a factor of 3 based on the protective coating.

In another aspect, a method of fabricating a spectrally selective coating includes forming a nanoparticle-dispersed solution including nanoparticles contained within a solvent fluid including a dielectric material, depositing the nanoparticle-dispersed solution onto a surface of a light absorbing material, distributing the nanoparticles per volume in the dielectric material such that larger nanoparticles are in regions closer to the surface, and drying or curing the nanoparticle-dispersed solution to form a coating having a particular spectral absorptivity and spectral emissivity, the coating formed of a composite material including the nanoparticles embedded in the dielectric material.

In another aspect, a method of fabricating a spectrally selective coating includes forming a nanoparticle-dispersed solution including nanoparticles contained within a solvent fluid including a dielectric material, depositing a plurality of layers of the nanoparticle-dispersed solution onto a surface of a light absorbing material, in which the plurality of layers includes a distribution of the nanoparticles per volume in the dielectric material such that more nanoparticles are in the layers deposited closer to the surface, and drying or curing the nanoparticle-dispersed solution to form a coating having a particular spectral absorptivity and spectral emissivity, the coating formed of a composite material including the nanoparticles embedded in the dielectric material. In some implementations of the method, for example, the distribution can include larger nanoparticles distributed in layers closer to the surface.

In another aspect, a method of fabricating a spectrally selective coating includes forming a nanoparticle-dispersed solution including nanoparticles contained within a solvent fluid including a dielectric material, depositing the nanoparticle-dispersed solution onto a surface of a light absorbing material, forming pillar structures in the deposited nanoparticle-dispersed solution, and drying or curing the nanoparticle-dispersed solution to form a coating having a particular spectral absorptivity and spectral emissivity, the coating formed of a composite material including the nanoparticles embedded in the dielectric material. In some implementations of the method, for example, the pillar structures can be structured to include a base layer formed of the composite material and attached to the surface of the light absorbing material, and a surface layer over the base layer having the pillar structures extending outward, and in which the base layer is configured to exhibit a substantially isotropic or uniform effective permittivity of the composite material, and the surface layer can be configured to exhibit a nonuniform effective permittivity of the composite material providing a gradient to substantially balance the effective permittivities of air and the base layer to allow light absorption into the spectrally selective coating. In some implementations of the method, the forming the pillar structures can include imprinting a mould stamp on the deposited nanoparticle-dispersed solution on the surface, the mould stamp including an array of needles having one or both of microscale and nanoscale spacing, e.g., in which the array of needles can include a pre-coated Teflon layer or layer of an elastomeric material.

In another aspect, a method of fabricating a spectrally selective coating includes forming a nanoparticle-dispersed solution including nanoparticles contained within a solvent fluid including a dielectric material, depositing the nanoparticle-dispersed solution onto a surface of a light absorbing material, drying or curing the nanoparticle-dispersed solution to form a coating having a particular spectral absorptivity and spectral emissivity, the coating formed of a composite material including the nanoparticles embedded in the dielectric material, and etching at least a portion of the composite material to form pore structures in the coating. In some implementations of the method, for example, the etching can include chemical etching and/or plasma etching, the plasma etching including reactive ion etching.

In another aspect, a spectrally selective coating includes a base layer formed of a composite material including nanoparticles dispersed in a dielectric material, the base layer capable of attaching to a substrate formed of a light absorbing material, the nanoparticles formed of a bandgap-adjusted semiconductor material, and a surface layer of the composite material formed over the base layer and structured to form pillar structures extending outward, with a tapered diameter, in which the surface layer and base layer form a coating capable of absorbing solar energy in a selected spectrum and reflecting the solar energy in another selected spectrum. In some implementations of the spectrally selective coating, for example, the bandgap-adjusted semiconductor material can include at least one of a $\beta$—$SiB_3$ composition, $\beta$-$(Si_xGe_{1-x}B)_y$ composition where x is in a range of 0.05-0.50 and y is in a range of 2-8, and/or $(\beta\text{-}SiB_3)_x(\alpha\text{-}SiB_3)_{1-x}$ where x is in a range of 0.02-0.40. For example, the bandgap-adjusted semiconductor material can include one or both of transition metal oxide and transition metal ferrite, e.g., in which the transition metal ferrite can include Ni ferrite, Zn ferrite, Mn ferrite, Cu-ferrite, Ni—Zn ferrite, Mn—Zn ferrite, Ba-hexaferrite, and/or Sr-hexaferrite, and, for example, in which the transition metal oxide can include a cuprate based oxide compound including one or both of La—Ba—Cu—O and Y—Ba—Cu—O, and/or a manganite based oxide compound including at least one of La—Ca—Mn—O, La—Sr—Mn—O, La—Sr—Co—O, or La—Sr—Ni—O.

In another aspect, a spectrally selective coating includes a base layer formed of a composite material including nanoparticles dispersed in a dielectric material, the base layer capable of attaching to a substrate formed of a light absorbing material, the nanoparticles structured to include a particle core and an outer shell layer, and a surface layer of the composite material formed over the base layer and structured to form pillar structures extending outward, with a tapered diameter, in which the surface layer and base layer form a coating capable of absorbing solar energy in a selected spectrum and reflecting the solar energy in another selected spectrum. In some implementations of the spectrally selective coating, for example, the coating is capable of operating at a high temperature in a range of 450-1000° C. In some implementations of the spectrally selective coating, for example, the pillar structures are structured to have a height to thickness ratio of substantially 10 or larger. For example, the outer shell layer can be formed of a refractory ceramic material including at least one of an oxide, boride, fluoride, nitride, oxyboride, onynitride, and/or oxyfluoride. For example, the outer shell layer can be formed of a crystalline solid component, an intermetallic compound crystalline solid component, an amorphous phase component, and/or a mixture of one or more of these components. For example, the nanoparticles can include a borosilicate outer shell layer over a silicon-based particle core, with the outer shell layer including a mixture of amorphous and/or crystalline phases including crystalline Si-boride material having one of a $SiB_3$, $SiB_6$ or $SiB_n$ composition. For example, the particle core can include a refractory metal including at least one of Zr, Nb, Mo, Hf, Ta, W, and/or a transition metal including Ti, V, Cr, Mn, Fe, Co, Ni, or Cu or their alloys. For example, the outer shell layer can be formed over the particle core by soaking of the particle core in molten sodium borohydride salt and exposing the particle core to a high temperature under oxygen-containing atmosphere.

In another aspect, a method to fabricate Si—Si boride core-shell nanoparticles includes mixing Si or Si—Ge nanoparticles with alkaline boride salt particles (e.g., sodium boride salt particles) to form a mixed powder material, the mixing including mechanical grinding in a mortar with an inert gas (e.g., Argon) atmosphere, placing the mixed powder material in a quartz container in an inert gas (e.g., Argon) atmosphere, sealing the quartz container, heat-treating the sealed quartz container at a temperature in a range of 400-700° C. or greater for at least 0.1 days to synthesize the silicon boride shells on Si or Si—Ge nanoparticle surfaces, and dissolving residual alkaline boride to extract the synthesized Si—$SiB_n$ core-shell nanoparticles. In some implementations of the method, for example, the alkaline boride salt can include $NaBH_4$ or $KBHO_4$, e.g., in which the $NaBH_4$ particles can be configured to be 50-95 wt % in the mixture with the Si-containing nanoparticles. In some implementations of the method, for example, the sealing can include heating the quartz container with a torch flame. In some implementations, for example, the method can further include separating the synthesized Si—$SiB_n$ core-shell nanoparticles from the alkaline borohydride solution by centrifuging.

In another aspect, a spectrally selective coating includes a base layer formed of a composite material including nanoparticles dispersed in a dielectric material, the base layer capable of attaching to a substrate formed of a light absorbing material, the nanoparticles structured to include a particle core, a first shell layer over the particle core, and an outer shell layer over the first shell layer, in which the outer shell layer is formed of a ceramic material having a melting point equal or greater than 1500° C., and a surface layer of the composite material formed over the base layer and structured to form pillar structures extending outward, with a tapered diameter, in which the surface layer and base layer form a coating capable of absorbing solar energy in a selected spectrum and reflecting the solar energy in another selected spectrum. In some implementations of the spectrally selective coating, for example, the outer shell layer includes at least one of $ZrO_2$, CaO, MgO, $HfO_2$, TaN, or $ZrBr_2$. In some implementations, for example, the coating can be configured to operate at a high temperature in the range of 450-1000° C.

In another aspect, a method of fabricating a spectrally selective coating includes forming a nanoparticle-dispersed solution including nanoparticles contained within a solvent fluid including a dielectric material and toluene, depositing the nanoparticle-dispersed solution onto a surface of a light absorbing material, and drying or curing the nanoparticle-dispersed solution to form a coating having a particular spectral absorptivity and spectral emissivity, the coating formed of a composite material including the nanoparticles embedded in the dielectric material, in which the drying or curing forms pore structures in the coating based on the toluene in the solvent fluid, the toluene not present in the formed coating.

In another aspect, a method of fabricating and operating a concentrating solar power systems using a spectrally selective coating of the disclosed technology includes using a sunlight energy receiver formed by a nanoparticle-dispersed solution including oxidation resistant core-shell protected nanoparticles contained within a solvent fluid including a dielectric material, which was depositing and dried and/or cured on a surface of a light absorbing material, e.g., including a metallic substrate, such as in a heat transfer fluid carrying metal tubing to form a spectrally selective coating; providing concentrated sunlight onto the receiver with focusing mirror array to raise the temperature of the spectrally selective coating and the receiver structure; operating the spectrally selective coating at a high temperature in the range of 450-1,000° C., in which the spectrally selective coating exhibits a solar absorptivity of 0.95 or greater and an infrared emissivity of 0.10 or less, and in which the spectrally selective coating exhibits an oxidation resistance with an oxidation rate reduced at least by a factor of 3 by the presence of a protective shell over the nanoparticles core. In some implementations, for example, to reduce the IR emission loss, e.g., especially when the solar concentration ratio is less than 100, small-sized metal or semiconductor nanoparticles are configured as the nanoparticles, e.g., with the particle size being less than 500 nm, or in some examples less than 200 nm, or in some examples less than 100 nm. For example, the IR emission loss can be reduced by at least 30% with average size of the uncoated or core-shell nanoparticle size in the spectrally selective layer being less than 200 nm. In some implementations, for example, the metallic substrate can be selected from stainless steels or Ni base superalloys, and is shaped into a tube geometry to carry the exemplary heat transfer fluid. In some implementations, for example, the metallic substrate can be can be pre-patterned by etching formation of periodic or random grooves, pits, pores, or by an additive process of plasma spray deposition, spark welding attachment or electrochemical deposition to add protruding lines, islands or short pillars for enhanced adhesion of the spectrally selective coating layer, e.g., with the lateral dimension of the patters on the metallic substrate surface selected to be substantially larger than the blackbody radiation wavelength regime, in the preferred dimensions of 20 to 500 μm.

The subject matter described in this patent document can be implemented in specific ways that provide one or more of the following features. For example, the exemplary high-performance spectrally selective coatings (SSCs) can be produced at low cost and perform with high temperature durability. For example, the exemplary SSCs can be implemented to provide exceptionally high solar absorbance (e.g., as high as 99%) in the high ultraviolet and visible (UV-Vis) sunlight solar spectrum range and low thermal emittance (e.g., <4%) at long wavelength. In some implementations, for example, the bandgap of the semiconductor nanoparticles are adjusted by alloying, e.g., such as Ge doping into Si semiconductor so as to alter the bandgap wavelength (cut-off wavelength). The engineered semiconductor bandgap of the nanoparticles leads to a more efficient use of sunlight energy. For example, the disclosed SSC technology can be implemented in solar thermal energy technology, e.g., in solar thermal energy conversion system, such as concentrated solar power (CSP) systems and solar water heating systems, and including flat plate solar collector for hot water and concentrated solar collectors for solar-thermal electricity generation. Other possible applications of the disclosed technology include different types of CSPs such as based on moving or falling particles instead of oil-type heat transfer fluid, heat engines such as Sterling engines operating by cyclic compression and expansion of air or other gas at different temperature levels to produce a net conversion of heat energy to mechanical energy. For example, the disclosed SSCs can be applied to the solar collector used in solar hot water panels, e.g., in which the absorption to the sunlight is maximized while the heat loss due to radiation is minimized, leading to higher system efficiency and lower system cost. For example, the disclosed SSCs can also be applied to the receiver of concentrated solar power systems for steam or supercritical gas generation to activate turbines for electricity generation. For example, exemplary high performance SSCs of the disclosed technology can enable higher temperature of heat transfer fluid used in solar power systems, thereby improving the overall system efficiency and lowering the lost. For example, the disclosed SSCs can also be used for enhanced thermal energy storage devices to more fully utilize concentrated solar heat to raise the temperature of a fluid such as oil, molten salt, molten metal, or other molten chemical compounds. Such improved thermal energy storage (TES) systems can later be utilized to generate the electricity (e.g., steam turbine generator) even without the sunlight, e.g., at night, or can be utilized as a means for heating of housing or building. The TES can be useful as low-cost energy storage devices, much cheaper than the currently widely used batteries. For example, the disclosed SSCs can also be used in tandem with thermoelectric generator to capture more heat from sunlight and then convert it into electricity by thermoelectric effect.

These and other aspects and their implementations and applications are described in greater detail in the drawings, the description and the claims.

BRIEF DESCRIPTION OF THE DRAWINGS

FIGS. 1C-1E show plots presenting exemplary calculated reflection spectra data of different thicknesses of the layers in an exemplary SSC of the disclosed technology.

FIGS. 13A-13E show images, data plots and tables of properties of exemplary annealed SiGe particles.

FIGS. 14A-14C show SEM and TEM images of an exemplary protective coating.

FIGS. 26A-26C show three exemplary solar concentrating/collecting systems that can employ the disclosed SSC technology.

Like reference symbols and designations in the various drawings indicate like elements.

DETAILED DESCRIPTION

Figure 1A:
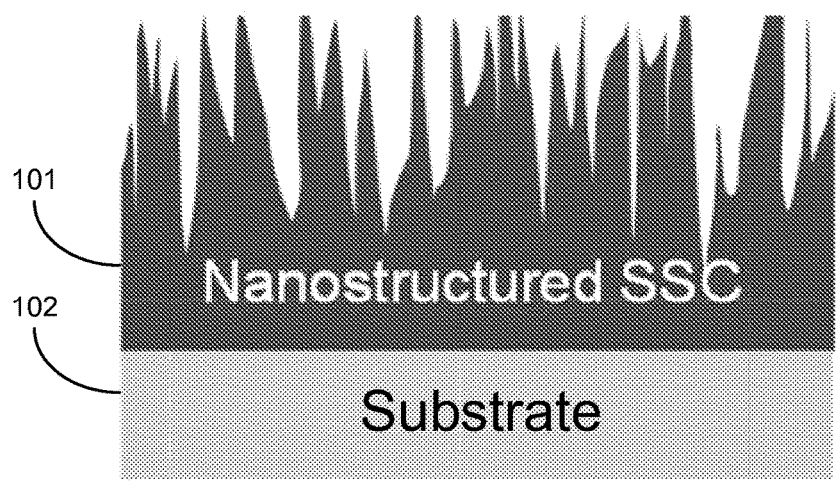
FIGS. 1A and 1B show diagrams of a material having an exemplary spectrally selective coating (SSC) of the disclosed technology.

Concentrated solar power (CSP) systems, solar thermal energy storage (TES) systems, solar thermal heat engines and hot water systems, thermoelectric power generator systems, and other solar thermal devices and systems convert sunlight (e.g., including concentrated sunlight) to thermal energy (e.g., heat) by using solar absorbers. For example, for efficient operation, the solar absorber has to effectively absorb the solar energy by absorbing most of the sunlight spectrum light from UV to visible to near the IR range without emitting much of its own blackbody radiation in the infrared regime. As most materials do not possess such features naturally, a spectrally selective coating (SSC) can be required. A spectral selective coating has its absorptivity and reflectivity to light depending on the wavelength of the light. For example, an SSC can be configured to have high absorptivity in the solar spectrum (e.g., ultraviolet and visible range) and low emissivity or high reflectivity in the infrared range. As such, SSC can absorb the energy from the sunlight without losing much energy through its own IR emission.

Ideal SSCs would possess certain desired characteristics. (a) For example, an ideal SSC would exhibit high spectral absorption $\alpha_s$ (e.g., >0.95) in the solar spectrum (e.g., 0.3-1.5 μm). (b) For example, the ideal SSC would exhibit low spectral emissivity $\varepsilon_{IR}$ in the IR spectrum (e.g., >1.5-2 μm) corresponding to the blackbody radiation of the surface temperature of solar receivers. (c) For example, the ideal SSC would also possess excellent durability at elevated temperatures (e.g., such as 500° C. and higher temperatures, or at least 600° C. to even higher temperatures), e.g., including in air and with humidity. (d) For example, the ideal SSC would have a low cost, e.g., by including inexpensive starting materials and by allowing scalable coating processes to CSP, TES, etc. systems and devices.

In some applications, to achieve a higher Carnot efficiency of a thermoelectric power generation system, desirable temperatures of the heat transfer fluid (HTF) of the system can include temperatures in a range of 650° C. or higher. An SSC of a solar absorber incorporated in the thermoelectric power generation system should be capable of operating at temperatures higher than HTF temperature. Also, the performance of the SSC should not degrade significantly during the lifetime of a solar thermal system, e.g., even under continuous exposure and/or cycling of such high temperatures. Even for solar absorbers placed inside an evacuated enclosure, for example, high temperature stability in air is still a very important metric because degradation of the SSC could occur when the vacuum fails, or when the device is stored or shipped before reaching a vacuum-protected environment, or during repair period when the vacuum is shut down. In addition, for example, the SSC and its adhesion to the substrate must have excellent thermal cyclability (e.g., capable to withstand more than 10,000 thermal cycles in ranging, for example, from <200° C. to >650° C.), which can be due to the intermittent nature of solar irradiation and associated daytime vs. night time cycling.

For example, an ideal SSC material that possesses all the aforementioned metrics would not only directly reduce the initial and operation and maintenance cost of solar receivers, but also enable higher operating temperature of the power cycles, which means higher thermal-electricity conversion efficiency and lower overall system cost. Therefore, the SSC has a significant impact on the performance/cost of the CSP technology, and is recognized as one of the potential opportunities for levelized cost of energy cost reduction in the roadmap for CSP power tower technology.

The optical performance of an SSC can be characterized by the ratio of solar absorptivity and IR emissivity, e.g., $\alpha/\varepsilon(T_a)$, which directly dictates the efficiency of solar receivers:

$$\eta_{th} = 1 - \frac{Q_{loss}}{Q_{in}} = 1 - \frac{\varepsilon_{IR,eff}\sigma(T_R^4 - T_0^4) + h_{con}(T_R - T_0)}{\sigma_{S,eff}CI} \quad (1)$$

where the effective IR emissivity ($\varepsilon_{IR,eff}$) is defined as:

$$\varepsilon_{IR,eff} = \frac{\int_0^\infty \varepsilon(\lambda)[I_\lambda(T_R, \lambda) - I_\lambda(T_0, \lambda)]\,d\lambda}{\int_0^\infty [I_\lambda(T_R, \lambda) - I_\lambda(T_0, \lambda)]\,d\lambda} \quad (2)$$

and the effective solar absorptivity ($\alpha_{s,eff}$) is determined by:

$$\alpha_{s,eff} = \int_0^\infty \alpha(\lambda) C \cdot I_S(\lambda)\,d\lambda \Big/ \int_0^\infty C \cdot I_S(\lambda)\,d\lambda \int_0^\infty \alpha(\lambda) I_S(\lambda)\,d\lambda / \int_0^\infty I_S(\lambda)\,d\lambda \quad (3)$$

where $Q_{loss}$ and $Q_{in}$ are heat loss (by radiative, conductive and convective heat transfer) and heat input (concentrated solar flux), C is the solar concentration ratio, I is the solar insolation, $I_s(\lambda)$ and $I_\lambda(T,\lambda)$ are spectral intensities of solar insolation and (Planck distribution) blackbody radiation at T. $T_R$ and $T_0$ are temperatures of the receiver and ambient respectively. $\alpha(\lambda)$ and $\varepsilon(\lambda)$ are spectral absorptivity and emittance of the SSC, respectively. $h_{con}$ represents the heat transfer coefficient due to convective and conductive heat loss, which is negligible when the receiver is placed in an evacuated enclosure.

For example, common high temperature SSC materials currently employed can be categorized into various schemes or classes, including intrinsic selective materials, semiconductor-metal tandems, multilayer absorbers, metal-dielectric composite coatings, and textured surfaces. Properties of these materials are further explained below.

(1) Intrinsic selective materials: materials with proper intrinsic selectivity, usually in the form of thin films, such as Si doped with C and B, W, $ZrB_2$ ($\alpha/\varepsilon(500°$ C.)=0.77/0.09), $SnO_2$ doped with F ($\alpha/\varepsilon(RT)$~0.85/0.15). These exemplary materials can be optically less effective, but structurally more stable.

(2) Semiconductor-metal tandems: semiconductors with proper bandgaps ($E_g$~0.5 eV/2.5 μm-1.26 eV/1.0 mm) that absorb solar radiation, in tandem with underlying metal that provides high IR emittance. Semiconductors under investigation include, for example, Si (1.1 eV, $\alpha/\varepsilon(500°$ C.)=0.89/

0.0545), Ge (0.7 eV), PbS (0.4 eV), etc. While these structures possess desirable optical selectivity, their main drawback includes the need for an antireflection coating, oxidation of semiconductors at elevated temperature, and an non-scalable process for making the semiconductor thin films (e.g., such as chemical vapor deposition (CVD) or vacuum sputtering).

(3) Multilayer absorbers: multilayer stacks of metal and dielectrics that use the interference effect to achieve high selectivity. These exemplary multilayer coatings can include semitransparent metal films, e.g., between nominally one quarter-wave thick dielectric spacer layers. Computer modeling of the optical performance of such stacks is well understood; hence an optimum design can be achieved relatively easily. Several exemplary multilayer absorbers using different metals (e.g., Mo, Ag, Cu, Ni) and dielectric layers (e.g., $Al_2O_3$, $SiO_2$, $CeO_2$, $MgF_2$) have been investigated in the past for high-temperature applications. The main drawback of this type of structure is the high cost of the multi-stack fabrication process, such as sputtering and CVD. High temperature stability is also a concern for the multilayer stacks due to the inter-layer diffusion.

(4) Metal-dielectric composite coatings: a highly absorbing coating in the solar region that is transparent in the IR, deposited onto a highly IR-reflective metal substrate. This is similar to the semiconductor-metal tandem architecture but it uses a cermet of fine metal particles in a dielectric matrix to achieve the 'black' absorbing layer, e.g., such as Ni pigmented anodic alumina ($\alpha$~0.93-0.96 and $\varepsilon$~0.10-0.20), Cr—$Cr_2O_3$ and Mo—$Al_2O_3$ cermet coatings ($\alpha$~0.88-0.94 and $\varepsilon$~0.04-0.15). For example, the commercial Solel Universal Vacuum (UVAC) coating is also based on cermet containing $Al_2O_3$, which possesses $\alpha/\varepsilon(350-400°$ C.)=0.95-0.96/0.091-0.15. The absorption and scattering cutoff wavelength depends on the coating thickness, constituent metal particles and their sizes. This dependence has been studied numerically. Therefore, this design offers a very high degree of flexibility by tuning the particle and matrix constituents, particle size and concentration, coating thickness etc. Inherently high temperature materials can be used for the cermet.

(5) Textured surfaces, such as porous structures and nanowires, can achieve the spectral selectivity by optical trapping of solar energy. The emittance can be adjusted with respect to light wavelength by modifying the microstructures of the coating. Some of the promising materials in this category are black chrome and black nickel ($\alpha/\varepsilon(100°$ C.)=0.95/0.10) and black nickel-cobalt which has excellent optical performance to date ($\alpha$>=0.95 and $\varepsilon(100°$ C.)~0.10). Common fabrication methods include electrodeposition, sol-gel, and chemical etching, etc., which have the advantages of low cost and high scalability potential. However, the highly textured metal surfaces tend to degrade quickly at elevated temperature. An interesting class materials are black W and Mo, which show reasonably good optical performance ($\alpha/\varepsilon(100°$ C.)~0.9/0.1) and have very high melting points. However, W and Mo have very poor oxidation resistance, so they need to be coated with an oxidation resistant layer. Another possible route is paint coating which are potentially the lowest cost fabrication method. However, the coating process often uses polymeric binding, which is only suitable for low temperature flat plate solar collectors, not for CSP.

Despite the several decade-long, extensive search for the optimal materials for solar thermal selective coatings, it remains difficult for material properties based on these various schemes to provide desired traits of an ideal SSC material, e.g., one that possesses ultra-high optical and thermal performance, low cost, and high temperature durability. As shown in Table 1, for example, the existing SSC surfaces usually possess a high solar absorptivity but without a very low IR emissivity (<5%). Additionally, most of the existing SSC materials are subjected to oxidation and degradation when operated in air at high temperature, and their thermal cycling capability is typically unsatisfactory. Furthermore, most of the existing SSC involve expensive material costs and less- or non-scalable fabrication processes, e.g., such as vacuum sputtering and/or CVD. Table 1 displays the exemplary properties of several representative existing SSC technologies in the upper rows and exemplary properties of an exemplary SSC material of the disclosed technology in the bottom row.

TABLE 1

Solar absorber materials

| Category | Example | Solar Absorptance | IR Emittance | Oxidation Resistance | Methods |
| --- | --- | --- | --- | --- | --- |
| Intrinsic selective material | $SnO_2$ | 0.85 | 0.15 | No | Bulk |
| Semiconductor-metal tandems | Si on Steel | 0.89 | 0.05 | No | Sputtering/CVD |
| Multilayer absorbers | Ag/$Al_2O_3$ multilayer | 0.95 | 0.1 | No | CVD |
| Metal-dielectric composite | Ni in $Al_2O_3$ (UVAC ®) | 0.95 | 0.1 | No | Deposition |
| Textured surface | Black W | 0.95 | 0.1 | No | Deposition |
| Nanoparticles-in-dielectric-matrix on steel | | ≥0.97 | ≤0.04 | Yes | Spray coating (inexpensive) |

Disclosed are techniques, systems, devices and materials for fabricating and implementing spectrally selective coatings for optical surfaces with high ultraviolet and visible (UV-Vis) light absorptivity, low IR emissivity, and high temperature durability. Various spectrally selective coating compositions, layer structures, nanocomposite structures, and fabrication methods are also described.

The disclosed spectrally selective coatings can provide ultra-high optical performance and be produced using highly-scalable fabrication processes. For example, the disclosed SSCs can exhibit the combined features of ultra-high solar absorptivity, low IR emissivity, low materials and fabrication costs, and high temperature durability. The disclosed SSCs can be applied to a solar thermal energy collector, e.g., such as those used in TES systems, solar hot water systems, CSP systems for electricity generation, and thermoelectric power generator systems, among other solar thermal energy systems, to capture heat from sunlight for conversion into heat, which can be converted to electricity.

In one aspect, a spectrally selective coating includes a substrate formed of a light absorbing material, and a composite material formed over the substrate and including nanoparticles dispersed in a dielectric material, in which the composite material forms a coating capable of absorbing solar energy in a selected spectrum and reflecting the solar energy in another selected spectrum.

For example, in some implementations, the spectrally selective coating can include a base layer formed of a composite material including nanoparticles dispersed in a dielectric material, the base layer capable of attaching to a substrate formed of a light absorbing material, and a surface layer of the composite material formed over the base layer and structured to form pillar structures extending outward, in which the distribution of nanoparticles per volume in the dielectric material includes less nanoparticles in the surface layer than that of the base layer, and in which the surface layer and base layer form a coating capable of absorbing solar energy in the visible light and ultraviolet spectrum and reflecting the solar energy in the infrared spectrum.

Figure 1B:
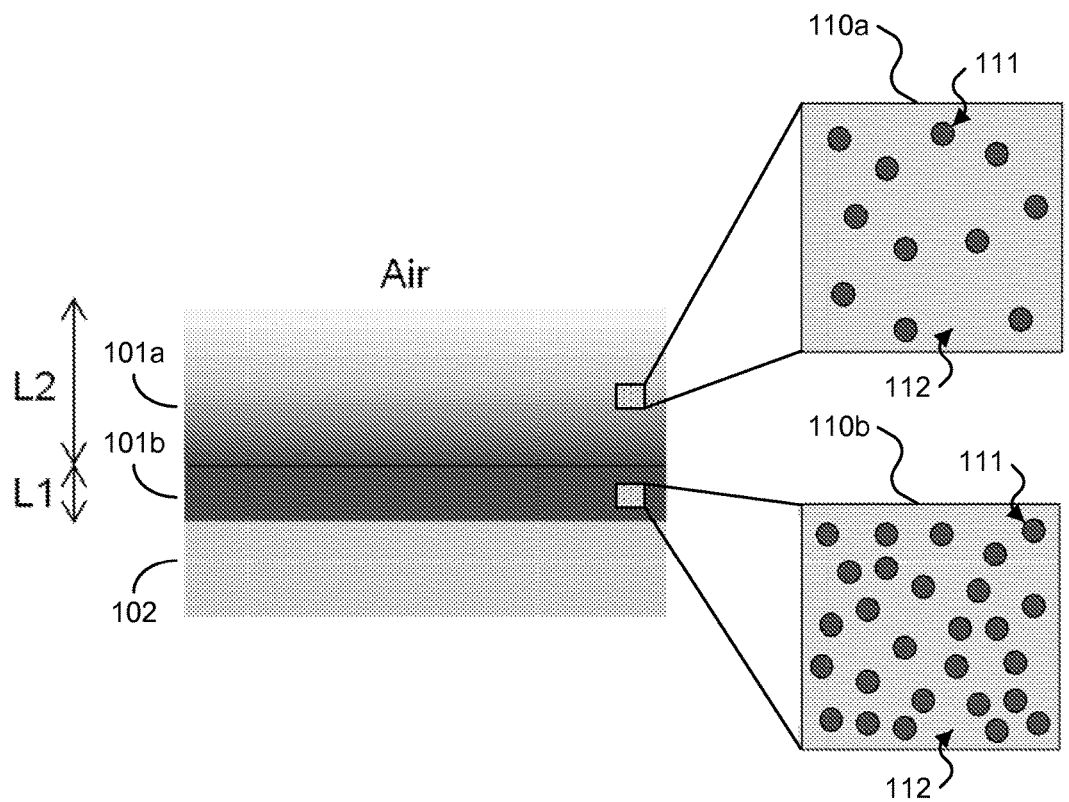

FIGS. 1A and 1B show diagrams of a material having an exemplary spectrally selective coating. The diagram in FIG. 1A illustrates a spectrally selective coating 101 attached to a substrate 102 of a light absorbing material, e.g., such as a solar thermal energy collector device. The spectrally selective coating 101, as illustrated here, includes pillar-like structures protruding outward toward the outer environment from a lower region of the spectrally selective coating 101.

FIG. 1B shows the spectrally selective coating 101 including a base layer 101b and a surface layer 101a exposed to air or the other fluid in the surrounding environment. The base layer 101b is configured of a composite material including nanoparticles dispersed in dielectric material, in which the composite material is configured to be substantially uniform or isotropic in the base layer 101b. The base layer 101b is configured to be attachable to a substrate, as shown here attached to the substrate 102 of the light absorbing material. The surface layer 101a is also configured of the composite material, but in which the nanoparticle distribution per volume of the dielectric material decreases as the exemplary pillar structures extend outward from the base layer 101b. The base layer 101b is configured to have a particular thickness L1, and the surface layer 101a is configured to have a thickness L2, in which L2 is greater L1. FIG. 1B includes an inset diagram 110b and 110a showing a section of the composite material in the base layer 101b and the surface layer 101a, respectively. As shown in the inset diagrams 110b and 110a, exemplary nanoparticles 111 dispersed in a dielectric host material 112, in which the composite material of the base layer 101b includes more nanoparticles 111 per unit volume than in the surface layer 101a. In other embodiments, for example, the spectrally selective coating 101 can be formed of standalone nanoparticles 111 without the dielectric host material 112.

In some embodiments, for example, the pillar structures of the spectrally selective coating 101 can be configured in an array to provide the surface layer 101a with a substantially uniform surface roughness, whereas in other embodiments, the pillar structures can be randomly configured to provide the surface layer 101a with a nonuniform surface roughness. For example, the pillar structures can be configured to extend outward in a range between 100 nm to 50 μm, and/or the diameter of at least some of the pillar structures can be configured to taper to a smaller diameter as the pillar structures extend outward. In some implementations, for example, the spectrally selective coating 101 can be formed on a surface of a solar thermal energy collector device. In some embodiments, for example, the nanoparticles 111 of the spectrally selective coating 101 can be formed of a semiconductor material including, but not limited to, silicon, germanium, SiGe, silicon boride, metal silicides, PbTe, PbSe, or PbS; the nanoparticles 111 can be formed of a metal material including, but not limited to, tungsten, chromium, nickel, or molybdenum; and/or the nanoparticles 111 can be formed of a carbon material. In some embodiments, for example, the dielectric material 112 of the spectrally selective coating 101 can be formed of a ceramic oxide or fluoride material including at least one of silicon oxide, aluminum oxide, cesium oxide, or magnesium fluoride.

For example, in some embodiments, the disclosed SSC structures can achieve solar absorptivity $\alpha_{s,eff}$ greater than 98% and IR emissivity $\varepsilon_{IR,eff}$ less than 3%. In order to achieve high temperature reliability, key components of the disclosed technology include a scalable and low cost processes for making refractory nanoparticles and embedding the nanoparticles into the dielectric material, e.g., such as a dielectric ceramic matrix.

For example, the nanoparticles can be fabricated by spark erosion or other particle fabrication methods, e.g., including, but not limited to, chemical synthesis, mechanical pulverization, atomization, among others. The spectrally selective coating 101 can be coated onto the substrate 102, e.g., such as a surface of a solar receiver device, by exemplary techniques that include, but are not limited to, e.g., spin coating, drop casting, spray coating, and inkjet printing, among others. Another exemplary technique to coat the spectrally selective coating 101 on a surface of an exemplary solar receiver device can include using a host matrix, e.g., such as a precursor spin-on-glass or other or sol-gel type precursor, together with water or solvent so as to form a slurry or paste that can be applied onto a flat or round surface of the targeted solar receiver device, e.g., such as a stainless steel HTF-carrying tube surface.

In some implementations of the spectrally selective coating 101, the base layer 101b can be configured to exhibit a substantially isotropic or uniform effective permittivity of the composite material, and the surface layer 101a can be configured to exhibit a nonuniform effective permittivity of the composite material providing a gradient to substantially balance the effective permittivities of air and the base layer to allow light absorption into the spectrally selective coating 101.

The surface roughness of the exemplary pillar structures can be added to enhance the performance of spectrally selective coating 101. For example, the surface roughness can be created by either varying the dispersed particle diameter so as to have a varied distribution of nanoparticles 111 through the surface layer 101a. In other examples, the surface roughness can be created by imprinting a sunlight-absorbing coating material, e.g., such as by using a premade stamp or roller device having irregularly or regularly distributed roughness topography, or by performing programmed or random etching processes to induce surface roughness on the pillar structures of the surface layer 101a.

In some implementations of the spectrally selective coating 101 of FIG. 1B, the surface layer 101a of the composite material can be structured to form a nonporous or non-pillar layer with a surface roughness from the nanoscale to the microscale (e.g., 100 nm to 50 μm depth) based on a distribution of nanoparticles 111 per volume of the host dielectric material. In some examples, the distribution of nanoparticles 111 can include (1) less nanoparticles in the upper regions of the surface layer 101a and with increasing nanoparticles present in regions of the surface layer 101a closer to the base layer 101b; (2) nanoparticles of smaller sizes (e.g. smaller diameter) in the upper regions of the surface layer 101a and with increasing nanoparticle size in regions of the surface layer 101a closer the base layer 101b; or (3) a combination of both configurations.

The composite material in the base layer 101b of the spectrally selective coating 101 can be engineered as an isotropic material with an effective permittivity that is determined by the permittivities from individual components, e.g., the permittivity of the nanoparticles 111 ($\varepsilon_p$) and the permittivity of the dielectric host material 112 ($\varepsilon_h$), as well as the volumetric filling ratio. The composite material in the surface layer 101a of the spectrally selective coating 101 can be engineered as a nonuniform material with a varying effective permittivity from one cross-section of the surface layer 101a to another, such that a gradient refractive index (GRIN) is exists between the uniform composite material in the base layer 101b and air or other fluid of the external environment.

Exemplary implementations to model the GRIN layer were performed by discretizing the composite material of the surface layer 101a into infinitesimally thin layers in the vertical direction, each of which may be considered as a uniform medium. For example, modeling of the reflectance of the overall structure can be carried out by a transfer matrix method. The exemplary model showed that the GRIN layer gradually homogenizes the permittivity discontinuity between the air (or external fluid interfacing the spectrally selective coating 101) and the uniform composite material in the base layer 101b. The GRIN layer thus serves as an anti-reflection medium which plays an important role in the design and the optical performance of the spectrally selective coating 101.

FIGS. 1C-1E show plots presenting exemplary calculated reflection spectra data for wavelengths ranging between 400 nm to 1.2 μm of different thickness values of L1 and L2. As shown in the figures, the overall reflectance reduces substantially by increasing the thickness of L2. Therefore, for example, a very rough surface with large range of peak to valley value can enhance the optical performance of the spectrally selective coating 101.

Figure 1F:
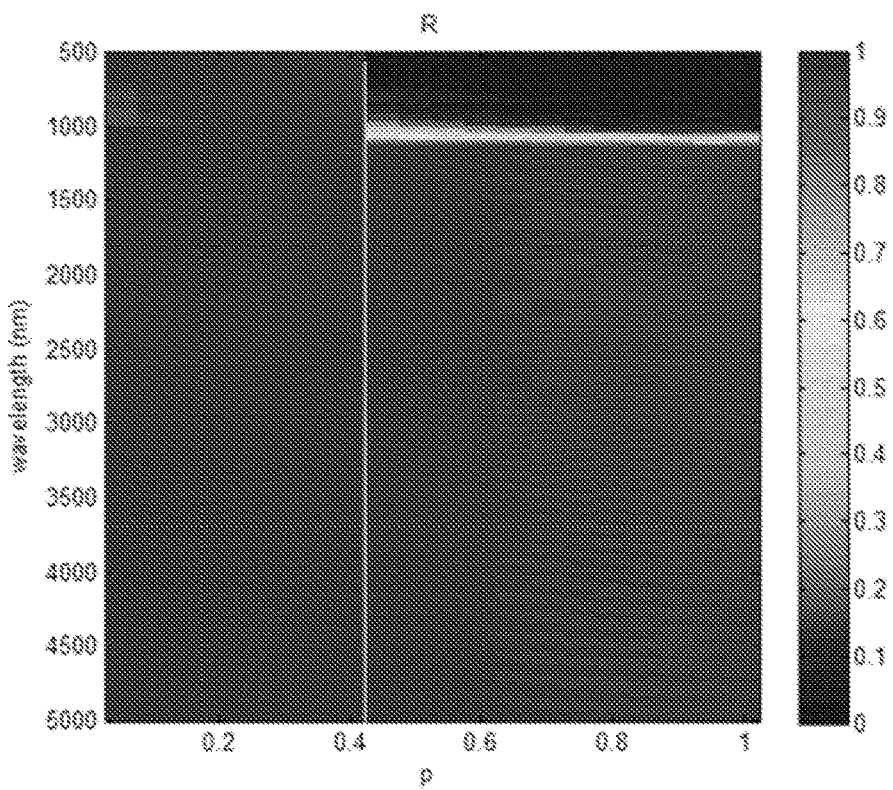
FIG. 1F shows a plot of exemplary simulated reflectance data from an exemplary SSC layer with respect to incident wavelength and volumetric filling ratio of nanoparticles.

FIG. 1F shows a plot of exemplary simulated reflectance data from the exemplary SSC layer with respect to incident wavelength (in nanometers) and the volumetric filling ratio of the nanoparticles (p). In this example, the materials of the nanoparticles and dielectric host are Si and $SiO_2$, respectively, and L1 was configured to a thickness of 20 μm, and L2 was configured to a thickness of 10 μm. For example, 100 or more individual layers can be used to represent the GRIN layer in the exemplary calculation to determine the overall reflectance of the exemplary structure, as shown in FIG. 1F. The exemplary SSC layer shows a sharp contrast change when the filling ratio is greater than 42%. The cut-off wavelength of the reflectance is shown in the figure to be around 1.1 μm, which is aligned well with the bandgap of Si.

Figure 1G:
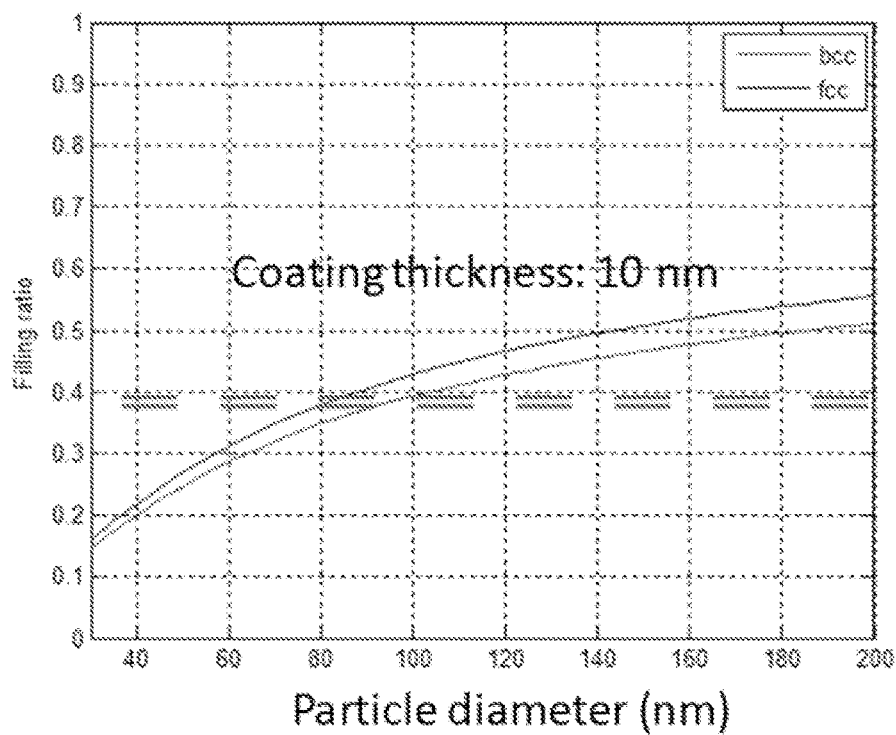
FIG. 1G shows a plot of exemplary estimation of semiconductor filling ratio based on uniform particle sizes.

FIG. 1G shows a plot of exemplary estimation of semiconductor filling ratio based on uniform particle sizes (e.g., diameter in nanometers). For example, in order to obtain low reflection at visible and near infrared frequencies, the semiconductor filling ratio can be configured to be larger than 42%, as shown in FIG. 1F. For example, as shown in FIG. 1G, if the exemplary SSC layer is assembled by particles with substantially the same size and is configured as a 10 nm surface coating, the particle diameter can be configured to be larger than 100 nm to achieve a desired result. A distribution of particle size can be beneficial to achieve high semiconductor filling ratio, e.g., by fitting smaller particles between larger ones. For example, a good range of particle diameter can thus range from 50 nm to 1 μm.

In some embodiments of the spectrally selective coating 101, the nanoparticles 111 can further include an outer protective coating. For example, the outer protective coating can prevent oxidation of the nanoparticles 111, e.g., which can occur in air or at elevated temperatures during various stages of implementation of the spectrally selective coating 101. In some examples, SiGe nanoparticles are implemented for the spectrally selective coatings of the disclosed technology. The SiGe nanoparticles can be coated with an anti-oxidation Si-boride type structure or related shell structures on the exemplary SiGe nanoparticles.

Figure 1H:
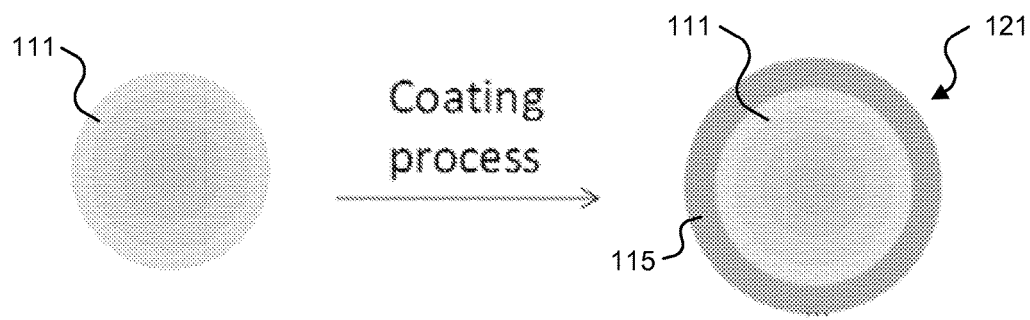
FIG. 1H shows a diagram of an exemplary process to coat the nanoparticles with a refractory-layer-protective coating to form a core-shell nanoparticle structure.

FIG. 1H shows a diagram of an exemplary process to coat the nanoparticles 111 with a refractory-layer-protective coating 115 to form a core-shell nanoparticle structure 121. Exemplary SiGe nanoparticles 111 can be fabricated using any of the aforementioned particle fabrication processes, e.g., including spark erosion method. The core SiGe nanoparticles 111 are subsequently covered by a conformal surface film coating 115. The coating material can be configured as, for example, silicon boride ($SiB_x$) or other ceramics materials which exhibit stability at extremely high temperature. The coating process can be implemented using any of the following exemplary processes: chemical vapor deposition (CVD); combustion synthesis deposition; physical vapor deposition (PVD), e.g., including sputtering, evaporation, ion beam deposition, etc.; electroless plating of precursor with optional heat treatment; coating of a precursor layer using chemical functionalization or surfactant chemistry; and/or mixing of the exemplary SiGe nanoparticles 111 and boride powder/particles with heat assisted diffusion coating.

In some implementations, the disclosed technology can include practical repair processes for aged and/or damaged SSCs. One of the great advantages of the described technique is the possibility to reapply the particle coating process on-field (e.g., in the applied STE systems the SSCs are implemented) to repair local damaged or degraded SSC regions. Because no vacuum is needed for the SSCs of the present technology, the repair process is straightforward and can be performed in air, as well as be implemented with remarkably low cost. In some examples, brush coating or thermal spray coating of an exemplary SSC material precursor can be directly applied on top of the damaged areas and restore the optical performance of the STE system. For example, exemplary SSC material precursors can include nano- to micro-particles of SiGe, boride- or oxide-coated SiGe, Si boride, and other semiconductor materials having suitable bandgap characteristics, dispersed in uncured spin-on-glass or uncured silica precursor liquid. In some implementations of the repair process involving repairing an SSC on a solar concentrator device, the solar concentrator itself can be used to raise the temperature and cure the newly applied SSCs. In some implementations, additional high temperature cure process can also be utilized, as needed, e.g., such as hot air blow, portable heating lamp or IR lamp, wrap mount furnace, or flame torch lighter (e.g., all of which is easy to use without any professional training).

Figure 2A:
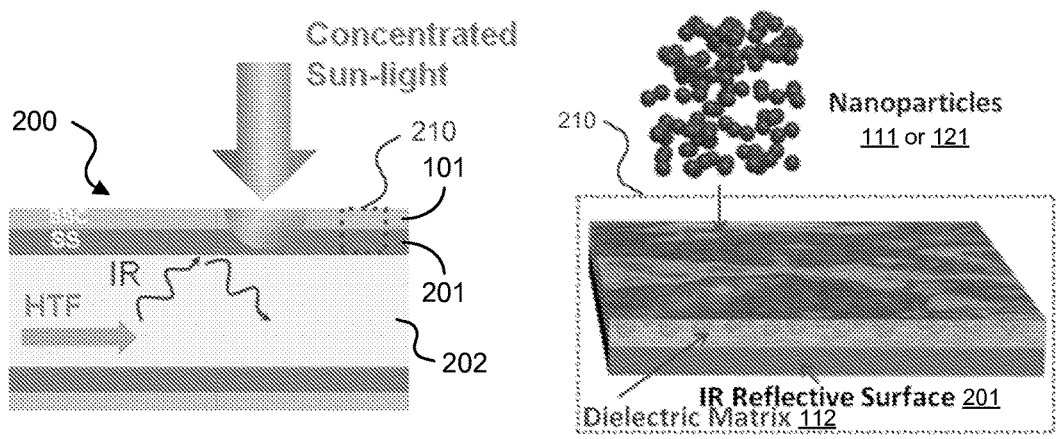
FIG. 2A shows a schematic illustrations of an exemplary solar thermal energy system including the disclosed SSC.

FIG. 2A shows a schematic of an exemplary solar absorber device 200 utilizing the spectrally selective coating 101 and to provide substantially ideal optical performance of a STE collector, e.g., in which the spectrally selective coating 101 provides solar absorptivity $\alpha_{s,eff}$ greater than 98% and IR emissivity $\varepsilon_{IR,eff}$ less than 3%. The solar absorber device 200 includes the spectrally selective coating 101 configured on an IR reflective outer surface of a stainless steel (SS) tube 201 including a fluid within the interior cavity 202 of the SS tube 201 to be heated. The SS tube 201 can be configured as any material including an IR reflective surface. For example, the performance, cost, and durability of the spectrally selective coating 101 on the solar absorber device 200 can have a significant impact on the efficiency and cost of the solar thermal energy system to which the solar absorber device 200 is applied. FIG. 2A includes an inset schematic 210 illustrating the contents of the spectrally selective coating 101 on the solar absorber device 200. As shown in the diagram 210, the spectrally selective coating 101 can include the nanoparticles 111, 121, or a combination thereof, embedded in the dielectric material 112, e.g., such as a ceramic matrix including silicon oxide. Depending on the application of the solar absorber 200, in some implementations of the solar absorber 200, for example, the nanoparticles 111 and/or 121 can be implemented in the spectrally selective coating 101 without the use of the dielectric matrix 112 and still provide an effective SSC.

Figure 2B:
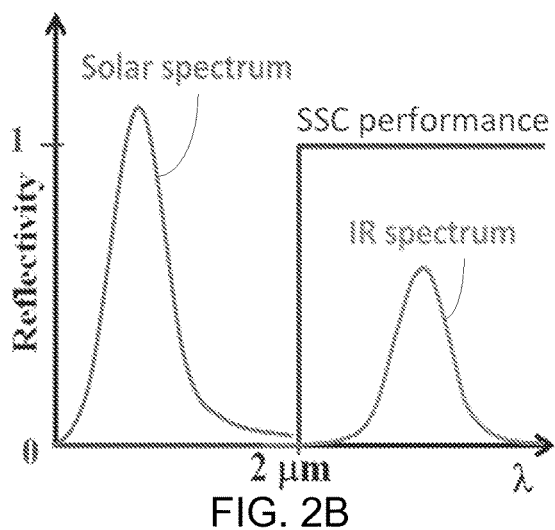
FIG. 2B shows a plot of the exemplary optical performance of the spectrally selective coating.

FIG. 2B shows a plot of the exemplary optical performance of the spectrally selective coating 101, e.g., as implemented on the solar absorber 200. As shown in the plot, in the solar spectrum (e.g., short wavelength region), the reflectance of the exemplary SSC is substantially zero (or the absorptance is substantially 100%), and in the IR spectrum, the reflectance of the exemplary SSC is substantially 100% (or the emittance is substantially zero). The exemplary SSC can function to have the maximum absorptance for the energy from the sunlight and with minimal heat loss due to the blackbody thermal radiation of the absorber itself, which lies in the IR range (e.g., long wavelength region).

Exemplary implementations of the disclosed SSC technology included performing optical measurements and developing computer model simulations, which are described herein and show that the spectrally selective coatings of the disclosed technology exhibit ultra-high absorptivity in the solar spectrum (e.g., 300 nm-1 µm) and ultra-high reflectance in the IR spectrum (e.g., >2 µm).

Exemplary results of the exemplary implementations demonstrate that the disclosed SSC can be successfully implemented in various STE applications including solar hot water and concentrated solar power systems.

Figure 3:
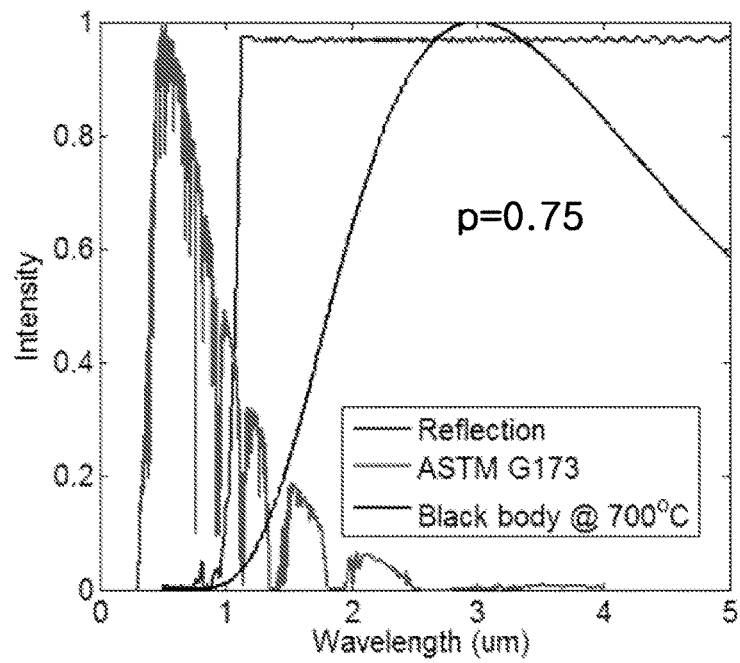
FIG. 3 shows a data plot of exemplary reflectance data compared with solar spectrum and the blackbody radiation spectrum at 700° C.

FIG. 3 shows a data plot of exemplary reflectance data compared with solar spectrum and the blackbody radiation spectrum at 700° C., when the Si filling ratio is 75% (e.g., p=0.75). Based on these exemplary calculation results, the solar absorptivity $\alpha$ is around 99% and the IR emissivity $\epsilon$ is about 4%. For example, the overall high performance may be attributed to the following three exemplary factors: (1) the surface texture of the nanocomposite materials, e.g., the effective GRIN layer, which acts as a perfect light trapping layer or anti-reflection layer when the texture size is sub-wavelength at visible frequencies (e.g., typically less than 300 nm); (2) a suitable nanoparticle material and filling ratio (e.g., used to tune the cut-off wavelength in the reflectance); and (3) suitable substrate to adhere the exemplary SSC, e.g., such as a flat stainless steel layer to improve the reflectance at IR wavelengths. Additionally, for example, the surface roughness can be configured to be deep-sub-wavelength at IR frequencies (e.g., such as less than 100 nm) to reduce the absorption due to surface light trapping.

Figure 4A:
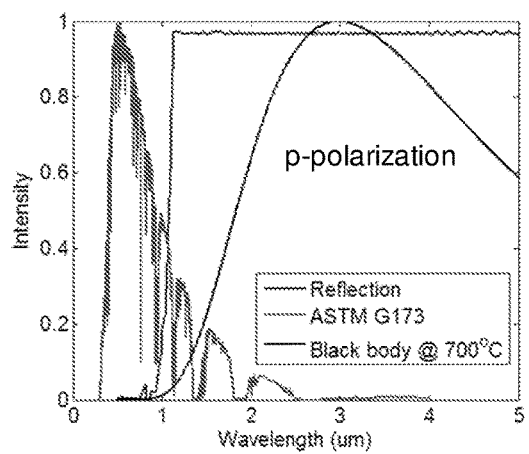
FIGS. 4A and 4B show data plots of exemplary reflectance data for both p and s polarization.
Figure 4B:
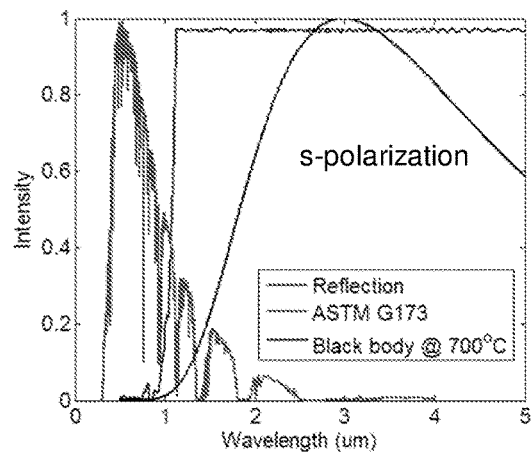

FIGS. 4A and 4B show data plots of exemplary reflectance data for both p and s polarization. The incident angle was 30 degrees. The other exemplary calculation parameters were the same as those in FIG. 3. For example, the polarization and the incident angle do not significantly affect the reflectance, which also demonstrates the robustness of the SSC layer.

In some examples, to produce the nanoparticles 111, for example, a highly scalable nanoparticle manufacturing process referred to as spark erosion can be implemented to prepare large quantity of nanoparticles, which can be subsequently coated by the techniques described in FIG. 1H to form the protective-coated nanoparticles 121. The exemplary spark erosion method can fabricate nanometer-sized particles of metal and semiconductor materials, which has been demonstrated for 20-100 nm scale particles.

Examples of spark erosion methods, systems, and devices to produce nanoparticles are described in the PCT Patent Application document WO 2013/056185, entitled "NANO-MATERIALS FABRICATED USING SPARK EROSION AND OTHER PARTICLE FABRICATION PROCESSES", which is incorporated by reference in its entirety as part of the disclosure in this patent document.

Figure 5A:
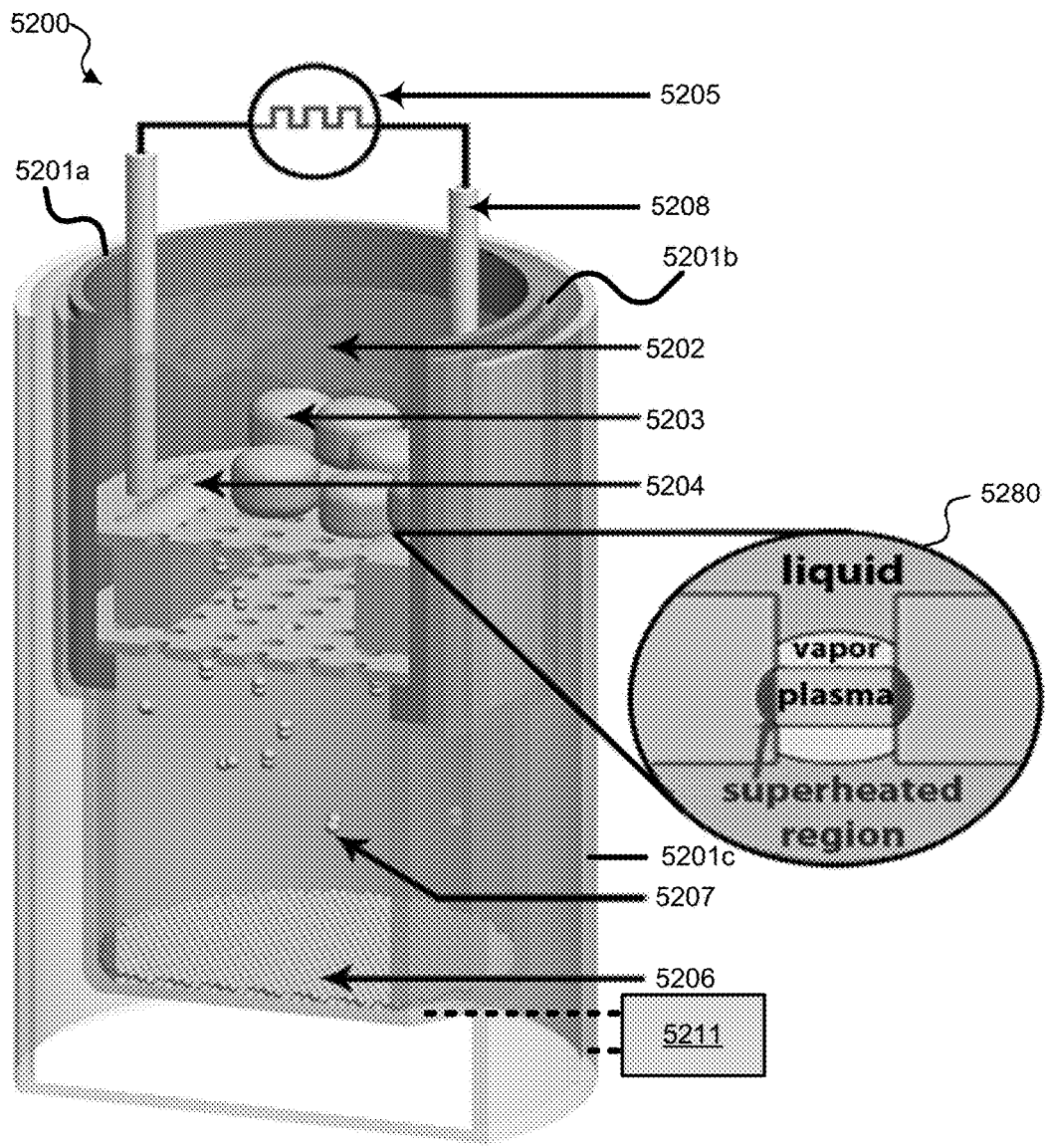
FIG. 5A shows a schematic of an exemplary spark erosion device to produce nanoparticles.

FIG. 5A shows exemplary schematic of a spark erosion device 5200 to produce spark eroded nanoparticles 5207, e.g., which can be produced with reduced or substantially no surface oxidation. The exemplary spark erosion device 5200 includes a multilayered container 5201, e.g., including an inner layer 5201a, an intermediate layer 5201b, and an outer layer 5201c, to provide a casing for a spark erosion cell configured in a shaker-pot configuration within the multilayered container 5201. In some implementations of the exemplary device 5200, the container 5201 can be configured as a double-walled, vacuum-jacketed glass container having a cylindrical geometry with a 10 cm diameter. For example, a dielectric fluid 5202 can be contained within the inner layer 5201a, which can be structured to include an aperture at a bottom surface of the inner layer 5201a that leads to a particle collecting chamber formed by the intermediate layer 5201b. The outer layer 5201c can be structured to surround the intermediate layer 5201b creating a void between these layers, in which the void can provide a vacuum, e.g., in which substantially no air or fluid filling the void between the outer layer 5201c and the intermediate layer 5201b. The dielectric fluid 5202 that is contained within the inner layer 5201a and intermediate layer 5201b can be a fluid that is free of oxygen, and the utilization of the dielectric fluid 5202 in the disclosed spark erosion processes can inhibit oxidation of the produced nanoparticles 5207. For example, the dielectric fluid 5202 can include liquid argon or liquid nitrogen. For example, the inner layer 5201a can be structured to hold in place one or more perforated screens 5206 configured substantially perpendicular to the cylindrical interior of the container 5201. For example, the device 5200 can include multiple perforated screens 5206 configured as a top screen and a bottom screen, in which electrodes 5204 are located between the top and bottom screens such that part of the electrodes 5204 is protruded through the top screen to expose a portion of the electrodes 5204 above the top surface of the top screen. The two electrodes 5204 are positioned at a distance apart and immersed in the dielectric fluid 5202 in the container 5201, in which the spark erosion cell and/or the multilayered container 5201 is vibrated along one or more axes. For example, in some implementations, the spark erosion device includes a gyrator or other movement-producing mechanism 5211 coupled to the container 101 (e.g., coupled to the inner layer 5201a or the intermediate layer 5201b inside the container 5201 or coupled to the outer layer 5201c outside of the container 5201) that vibrates, shakes, spins, or generates other mechanical motion on the container 5201 to move the charge pieces 5203 within the dielectric fluid 5202 to produce various contact between the charge pieces 5203 and the electrodes 5204. The spark erosion cell includes a pulse power supply 5205 located outside of the multilayered container 5201 and connected to the electrodes 5204 via insulated electrode leads 5208. Charge pieces 5203 formed of the material of interest (e.g., such as an alloy material) can be deposited on the top surface of the top screen of the perforated screens 5206 of the spark erosion cell. The perforated screens 5206 can be structured to allow the nanosized spark eroded nanoparticles 5207 to pass through holes along the screen structure to the collection region at the bottom of the intermediate layer 5201b of the container 5201, while preventing the charge pieces 5203 from passing through. In some examples, the top and bottom perforated screens 5206 can be configured to have the same size holes to filter the particles producing by spark erosion. In other examples, the top and bottom perforated screens 5206 can be configured to have different sized holes, e.g., in which the bottom screen includes holes smaller than that of the top screen. The charge pieces 5203 can include bulk size pieces (e.g., having ~2 cm diameter), which are disposed on the top perforated screen 5206 such that they are capable of making contact with the exposed region of the electrodes 5204. For example, the electrodes 5204 can also be formed of the same material of interest as the charge pieces 5203. The spark erosion cell can be vibrated by the gyrator 5211 such that the charge pieces 5203 can be moved around within the container to make an electrical contact with the electrodes 5204, e.g., in which the electrical contact between them is continuously made and broken.

An electric field can be generated between the electrode 5204 and the charge piece 5203 in the dielectric fluid 5202 using an electric pulse generated by the pulse power supply 5205, in which the electric field creates a microplasma (spark) in a volume formed in a gap existing between the charge piece 5203 and the electrode 5204 that locally superheats the materials to form structures within the volume, e.g., in which the formed structures are condensed/quenched by the dielectric fluid 5202 to produce the spark eroded nanoparticles 5207. For example, microplasmas (sparks) can be generated in these exemplary gaps, e.g., when the electric field in a gap is greater than the breakdown field of the dielectric. The generated microplasmas exhibit high temperatures that provide localized heat to the charge pieces 5203. For example, since the spark temperatures are very high (e.g., ~10,000 K), localized regions across the gaps are superheated by absorbing energy from the sparks (e.g., as shown in inset illustration 5280). For example, when the spark collapses, tiny particles (e.g., molten droplets and/or vaporized material which can be of a nanometer size) can be ejected into the dielectric, e.g., in which the tiny structures are rapidly quenched/condensed to form solid spark eroded particles 5207.

Since the quenching rate is very rapid, the resultant particles have nanometers to micrometers sizes. For example, the spark erosion device 5200 can be operated to control the size distribution of the spark-eroded particles, e.g., including producing bimodal particles, where one group is in the nanometer range, with the other group having an average size of 1-20 µm. In such examples, particles can particular sizes can be filtered and taken out by sieving processes.

Figure 5C:
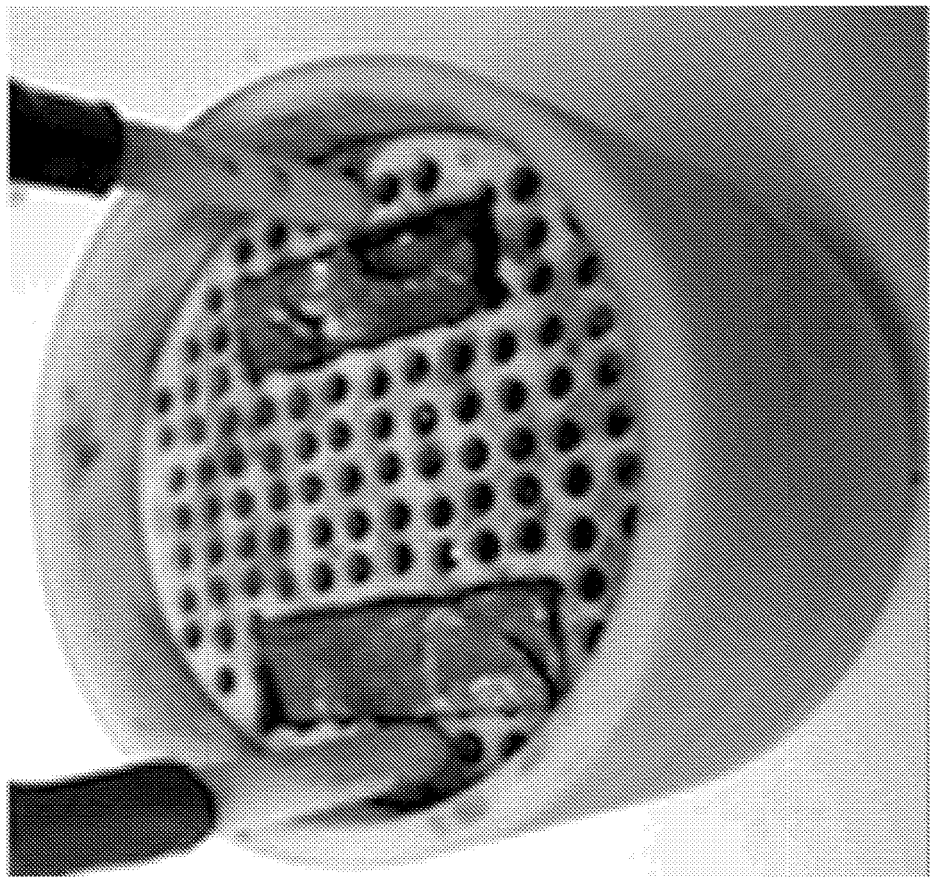
FIGS. 5B and 5C show images of exemplary 'shaker-pot' spark erosion devices.
Figure 5B:
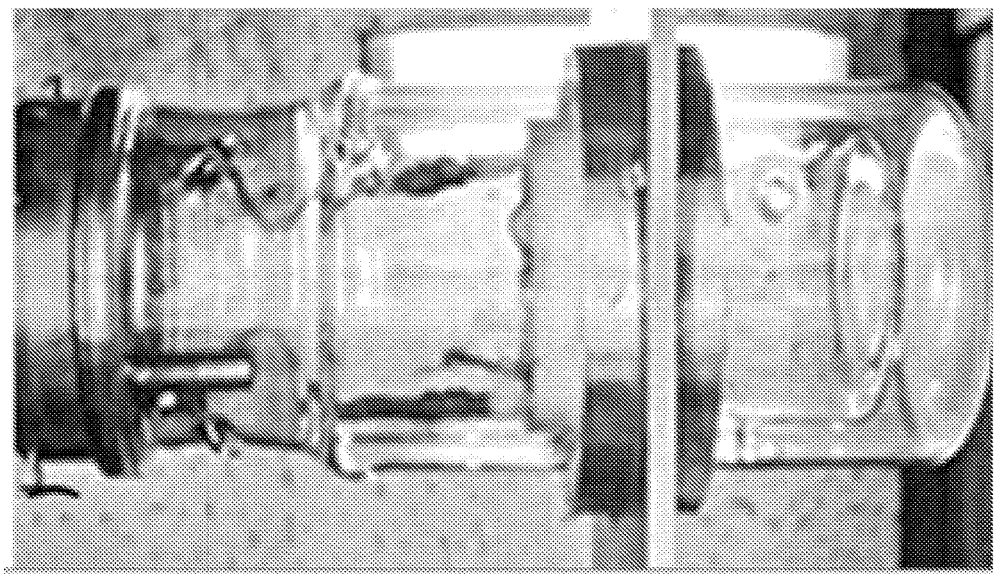

FIG. 5B shows an image of an exemplary 'shaker-pot' spark erosion device including the embodiment described for the spark erosion device 5200. FIG. 5C shows an image of an exemplary spark erosion cell, e.g., having a 10 cm diameter, showing the insulated electrode connections to a pulsed power source and the perforated screen to support charge pieces.

Figure 6A:
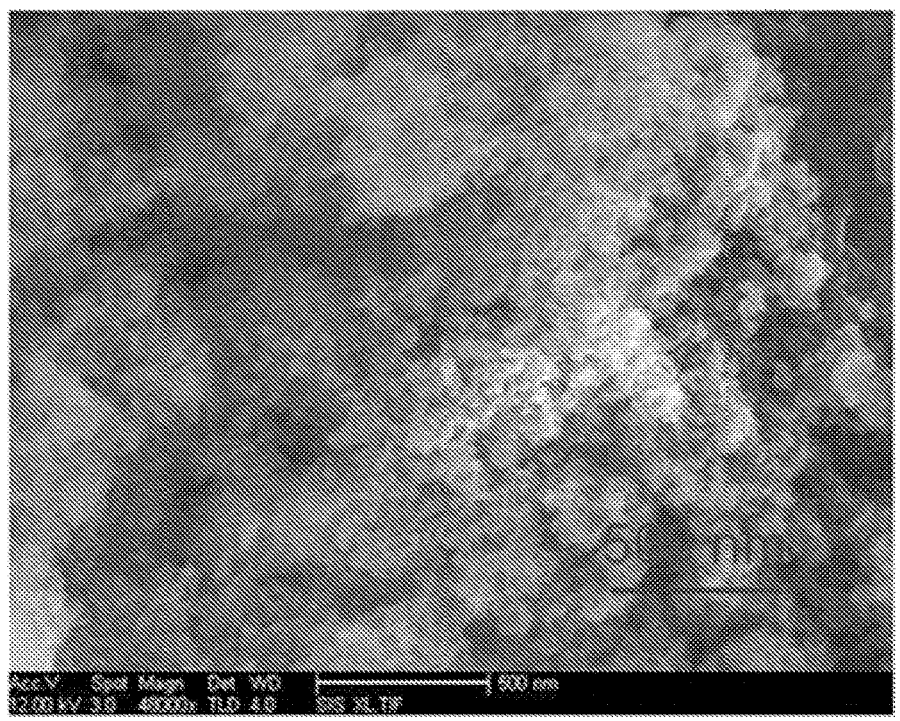
FIGS. 6A and 6B show a scanning electron microscopy (SEM) image and a transmission electron microscopy (TEM) image of exemplary spark eroded SiGe nanoparticles.
Figure 6B:
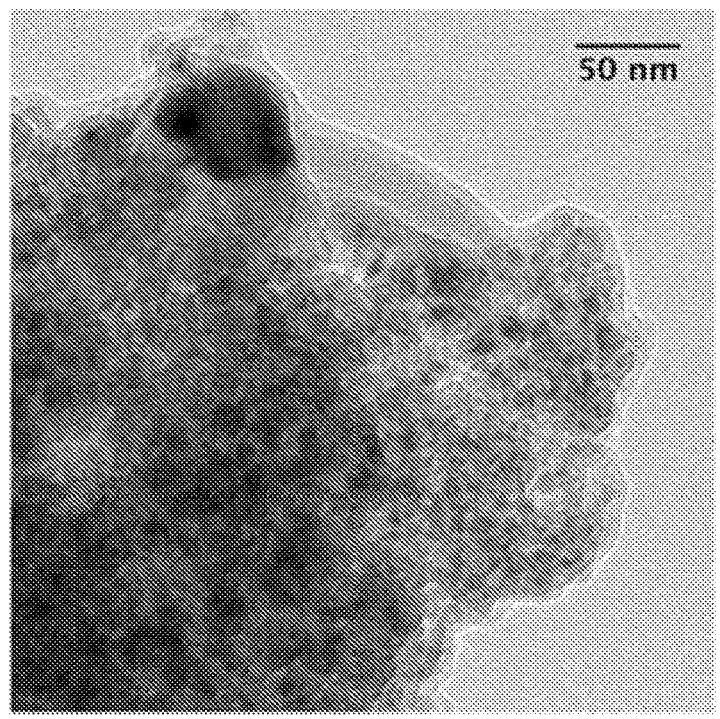

FIGS. 6A and 6B show an exemplary scanning electron microscopy (SEM) image (FIG. 6A) and an exemplary transmission electron microscopy (TEM) image (FIG. 6B) that demonstrate exemplary spark eroded SiGe nanoparticles, e.g., in which the exemplary TEM image shows the small particle size. The spark erosion process can be implemented to produce nanoparticles to be utilized in the spectrally selective coating 101 with extremely high yield and low cost, e.g., including higher than 100 gram/hour in a 10-cm-diameter cell. The spark erosion process provides a versatile technique suitable for the production of a variety metal and semiconductor particles, the semiconductor particles being conductive. Exemplary materials that can be spark eroded for the exemplary SSC applications, e.g., including, but not limited to, Si, Ge, Si—Ge alloy, PbSe, PbTe, Silicide, Si Borides, Zr Borides, Nb Borides, Cr, Ni, Co, W, Mo, among others.

In another aspect, the disclosed technology includes scalable processes to fabricate SSCs having ultra-high optical performance properties. One exemplary highly scalable and low cost method to provide an spectrally selective coating on a surface, e.g., of a solar absorber device, is described. For example, as shown previously in FIG. 2A, the exemplary SSC can include nanoparticles of refractory semiconductors and/or metals and be coated on highly IR reflective surfaces, in which the exemplary SSC can form a surface layer of pillar structures over a base layer which are configured in the form of standalone nanoparticles or embedded in a dielectric material matrix. For example, the coating of the exemplary SSC material can be applied onto solar receivers by low cost coating processes, e.g., such as drop casting and spray coating, among other techniques.

Figure 7:
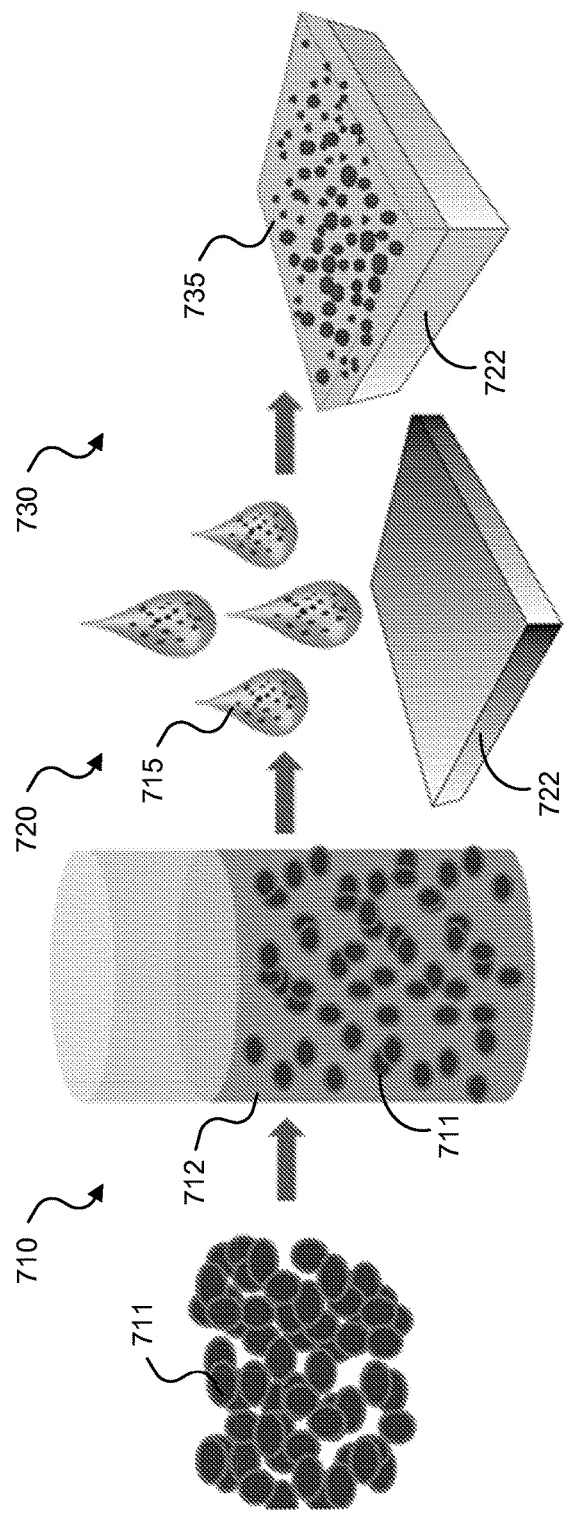
FIG. 7 shows a process illustration of an exemplary fabrication method to produce a spectrally selective coating on an exemplary metallic receiver surface.

FIG. 7 shows a process illustration of an exemplary fabrication method to produce a spectrally selective coating on an exemplary metallic receiver surface. The method includes a process 710 to disperse nanoparticles 711 into a solvent 712, e.g., including water or organic solvents to form a nanoparticle-dispersed solution 715. In some implementations, the process 710 can include applying ultra-sonication to the nanoparticle solution 715. In some implementations, the process 710 can include adding a surfactant to the nanoparticle solution 715. For example, prior to implementing the process 710, the nanoparticles 711 can be fabricated by a scalable nanoparticle synthesis process, e.g., such as spark erosion. Also for example, in some implementations of the method, the method can include a process to coat the nanoparticles 711 with a protective coating, e.g., such as silicon boride, to form core-shell nanoparticles like the nanoparticles 121 described in FIG. 1H to resist oxidation or other forms of degradation of the nanoparticles 711. The method includes a process 720 to coat the nanoparticle solution 715 onto a target substrate 722. In some implementations, the process 720 can include spin coating, drop casting, spray coating, and/or inkjet printing techniques to provide a coating of the nanoparticle solution 715 on the substrate 722. The method includes a process 730 to dry or cure the nanoparticle solution 715 on the substrate 722 to produce a spectrally selective coating 735 formed of a dense film made of nanoparticles 711. Alternatively, to fabricate the SSC having a nanoparticle-in-dielectric matrix architecture, e.g., like that of the spectrally selective coating 101, the process 710 includes using a glass precursor (e.g., spin-onglass (SOG)) or sol-gel precursor as the solvent 712. In both cases, the process 720 can still employ the exemplary coating processes, e.g., including drop casting, spin coating, spray coating, and/or inkjet printing techniques, among others, prior to implementing the process 730 to dry or cure the coated substrate to consolidate and form the exemplary nanoparticle-in-dielectric matrix based spectrally selective coating 735.

Figure 8D:
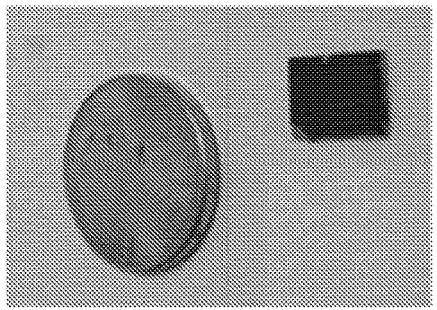
FIGS. 8A-8D show images of an exemplary SiGe nanoparticle-glass precursor based SSC formed on an exemplary stainless steel substrate.
Figure 8C:
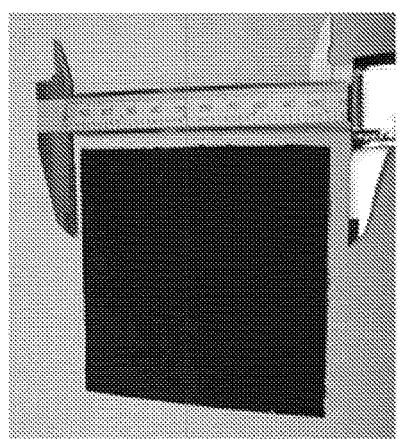
Figure 8B:
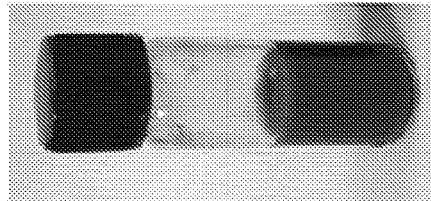
Figure 8A:
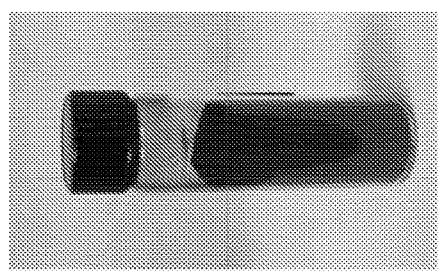

In some examples, $Si_{0.8}Ge_{0.2}$ can be used as the representative semiconductor material to yield the desirable spectral selectivity based on its bandgap (e.g., ~1.2 µm). Exemplary SiGe nanoparticles can be fabricated by spark erosion, as demonstrated in the image of FIG. 8A. The exemplary SiGe nanoparticles can then be dispersed into acetone or isopropanol or alternatively in a SOG glass precursor solution. FIG. 8B shows an image of the exemplary SiGe nanoparticles dispersed in the SOG glass precursor solution contained in a vial. The SiGe nanoparticle-laden solutions can then be drop-casted onto polished stainless steel (SS) substrates (e.g., SS Type 303). FIG. 8C shows the deposited SiGe nanoparticle-laden solution on a large 10×10 cm² SS substrate. FIG. 8D shows an image of a sample piece of the exemplary SiGe based SSC over the SS substrate.

Figure 9A:
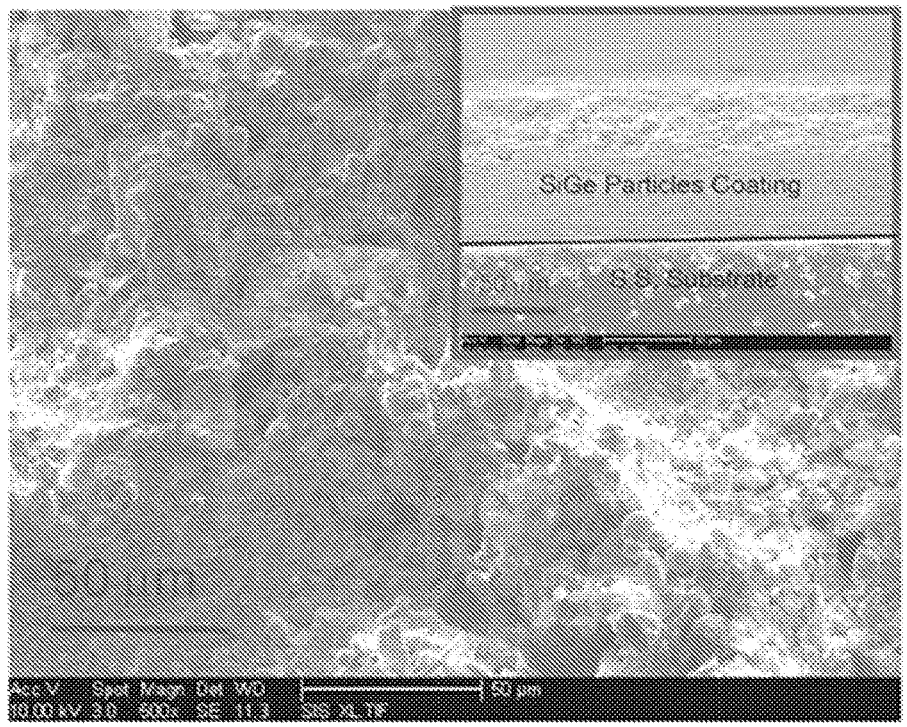
FIGS. 9A and 9B show SEM images of exemplary SiGe particles forming an exemplary SSC on a substrate.
Figure 9B:
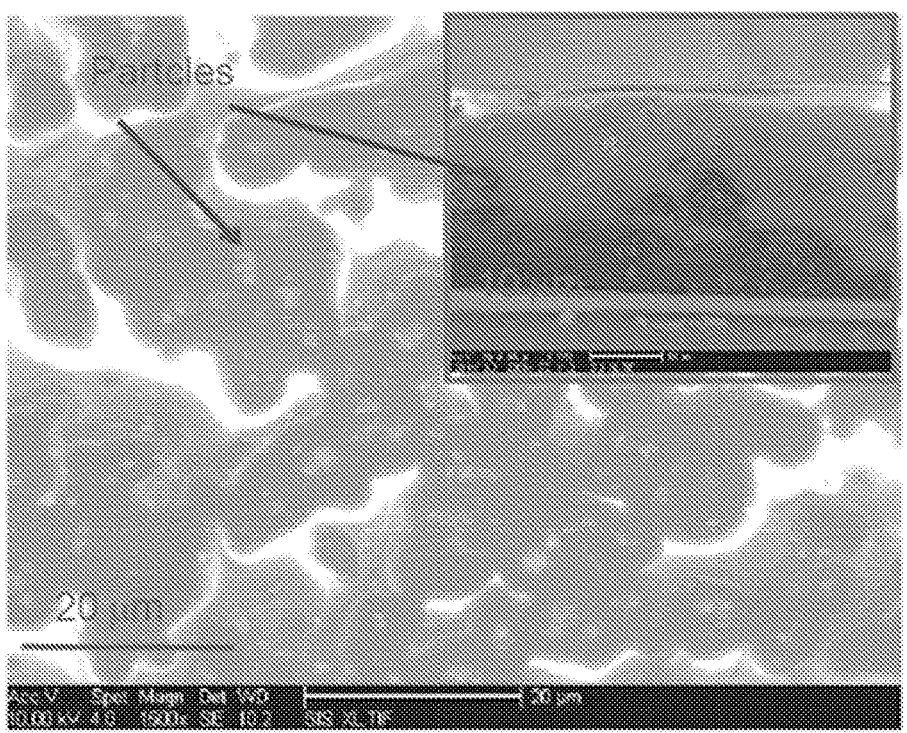

FIGS. 9A and 9B show SEM images of exemplary SiGe particles forming a SSC over an exemplary stainless steel substrate using acetone and SOG, respectively, as the exemplary solvent fluid. The exemplary insets of each figure show a cross-sectional SEM micrograph. As shown in FIG. 9A, the coated SiGe layer on the substrate formed a somewhat rough surface, e.g., which might be due to the lack of particle mixing and coating processes in this exemplary implementation. FIG. 9B shows the coated layer including SiGe particles embedded in SOG-based glass matrix, e.g., by mixing the particles into SOG followed by drop casting in this exemplary implementation. In other implementations, a more uniform coating can be achieved by using finer particles and by optimizing the mixing and coating process (e.g., including using sonication and high-speed spray coating onto a rotating substrate). Subsequent to spray coating, a high temperature vacuum/air annealing can be carried out to improve the integrity of the coating and its adhesion to the substrate. For example, methyl silsesquioxane (MSQ) can be converted into $SiO_2$ with dense cross-linked network structure when cured at 500° C., and becomes complete $SiO_2$ at 700° C. The exemplary annealing process can be implemented to also improve the high temperature stability (e.g., >650° C.). For example, for refractory nanoparticles, very high annealing temperature may be needed. For example, an ultra-high vacuum furnace can be used to assist the effort.

Alternatively, for example, initial annealing can be done simultaneously with the spray coating, for example, by using thermal spraying. Thermal spray is a continuous coating process in which the feedstock (e.g., nano- and micro-sized powders) of virtually any material are heated by plasma/arc or combustion flame into molten and semi-molten droplets, which are accelerated to impinge onto a substrate and rapidly solidify to form a coating film. For example, a high velocity oxy-fuel (HVOF) thermal spray process can be utilized for the thermal spray.

Figure 10A:
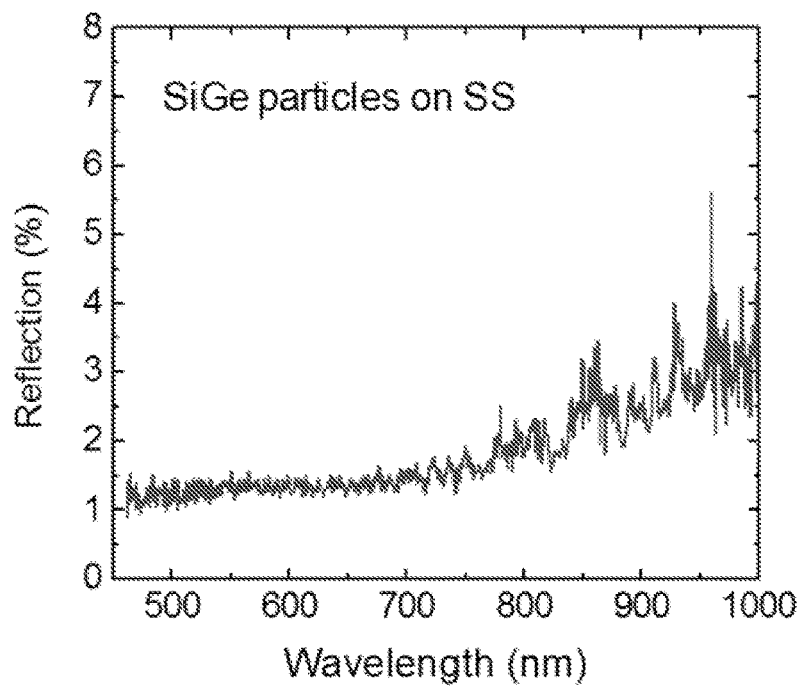
FIGS. 10A and 10B show data plots of the reflectance of exemplary $Si_{0.8}Ge_{0.2}$ particles on a surface at visible and near-IR frequencies and at IR frequencies.
Figure 10B:
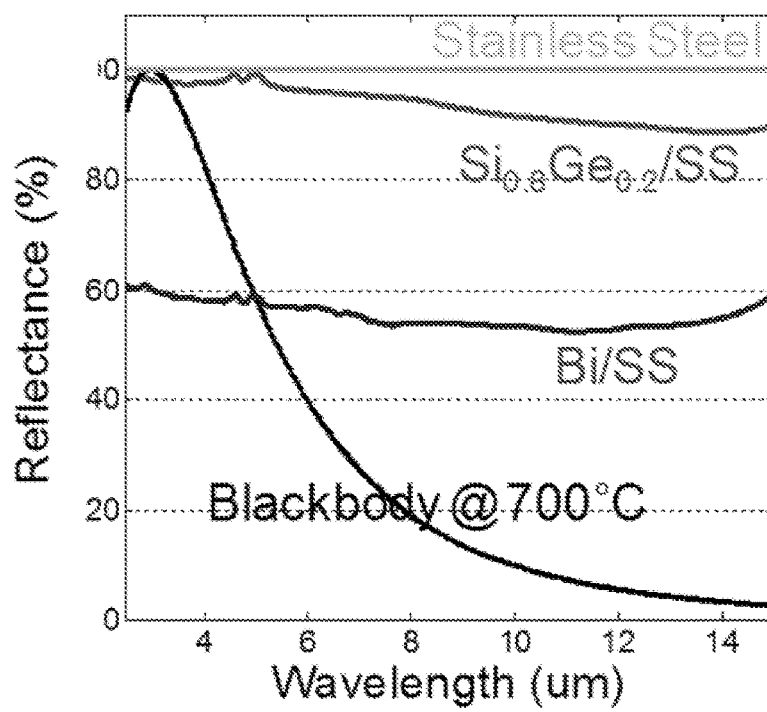

FIGS. 10A and 10B show data plots of the reflectance of exemplary $Si_{0.8}Ge_{0.2}$ particles on a stainless steel surface in the visible and near-IR frequencies (FIG. 10A) and of the reflectance for various samples at JR frequencies (FIG. 10B). FIG. 10A shows the optical performance of exemplary spark eroded SiGe semiconductor particle based SSCs. In this exemplary implementation, the SiGe nanoparticle coatings include nanometer scale roughness and exhibit very low reflectivity (e.g., 1-4%) across the entire visible to near-infrared (NIR) light spectrum. The roughened surface effectively traps visible light, leading to extremely low reflection, such that there is no need for any additional antireflection coating layers. FIG. 10B shows the optical performance for exemplary $Si_{0.8}Ge_{0.2}$ SSC layers at IR frequencies. The exemplary SiGe sample showed excellent reflection (e.g., >96%) around the peak blackbody radiation wavelengths at 700° C. (e.g., 3 µm), which stems from the low absorption coefficient when the light energy is below the semiconductor bandgap (e.g., ~1.04 eV or 1.2 µm for $Si_{0.8}Ge_{0.2}$).

Figure 11:
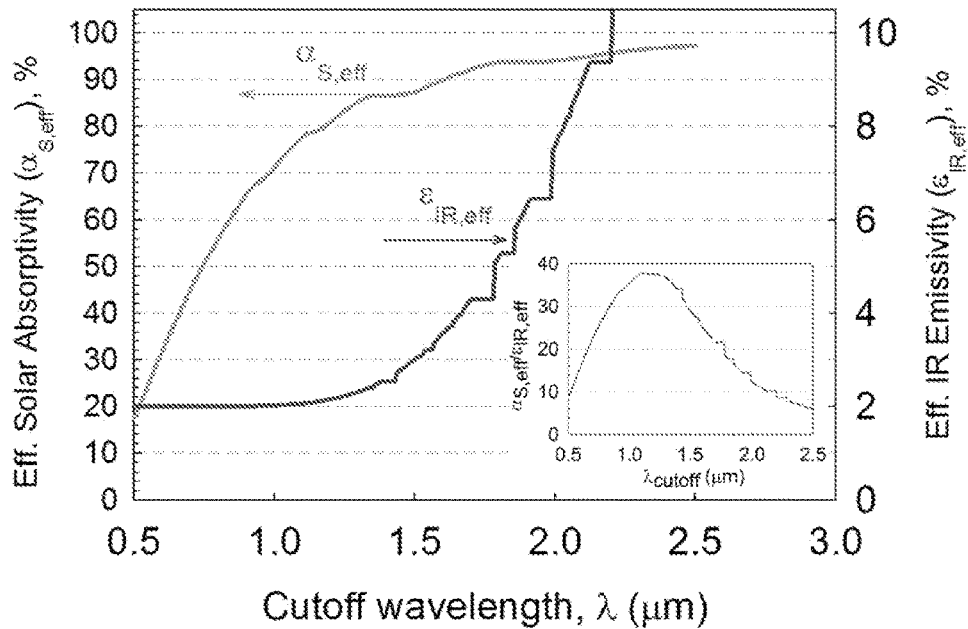
FIG. 11 shows a plot of exemplary average solar absorptivity and IR emissivity data for an exemplary SSC device.

FIG. 11 shows a plot of exemplary data including the average solar absorptivity and IR emissivity at 700° C. (e.g., as defined in Eqs. (2) and (3)) with an exemplary SSC, such as the spectrally selective coating 101 shown in FIG. 2A. As shown in the plot, both $\alpha_{S,eff}$ and $E_{IR,eff}$ increase as the cutoff $\lambda$ increases (or the $E_g$ of the semiconductor nanoparticles decrease). There exists an optimal $\lambda_{cutoff}$ for the maximum $\alpha_{S,eff}/\varepsilon_{IR,eff}$ (as shown in the inset of FIG. 11). The exemplary $\lambda_{cutoff}$ for the maximum $\alpha_{S,eff}/\varepsilon_{IR,eff}$ lies in the range of 1.0-1.4 µm (or, for example, $E_g$=0.89-1.24 eV), which coincides with the bandgap of a number of the exemplary semiconductors described herein including, for example, Si, Si—Ge, silicides, and Si borides.

Figure 12:
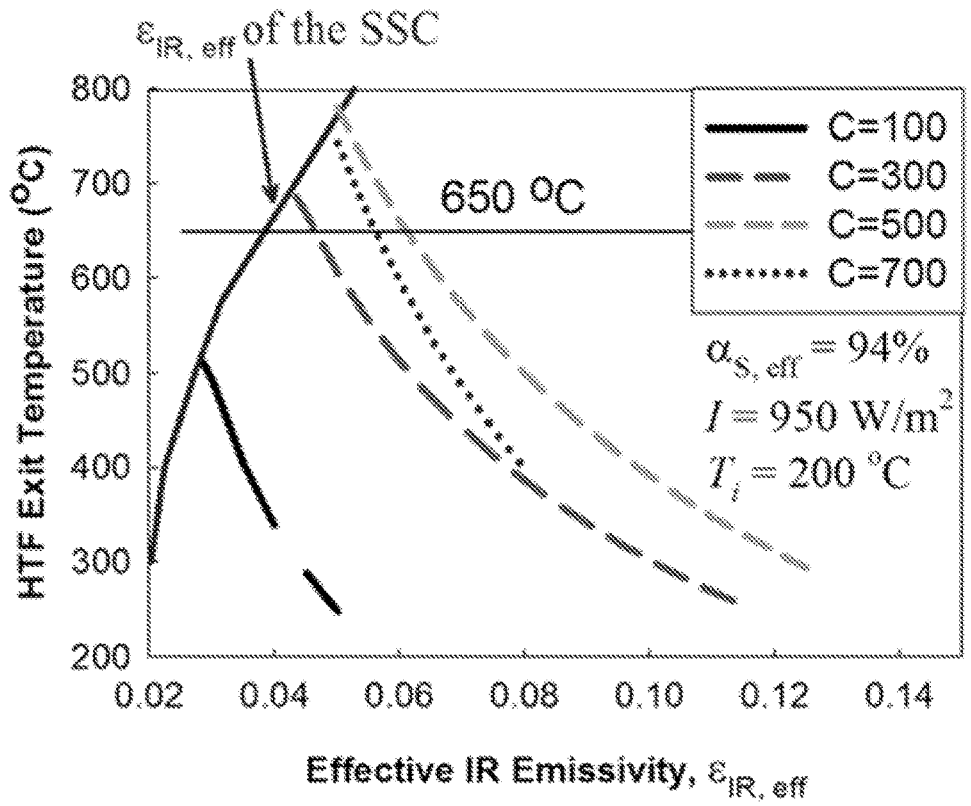
FIG. 12 shows a data plot of the thermal performance of solar absorber material including an exemplary SSC of the disclosed technology.

FIG. 12 shows a data plot of the thermal performance of an exemplary solar absorber material including the disclosed SSC technology showing the heat transfer fluids (HTF) exit temperature plotted against emissivity under different optical concentration ratios (C). The exemplary HTF exit temperature is determined when the thermal efficiency is above 90% by varying the mass flow rate of the HTF. The solid blue line in FIG. 12 represents an exemplary minimum attainable $\varepsilon_{IR,eff}$ using the exemplary SSC-coated SS structure, e.g. as calculated by Eq. (2) and with the optical data shown in FIG. 3.

In the exemplary implementations to acquire the data, the solar receiver was placed within an evacuated glass enclosure to minimize the heat loss by air convection and conduction. Heat transfer fluid (e.g., such as molten nitrate salt) was introduced into the tube from the inlet with a certain temperature and pressure. Concentrated solar irradiation with heat flux relevant to CSP applications was deposited on to the absorber. In the exemplary calculation, the effective solar absorptivity $\alpha_{S,eff}$ was estimated to be 94% (e.g., corresponding to the optical data of an exemplary SSC structure with the cutoff wavelength of 1.7 µm).

The solid blue line in the data plot of FIG. 12 shows that $\varepsilon_{IR,eff}$ increases at higher temperature, e.g., as a larger portion of the IR emission lies in below the cutoff wavelength (Eq. (2)). The data plot of FIG. 12 shows that the thermal performance of the absorber depends on the effective emissivity as well as the effective absorptivity.

Most of the existing SSC materials degrade at elevated temperature, especially in air, due to oxidation and/or structural changes. The disclosed technology utilizes the host dielectric material matrix (e.g., such as an oxide matrix) which can reduce or eliminate the undesirable oxidation of the exemplary semiconductor materials (e.g., employed in the nanoparticles). In some examples, a transparent $SiO_2$ or transparent $Al_2O_3$ can be used as the host oxide to contain light-absorbing semiconductor nanoparticles (or in some examples, microparticles). In the exemplary case of the transparent $SiO_2$ matrix, a sol-gel or spin-on-glass type liquid matrix can be used. In the exemplary case of the transparent $Al_2O_3$ matrix, a precursor for alumina can be prepared by ammonia method from aluminum chloride and aluminum-n-butoxide with formamide as the solvent.

FIGS. 13A-13E show exemplary images, data plots and tables of properties of exemplary annealed SiGe particles. FIG. 13A shows an SEM image of the exemplary SiGe particles after 1 hr annealing at 700° C. in air. FIG. 13B shows an SEM image of the exemplary SiGe particles after 1 hr annealing at 1000° C. in a vacuum. FIG. 13C shows a table of exemplary elemental analysis data performed by EDAX on the exemplary samples, showing % Si, % Ge, and % O under the different annealing conditions including (i) at 500° C. in air, (ii) at 700° C. in air, and (iii) at 1000° C. in vacuum. FIG. 13D shows a data plot of reflectance of the annealed samples in the UV to NIR range. FIG. 13E shows a data plot of IR reflectance of the annealed samples.

The results of the exemplary implementations described in FIGS. 13A-13E show that there is little degradation on the optical properties of the annealed samples. As shown in FIGS. 13D and 13E, the exemplary annealed samples show small increase in the reflectance in the UV-Vis-NIR range expected for sample annealed at 700° C. in air, but little change in the reflectance in the IR range. This is coincided with the structural observation which shows minimal morphological and structural changes of the particles after the annealing. For the exemplary sample annealed at 700° C. in air, the considerable increase in the solar spectrum is likely due to the oxide.

For the particles that tend to be oxidized in air at high temperature (e.g., such as Si, SiGe, W, Mo), a thin (e.g., approximately 100 nm or in the hundreds of nm) conformal protective layer (e.g., such as $Al_2O_3$) can be applied onto the nanoparticles by scalable fabrication processes, e.g., including sol-gel processes. FIGS. 14A-14C show SEM and TEM images of an exemplary protective coating. The SEM image in FIG. 14A shows exemplary Ti nanoparticles before an exemplary monolayer $Al_2O_3$ coating by sol-gel is formed. The SEM image in FIG. 14B shows the exemplary Ti nanoparticles after the monolayer $Al_2O_3$ coating by sol-gel is formed on the particles. The TEM image in FIG. 14C shows a 2 nm-thick protective coating over the nanoparticles.

In some aspects of the disclosed SSC technology, a spectrally selective coating can include bandgap-adjusted semiconductor particles with geometries on the nanometer and/or micrometer scale. In some embodiments, for example, the SSC can include nanoparticles (NPs) and/or microparticles (MPs) of semiconductor materials, refractory semiconductor materials, and/or metal materials deposited on a highly IR reflective surface, which can either be in the form of standalone NPs/MPs or embedded in a dielectric ceramic matrix. For example, the spectrally selective coating can be configured such that the optical bandgap wavelength of the exemplary bandgap-adjusted semiconductor particles is adjusted to the level between 1.1 and 1.6 μm, e.g., such that a substantial portion of the ultraviolet light, visible light and a part of near infrared light energy is absorbed, while a substantial portion of the longer wavelength infrared energy is transparent to the exemplary bandgap-adjusted semiconductor particles and is reflected by the exemplary metallic substrate underneath. For example, the NPs/MPs can be fabricated to a controllable size (e.g., which can range between 10 nm-100 μm in some examples, or up to 2 μm in other examples) by spark erosion or other particle fabrication methods, e.g., including, but not limited to, chemical synthesis, DC or RF plasma synthesis, vapor deposition, spray pyrolysis, mechanical pulverization, atomization, among others. Exemplary materials to form the NPs/MPs can include semiconductors (e.g., such as Si, Ge, SiGe, silicon borides, metal silicides, PbTe, PbSe, PbS, etc.), as well as metals (e.g., such as W, Cr, Ni, Mo, etc.). The exemplary SSC coating can be accompanied with water or organic solvent that is eventually dried, or with dielectric materials, e.g., such as glass. The exemplary SSCs can be coated onto a surface of, for example, a solar receiver device, by exemplary techniques that include, but are not limited to, e.g., spin coating, drop casting, spray coating, and inkjet printing, among others. Another exemplary technique to coat the exemplary SSC on a surface of a solar receiver device can include using a host matrix, e.g., such as a precursor spin-on-glass, precursor spin-on-alumina or other or sol-gel type precursor, together with water or solvent so as to form a slurry or paste that can be applied onto a flat or round surface of the targeted solar receiver device, e.g., such as a stainless steel HTF-carrying tube surface.

For example, the bandgap of the semiconductor nanoparticles can be adjusted by alloying, e.g., such as Ge doping into Si semiconductor so as to alter the bandgap wavelength (e.g., cut-off wavelength). The exemplary bandgap-adjusted semiconductor nanoparticles can ensure that most of the UV-Vis solar spectrum energy is absorbed while the undesirable blackbody radiation (e.g., emission loss) is minimized since the semiconductors can exhibit high optical transparency for the light spectrum having lower energy than the bandgap energy, e.g., in the wavelength range beyond the cut-off wavelength, such as the IR regime. By controlling and/or optimally-positioning the bandgap of the semiconductor materials used in the disclosed SSCs, exemplary CSP systems that employ the disclosed SSC technology can utilize sunlight energy more efficiently and operate at a higher temperature, and hence at a much higher efficiency and lower cost.

In some aspects of the disclosed technology, a spectrally selective coating includes a base layer formed of a composite material including conductive oxide based semiconductors nanoparticles dispersed in a dielectric material, the base layer capable of attaching to a substrate formed of a light absorbing material, and a surface layer formed over the base layer and structured to form pillar structures extending outward, the surface layer formed of the composite material, in which the distribution of conductive oxide based semiconductors nanoparticle per volume in the dielectric material includes less nanoparticles in the surface layer than that of the base layer.

For example, the conductive oxide based semiconductor nanoparticles can be structured to include nanoscale dimensions, e.g., including 5-500 nm for some applications, or 10-200 nm for other applications, as these oxides can be very stable on high temperature air exposure (e.g., such as in the 600-1200° C. operation of parabolic trough type CSP systems or solar tower type CSP systems).

The bandgap energy of Si is $E_g$~1.07 eV (optical wavelength bandgap ~1.0 μm). As the major part of the solar spectrum extends to 1.2-1.5 for example, it can be desirable to have the optical wavelength bandgap (e.g., cutoff wavelength) of the light absorbing semiconductor to be adjusted toward this 1.2-1.5 μm wavelength regime, so that as much of the solar spectrum can be absorbed. However, if the cutoff wavelength is altered too much, for example, the IR emission loss can be increased. The disclosed SSCs technology can include techniques to adjust the bandgap of the SSC-materials to optimize the spectral selectivity of the spectrally selective coatings. For example, silicon materials or any semiconductor that can be used as the SSC material can be engineered to have an adjusted bandgap set to an optimal value so that the enhanced absorptivity of the sunlight spectrum is balanced with reduced IR emission loss. For example, such bandgap of Si adjustments can be implemented by suitable amount of alloying, e.g., such as alloying of Si with Ge, as the pure germanium has a lower bandgap of $E_g$~0.74 eV. For example, if Si is doped with 20 atomic % Ge (into an exemplary $Si_{0.8}Ge_{0.2}$ stoichiometry), the bandgap can be altered to $E_g$~1.04 eV (equivalent to optical wavelength bandgap of ~1.22 μm). In some examples, for 30 atomic % Ge doping (into an exemplary $Si_{0.7}Ge_{0.3}$), stoichiometry), the bandgap can be altered to $E_g$~0.9 eV (equivalent to optical wavelength bandgap of ~1.50 μm). In other examples, the bandgap of Si can be reduced by at least 5%, or in other examples by at least 10%, or in other examples by at least 20% by alloying with Ge. Si can be modified to $Si_xGe_{1-x}$ where x=0.05-0.40. The use of alloying elements other than Ge is not excluded.

In some aspects, the disclosed technology includes enhanced light absorption structures by gradient refractive index SSC layer or porous SSC layers.

The disclosed SSC technology includes techniques to create gradient refractive index for maximum absorption (minimal reflection) of sunlight. For example, such desirable gradient structures can be formed by utilizing size-distributed semiconductor particles or employing patterning of relatively uniform-sized semiconductor particles in a composite structure, e.g., based on glassy or silica based matrix. In some embodiments, for example, porous structures can be formed from these structures, or alternatively for example, the cured SSC layer can be partially etched by chemical etchant or plasma etching, e.g., such as reactive ion etching (RIE).

Figure 15A:
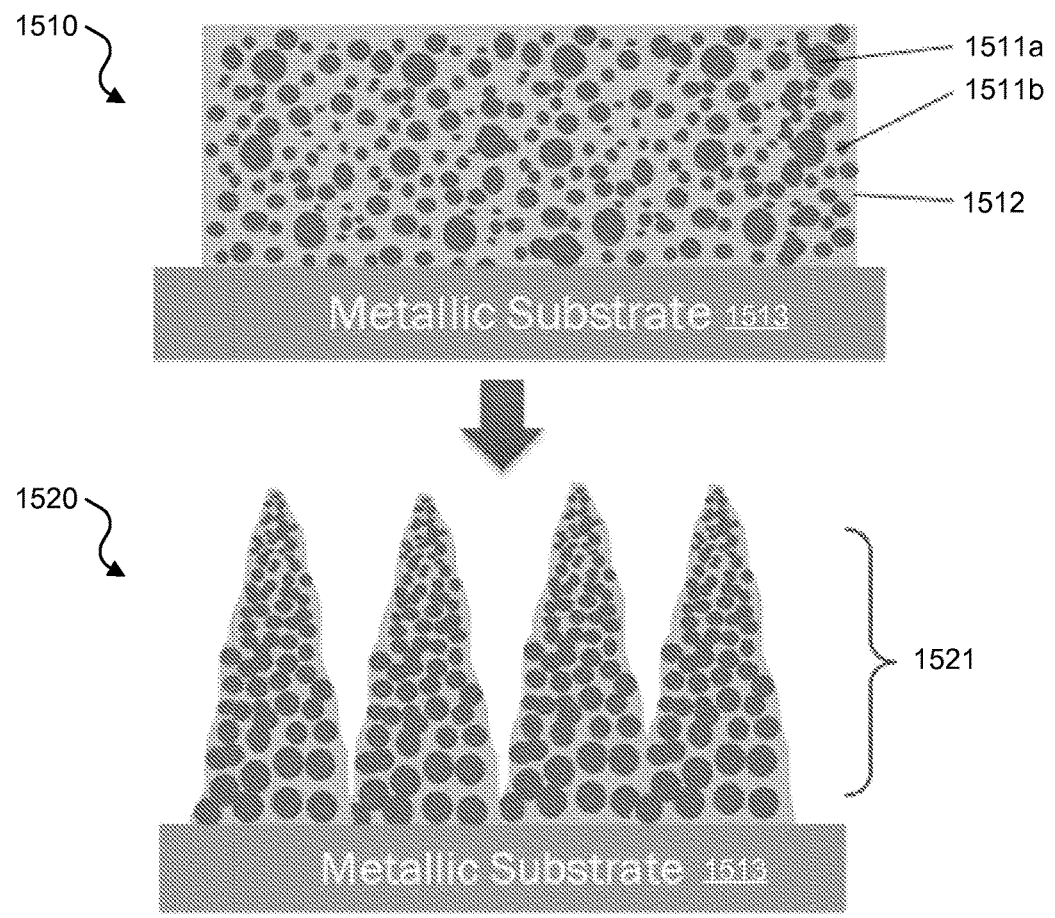
FIGS. 15A and 15B show schematic illustrations of processes and structures for the self-patterning and layer-by-layer coating of exemplary SSC layers.
Figure 15B:
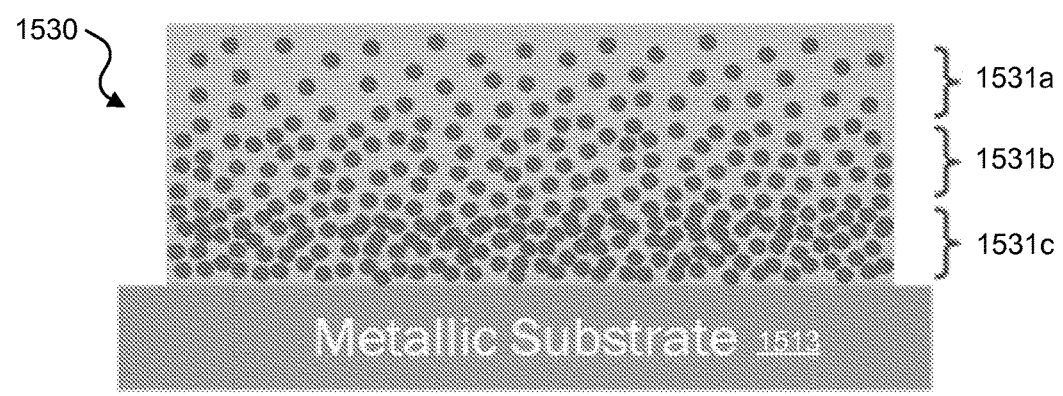

FIGS. 15A and 15B show schematic illustrations of processes and structures for the self-patterning of exemplary SSC layers by utilizing distributed-size particles of light-absorbing semiconductor materials (FIG. 15A) and layer-by-layer coating to create exemplary gradient particle-density SSC layers (FIG. 15B), e.g., with gradually decreasing refractive density from bottom to the top for enhanced light absorption (e.g., GRIN structure with reduced reflection).

FIG. 15A shows a process to produce a self-patterned SSC having a particular size-distribution of nanoparticles of a light-absorbing semiconductor material or materials. As illustrated by the SSC layer 1510 coated over a metallic substrate 1513, particles of various sizes 1511a and 1511b are mixed within a host glass precursor matrix 1512, e.g., such as a liquid form spin-on-glass to form a slurry or paste, which can then be coated onto the metallic substrate 1513 (e.g., such as a metallic tube that can carry the solar-heated heat transfer fluid (HTF) to a power generation station to produce steam for turbine engine). The coating of the SSC layer 1510 on the metallic substrate 1513 can be implemented by painting, spray coating, or brush coating, among other techniques. Exemplary metals of the metallic substrate 1513 can include stainless steels, e.g., such as Inconel type Ni base superalloys or other metal alloy materials. After the slurry is coated, the larger particles 1511a sink first in the liquid mixture coated layer 1510, followed by smaller particles 1511b, thus forming a gradient geometry structure, which produces a gradient refractive index structure as illustrated by the SSC layer 1520 coated over a metallic substrate 1513, in which the GRIN structure can enhance the sunlight absorptivity of the SSC based device. The self-patterned particle size-distributed SSC layer 1520 can further be structured to include pillar structures 1521, e.g., by partially etching by chemical etchant or plasma etching by RIE. In some examples, a desired particle size variation can be configured from ~20 nm to 2 μm, for example, with the volume fraction of the 20 nm to 100 nm regime being at least 10%, the volume fraction of the 100 nm to 500 nm regime being at least 10%, and the volume fraction of the 500 nm to 2 μm regime being at least 10%. In some examples, a desired average lateral dimension (e.g., one half periodicity) of the gradient structure can be configured to be at least 10 μm, or in some examples at least 50 μm. In some examples, a desired thickness of the cured SSC layer 1520 can be configured to be in the range of 0.1 to 1,000 μm, and in some examples 1 to 200 μm, or 5 to 50 μm. In some examples, a desired average depth of the gradient structure can be configured to be at least 10%, or in other examples at least 30% of the total thickness of the SSC layer. For example, for an enhanced light absorbing SSC structure by using a self-patterning particle size distributed and resultant gradient structure SSC, various semiconductor material types with bandgap adjusted state can be utilized, e.g., including, but not limited to, $Si_xGe_{1-x}$ compound, $\beta\text{-}(Si_xGe_{1-x}B)_y$ compound, or the $(\beta\text{-}SiB_3)_x(\alpha\text{-}SiB_3)_{1-x}$ compound, with x=0.02-0.40 can be utilized. The use of other semiconductors or metal can also be utilized as well. Such a gradient SSC structure can achieve solar absorptivity $\alpha_{S,eff}$, e.g., in a range of 0.98 and greater, or in some examples in a range of 0.95 or greater, and an IR emissivity $\varepsilon_{IR,eff}$, e.g., in a range of 5% or lower, or in some examples in a range of 3% or lower, and in some examples not requiring as low IR emissivity property, e.g., in a range of 20% or lower.

The layer-by-layer coated SSC layer 1530 of FIG. 15B includes three SSC layers 1531a, 1531b, and 1531c with gradually decreasing refractive density from bottom to the top for enhanced light absorption. The SSC layer 1530 includes the multiple layers 1531a, 1531b, and 1531c having varying particle-density in the silica or other transparent dielectric matrix of the respective layer to form the exemplary GRIN structure. For example, the layer 1531a has a lower particle density than the layer 1531b, which has a lower particle density that the layer 1531c. Other examples of the SSC layer 1530 can include at least 6, e.g., in which each layer is 5 μm-thick or less, or in which each layer is configured to be 10 μm-thick or less. There are no limitations to the number of layers with gradually decreasing refractive density that can be produced, and the number of layers can be chosen based on application-related parameters.

Figure 16:
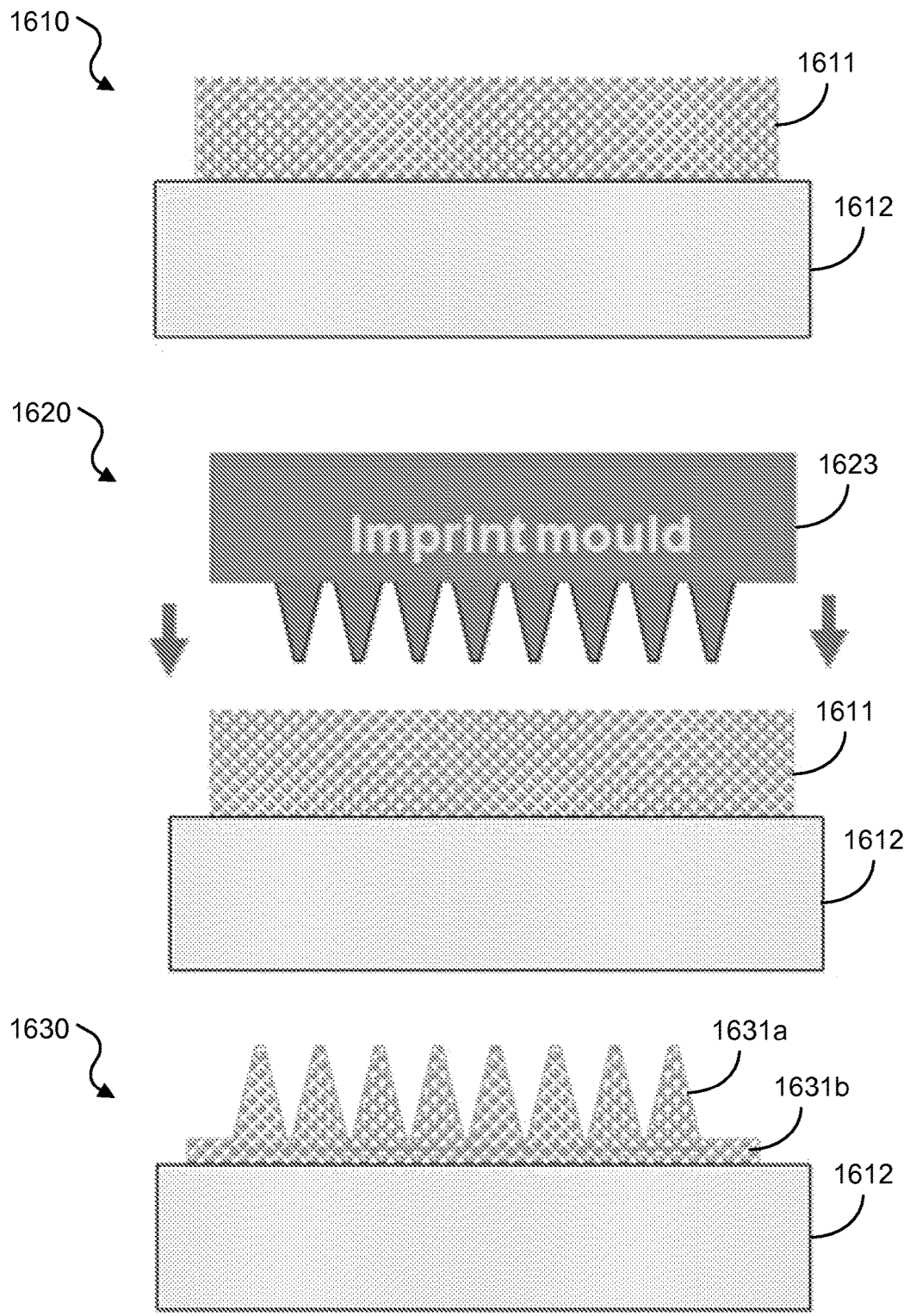
FIG. 16 shows a schematic illustration of an exemplary process to pattern an exemplary SSC layer slurry by imprinting techniques.

FIG. 16 shows a schematic illustrations of processes to pattern an exemplary SSC layer slurry by imprinting techniques. A SSC slurry-coated substrate 1610 is shown, including a slurry 1611 of SSC based light-absorbing semiconductor nanoparticles in a host glassy liquid matrix (e.g., such as spin-on-glass) on a substrate 1612 (e.g., such as a metal substrate). For example, the particles of the SSC slurry 1611 do not need to have size distributed variations in this exemplary case. An imprinting process 1620 includes using an imprint mould 1623 (e.g., such as a flat stamp, or roller coat stamp, as shown later in FIG. 17) to form a pattern of structures into the SSC slurry 1611. In some examples, the imprint mould 1623 includes an elastomeric backing for compliant surface to apply a more uniform SSC layer coating (e.g., containing semiconductor particles such as Si or Si—Ge). The patterning of the structures formed by the imprinting process 1620 can be periodic or random. The process 1620 of patterning can include a single step imprint patterning using the mould 1623 of protruding array of sharp pillars or an array of recessed cavity having an inverse sharp pillars. Alternatively, for example, two-step imprinting can be utilized with intersection line patterns so that a protruding pillar structure array can be made. Implementations of the process 1620 can further include drying or curing of the imprinted SSC slurry 1611 to produce an exemplary (solid)

SSC device 1630 including a layer of gradient structured pillars 1631a and a uniform base layer 1631b over the substrate 1612.

Figure 17:
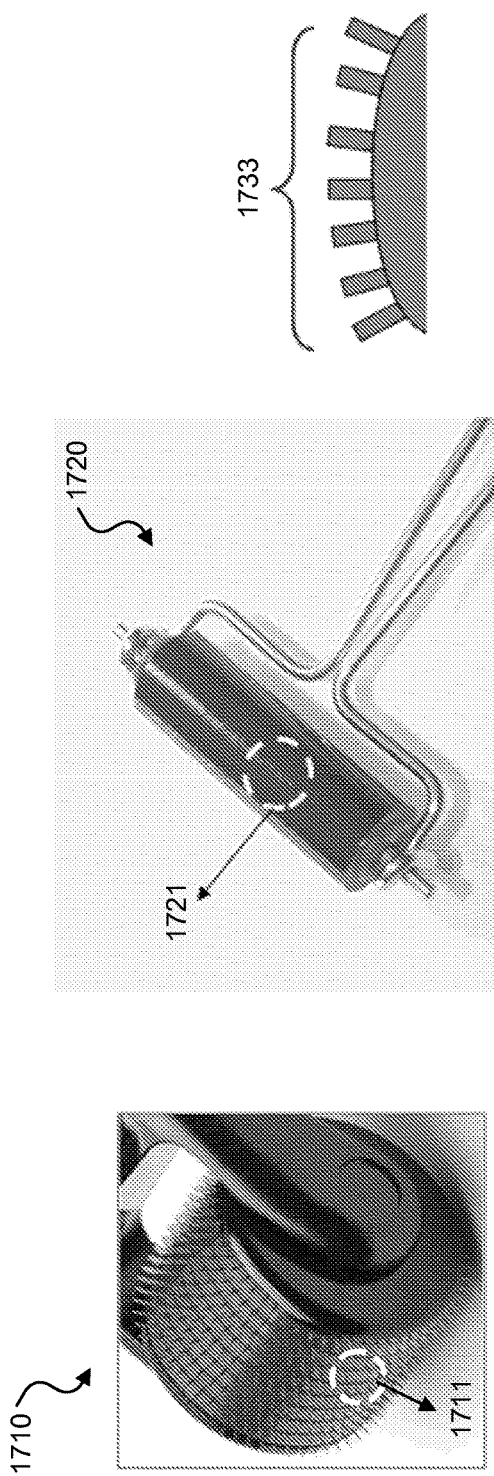
FIG. 17 shows images and schematics of exemplary roller imprinters having protruding surface microneedle arrays for roll imprinting onto an exemplary coated SSC slurry.

FIG. 17 shows images and schematics of exemplary roller imprinters 1710 and 1720 having protruding surface 1711 and 1721 of microneedle arrays (or, for example, micro-ridges and/or micro-pores) for roll imprinting onto an exemplary coated SSC slurry. For example, pillars or crisscross ridges 1733 on the roller 1710 or 1720 can be pre-coated with Teflon for non-sticky characteristics. A gradient structure of a fabricated SSC can be obtained by implementing imprinting processing techniques using the roller imprinter 1710 or 1720, which gives a gradient refractive index structure to the fabricated SSC (e.g., like that shown in FIG. 1B) with enhanced light absorption. In some examples, a desired average lateral dimension (e.g., one half periodicity) of the gradient structure can be configured to at least 10 μm, or in other examples to at least 50 μm. In some examples, a desired thickness of the cured SSC layer can be configured in the range of 0.1 to 1,000 μm, or in other examples 1 to 200 μm, or in other examples 5 to 50 μm. In some examples, a desired average depth of the gradient structure can be configured to at least 10%, or in other examples to at least 30% of the total thickness of the SSC layer. For example, unlike the example of self-patterning in FIG. 15A, the present case of imprint patterning in FIG. 17 can create a gradient structure in which the particle size does not need to have a large distributed particle size variation. Instead, for example, the particle size can be a more uniform nanoparticle size. In some examples, the average size of the light absorbing semiconductor or metallic particles can be configured in the range of 10-500 nm, or in other examples in the range of 30-200 nm, or in other examples in the range of 50-200 nm.

Figure 18:
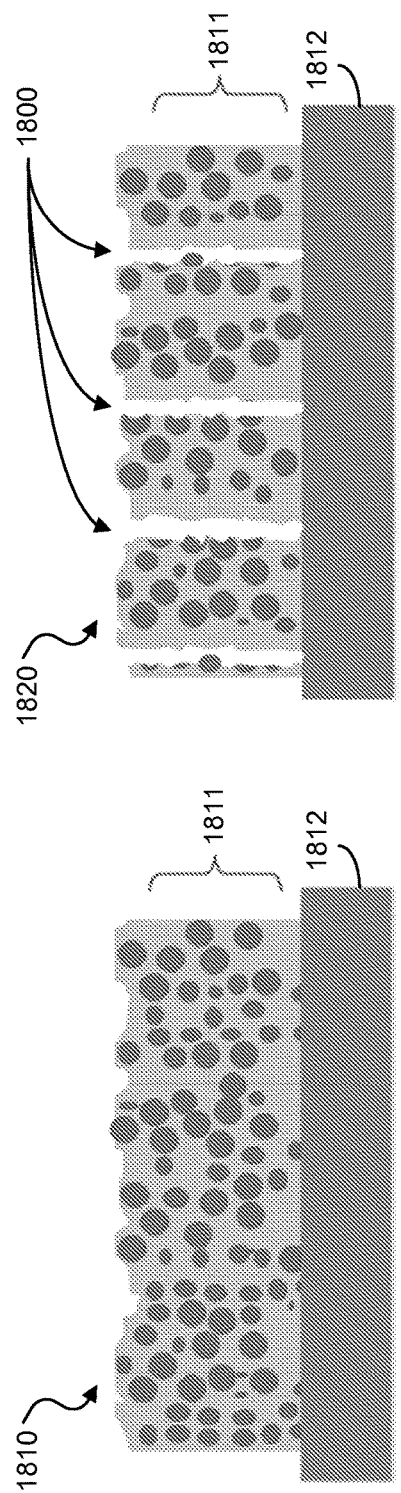
FIG. 18 shows schematic illustrations of exemplary SSC coated surfaces including surface roughness with pore formations.

FIG. 18 shows schematic illustrations of exemplary SSC coated surfaces including surface roughness with pore formations, e.g., porous, light absorbing structures formed by partial etching of the host matrix, e.g., using chemical or plasma etching, to enhance light absorption and reduce reflection. In one example, a SSC coated surface 1810 can include an SSC layer 1811 including exemplary SSC based light-absorbing semiconductor nanoparticles (e.g., Si or Si—Ge nanoparticles) or metallic nanoparticles in an exemplary host glassy liquid matrix (e.g., such as spin-on-glass) on a substrate 1812 (e.g., such as a metal substrate). The surface of the SSC layer 1811 can be made more light absorbing (less reflecting) by intentionally etching at least the upper portion of the composite SSC structure 1811 to form pore structures 1800, after the SSC slurry is coated, dried and/or cured, as shown by the illustration of a porous SSC coated structure 1820. The porous structures 1800 can be formed by partially removing the host material, e.g., by chemical etchant or plasma etching such as reactive ion etching (RIE). In some examples, such as when the SSC particles are made of Si or SiGe and when the host matrix is silica, a hydrofluoric acid can be used to etch some portion of the silica to create a rough structured SSC layer, which gives enhanced light absorption. The exemplary RIE process can be selected so as to preferentially etch the silica matrix. In some examples, a desired thickness of the cured SSC layer can be configured in the range of 0.1 to 1,000 μm, or in other examples 1 to 200 μm, or in other examples 5 to 50 μm. In some examples, a desired etched depth can be configured to be at least 10%, or in other examples at least 30% of the thickness of the SSC layer.

In some aspects, the disclosed SSCs can include light-absorbing semiconductor nanoparticles embedded in an dielectric oxide matrix, which can delay the oxidation of the semiconductor nanoparticles. Yet, in some aspects, the disclosed SSCs can include—absorbing semiconductor nanoparticles themselves having oxidation resistance. Exemplary embodiments are described for nanoparticles including engineered oxidation-resistant properties.

In one exemplary embodiment, the light absorbing nanoparticles can be configured as β—$SiB_3$ type boride nanoparticles. In another exemplary embodiment, the light absorbing nanoparticles can be configured as oxide-based semiconductor nanoparticles. In another exemplary embodiment, the light absorbing nanoparticles can be configured as core-shell structure nanoparticles, e.g. in which the shell structure can function to protect the core semiconductor nanoparticle (e.g., such as a Si-based core particle). In another exemplary embodiment, the light absorbing nanoparticles can be configured as core-shell protected oxide or other ceramic semiconductor nanoparticles. In another exemplary embodiment, the light absorbing nanoparticles can be configured as core-shell protected metallic nanoparticles. These exemplary high temperature durable embodiments are described in more detail as follows.

β—$SiB_3$ Type Boride Nanoparticles

There are several silicon boride compounds with different stoichiometry. For example, for a $SiB_3$ stoichiometry, both α-$SiB_3$ form and β-$SiB_3$ form compound exist. The β-$SiB_3$ is a compound having a good oxidation resistance. However, β-$SiB_3$ is a wide bandgap semiconductor (e.g., having the bandgap energy $E_g$~2 eV with the corresponding optical bandgap wavelength of ~0.5-0.6 μm regime), which can be too low to enable the absorption of most of the solar spectrum energy. The exemplary β-$SiB_3$ type boride nanoparticles of the disclosed technology include an adjusted bandgap of the β-$SiB_3$, e.g., adjusted with Ge or other element doping, such that the bandgap is reduced by at least 5%, or in other examples at least 10%, or in other examples at least 20%, as compared to the β-$SiB_3$ compound. For example, for reducing the bandgap, the β-$SiB_3$ can be modified to β-$(SiB_xGe_{1-x}B)_y$, e.g., where x=0.05-0.50, and y=nominally 3 but can have a range of 2-8. The use of alloying element other than Ge is not excluded.

Additionally, for example, another embodiment of bandgap adjusted β-$SiB_3$ type boride nanoparticles can include a mix of it with low bandgap material α-$SiB_3$ which has a very small bandgap of $E_g$~0.2 eV. For example, the exemplary bandgap adjusted semiconductor has a composition of (β-$SiB_3$)$_x$(α-$SiB_3$)$_{1-x}$ where x=0.02-0.40, or in some examples x=0.05-0.15. For example, unless gravity-induced particle segregation is utilized to produce self-assembly gradient GRIN structure, the particle size does not need to have a large distributed size variation. Instead, for example, the particle size of the exemplary β-$(SiB_xGe_{1-x}B)_y$ structure or the exemplary (β-$SiB_3$)$_x$(α-$SiB_3$)$_{1-x}$ structure can be of more uniform nanoparticle size. In some examples, the average size of the light absorbing semiconductors of these types can be configured in the range of 10-500 nm, or in other examples in the range of 30-200 nm, or in other examples in the range of 50-200 nm. Such a nanoparticle-based SSC structure of the exemplary β-$(SiB_xGe_{1-x}B)_y$ structure or the exemplary (β-$SiB_3$)$_x$(α-$SiB_3$)$_{1-x}$ can achieve solar absorptivity $α_{S,eff}$, e.g., in a range of 0.98 and greater, or in some examples in a range of 0.95 or greater, and an IR emissivity $ε_{IR,eff}$, e.g., in a range of 3% or lower, or in some examples in a range of 5% or lower, and in some examples not requiring as low IR emissivity property, e.g., in a range of 20% or lower.

Oxide-Based Semiconductor Nanoparticles

In some examples, a bandgap-adjusted semiconductor material can include transition metal oxides or ferrites, e.g., such as Ni ferrite, Zn ferrite, Mn ferrite, Cu-ferrite, Ni—Zn ferrite, Mn—Zn ferrite, Ba-hexaferrite, Sr-hexaferrite, cuprate based oxide compounds such as La—Ba—Cu—O, Y—Ba—Cu—O, and manganite based perovskite based oxide compounds such as La—Ca—Mn—O, La—Sr—Mn—O, or other La-oxide based variations such as La—Sr—Co—O cobaltites and La—Sr—Ni—O nickelites, e.g., which can be configured with an average diameter less than 200 nm, and can be utilized as sunlight absorbing SSC layer as long as they are non-widebandgap semiconductors and their particle size is made small to the desired size range according to the disclosed technology.

In some examples, a desired bandgap energy for these oxide semiconductors for SSC applications can be configured to be less than 2 eV, or in some examples less than 1.5 eV, or in some examples less than 1 eV. In some examples, a desired nanoparticle size can be configured in the range of 10-500 nm, or in some examples in the range of 30-200 nm, or in some examples in the range of 50-200 nm. Such an exemplary oxide-based nanoparticle semiconductor SSC structure can achieve solar absorptivity $\alpha_{S,\mathit{eff}}$, e.g., in a range of 0.98 and greater, or in some examples in a range of 0.95 or greater, and an IR emissivity $\varepsilon_{IR,\mathit{eff}}$, e.g., in a range of 5% or lower, or in some examples in a range of 3% or lower, and in some examples not requiring as low IR emissivity property, e.g., in a range of 20% or lower. The stoichiometry of the elements, crystal structures and oxygen contents can be selected in such a way that the oxide semiconductors remain stable at 600-900° C. operations of CSP and other solar thermal applications.

In some examples, desired composition ranges for the SSC sunlight absorption for the transition metal oxide semiconductors such as Fe oxide (e.g., FeO) or a mixed oxide ferrite semiconductors such as Ni ferrite, Zn ferrite, Mn ferrite, Cu-ferrite, Ni—Zn ferrite, Mn—Zn ferrite, can be represented with the formula of $(M_xZn_{1-x}FeOFe_2O_3)$, where M is Ni, Mn, or Cu or their combination, with an exemplary range of x=0.4-0.8. In some examples, desired composition ranges for the SSC sunlight absorption for Ba-hexaferrite or Sr-hexaferrite based semiconductor oxides can be represented with the formula of $BaO.6Fe_2O_3$, $SrO.6Fe_2O_3$, or $(Ba_xSr_yO.6Fe_2O_3)$, where the desired range of x or y=0.2-0.8 and x+y=1. Partial substitutions of Ni, Mn, and Zn in the Ni, Mn, Zn containing ferrites with other transition metals or Group II elements in the periodic table, or partial substitutions of Ba and Sr in the hexaferrites with other Group II elements or transition metal elements may also be permissible.

The exemplary cuprate oxide based semiconductors, for example, $Y_1Ba_2Cu_3O_{7-\delta}$, is a superconductor at cryogenic temperatures, but is a semiconductor at room temperature or higher temperatures, as long as the oxygen stoichiometry is kept with the (7−δ) value close to ~6.9, with the δ value approximately in the range of 0.05-0.2, or in some examples 0.07-0.13. A partial substitution of the rare earth element Y with other elements such as La, Dy, Sm, and a partial substitution of Ba with Ca or Sr may also be permissible.

In some examples, the desired stoichiometry of the La—Ca—Mn—O based semiconductor compound is represented with the formula of $La_{1-x}Ca_xMnO_3$, (where the desired value of x=0.1-0.5, or in some examples x=0.2-0.4). An exemplary composition of the La—Sr—Mn—O is $La_{1-x}Sr_xMnO_3$ (where the desired value of x=0-0.4). For the La—Sr—Ni—O compound, an exemplary composition is $La_{1-x}Sr_xNiO_3$ (where the desired value of x=0-0.4). For the La—Sr—Co—O, an exemplary desired composition is $La_{1-x}Sr_xCoO_3$ (where the desired value of x=0-0.4). A partial substitution of the rare earth element La with other elements such as Y, Pr, and a partial substitution of the Ca or Sr with Ba can also be useful.

Figure 19:
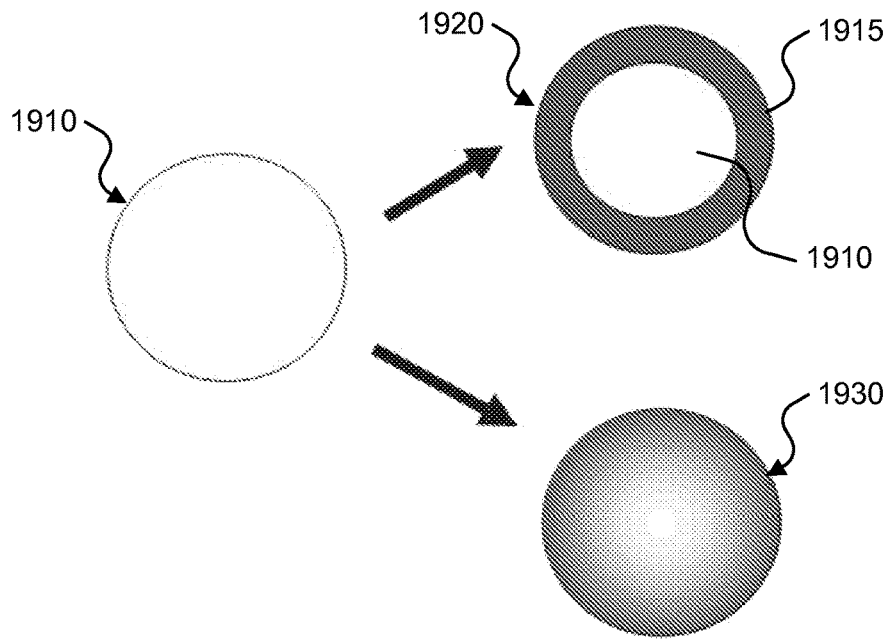
FIG. 19 shows schematic illustrations of exemplary core-shell SSC surface-oxidation-protected SSC nanoparticles.

Core-Shell Structure Nanoparticles to Protect Si Based Semiconductor Nanoparticle Core Structures The bandgap adjusted semiconductor nanoparticles can provide high absorptivity combined with low IR emission according to the disclosed technology. However, for example, for higher temperature operation of concentrating solar power systems or other solar thermal devices, e.g., at above 550° C., or in some examples above 700° C. in air (such as for solar tower application) or in vacuum but with occasional, unavoidable vacuum disruption and exposure to air, it is essential that the nanoparticles in the SSC layer have to be oxidation resistant for many months/years. Semiconductors are typically not known to be strongly oxidation resistant. The disclosed technology includes semiconductor nanoparticles protected from severe oxidation by a surface coating. FIG. 19 shows schematic illustrations of exemplary core-shell SSC surface-oxidation-protected SSC nanoparticles.

FIG. 19 shows a light absorbing SSC nanoparticle 1910 (e.g., which can be fabricated using spark erosion or other methods, and configured to be 50-200 nm in size, and formed of Si or Si—Ge type materials. In other examples, the nanoparticle 1910 can be configured of other metallic or semiconducting nanoparticles. FIG. 19 shows the light absorbing SSC nanoparticle 1910 converted into a core-shell structured, surface-oxidation-protected SSC nanoparticle 1920 including the light absorbing SSC nanoparticle 1910 as the core and a protective, oxidation resistant coating 1915 as the shell. In some implementations, for example, the protective, oxidation resistant coating 1915 can reduce the rate of oxidation of the exemplary core-shell nanoparticle by at least a factor of 3, e.g., based on the presence of the protective shell. For example, the protective coating 1915 can be configured from refractory ceramics based on oxides, borides, fluorides, nitrides, oxyborides, onynitrides, or oxyfluorides. In some implementations, the disclosed technology can include a light absorbing SSC nanoparticle with a gradient shell structure 1930, e.g., instead of sharply defined shell structure 1915 of the particle 1920.

In some examples, a desired size of the core particles ranges can be configured in the range of 10-500 nm, or in some examples in the range of 30-200 nm, or in some examples in the range of 50-200 nm. In some examples, a desired thickness of the shell can be configured to be 5-20% of the core diameter, or in some examples in the range of 5-50 nm. Such a core-shell nanoparticle semiconductor SSC structure can achieve solar absorptivity $\alpha_{S,\mathit{eff}}$, e.g., in a range of 0.98 and greater, or in some examples in a range of 0.95 or greater, and an IR emissivity $\varepsilon_{IR,\mathit{eff}}$, e.g., in a range of 5% or lower, or in some examples in a range of 3% or lower, and in some examples not requiring as low IR emissivity property, e.g., in a range of 20% or lower. The desired thickness of the gradient layer can also be configured to be 5-20% of the core diameter, e.g., in the range of 5-50 nm.

In some implementations of the described core-shell nanoparticle structure, the shell material 1915 can contain either crystalline solid solution, intermetallic compound crystalline solid solution, or amorphous phase, or a mixture of these components. For example, the shell structure 1915 can be borosilicate coating on exemplary Si core particles 1910, with the shell layer 1915 also containing some crystalline Si-boride material such as $SiB_3$, $SiB_6$ or $SiB_n$ in general, and/or crystalline Si phase. For example, as amorphous and glassy shell can offer more tight protection against continuous oxidation of the core on exposure to high temperatures, the disclosed technology also can include a process to produce such predominantly amorphous shell structure, for example, by pre-exposure to a high temperature under oxygen-containing atmosphere (with oxygen content being at least 5% in the heat treating atmosphere), e.g., at 600-1200° C. for 0.1-24 hrs. For the exemplary case of the predominantly amorphous shell structure, according to the disclosed technology, the amount of the amorphous phase in the shell can be configured to be at least 50% in volume, or in some examples at least 70%, or in some examples at least 85%.

For example, a spectrally selective coating includes a base layer formed of a composite material including SSC light absorber core-shell nanoparticles dispersed in a dielectric material, the base layer capable of attaching to a substrate formed of a light absorbing material, and a surface layer of the composite material formed over the base layer and structured to form pillar structures extending outward, in which the distribution of nanoparticles per volume in the dielectric material includes less nanoparticles in the surface layer than that of the base layer, and in which the surface layer and base layer form a coating capable of absorbing solar energy in a selected spectrum and reflecting the solar energy in another selected spectrum.

In some implementations of the exemplary spectrally selective coating, for example, the SSC light absorber core-shell nanoparticles are configured to be 20-500 nm in size, or in some examples 50-200 nm in size, and having a semiconductor nanoparticle or other metallic nanoparticle core structure, and the shell can be configured to contain at least one or more of the single phase crystalline, intermetallic compound, or amorphous ceramic shell, or a multi-phase mixture of these phases, in a well boundary-defined shell structure or a gradient shell structure.

In some implementations of the exemplary spectrally selective coating, for example, materials of the core nanoparticle can include Si, Si—Ge, other semiconductor element or alloys having an optical bandgap wavelength of at least 1 μm, or in other examples at least 1.3 μm, or metallic nanoparticles including, for example, refractory metals like Zr, Nb, Mo, Hf, Ta, or W or transition metals such as Ti, V, Cr, Mn, Fe, Co, Ni, Cu or their alloys.

In some implementations of the exemplary spectrally selective coating, for example, materials of the shell structure can include ceramic materials, e.g., including Si boride, Zr boride, Al-oxide, etc., and/or the shell structure material containing either crystalline solid solution, intermetallic compound crystalline solid solution, or amorphous phase, or a mixture of these components. For example, the chemistry of the exemplary shell structure material can include oxides, borides, silicate, fluorides, nitrides, oxyborides, onynitrides, oxyfluorides, or borosilicate.

In implementations when the shell structure is configured as a borosilicate coating on silicon core nanoparticles, the shell structure can also contain some crystalline Si-boride material such as $SiB_3$, $SiB_6$ or $SiB_n$ in general, as well as crystalline Si phase, with the shell structure including a predominantly amorphous shell structure, e.g., in which an exemplary desirable amount of the amorphous phase in the shell structure can be configured to be at least 50% in volume, or in other examples at least 70%, or in other examples at least 85%.

In some implementations of the exemplary spectrally selective coating, for example, the shell structure can be formed over the core nanoparticles by techniques including soaking of the nanoparticles in molten salt (e.g., sodium borohydride); and/or pre-exposure to a high temperature under oxygen-containing atmosphere (e.g., with oxygen content being at least 5% in the heat treating atmosphere), e.g., at 600-1200° C. for 0.1-24 hrs.

Figure 20:
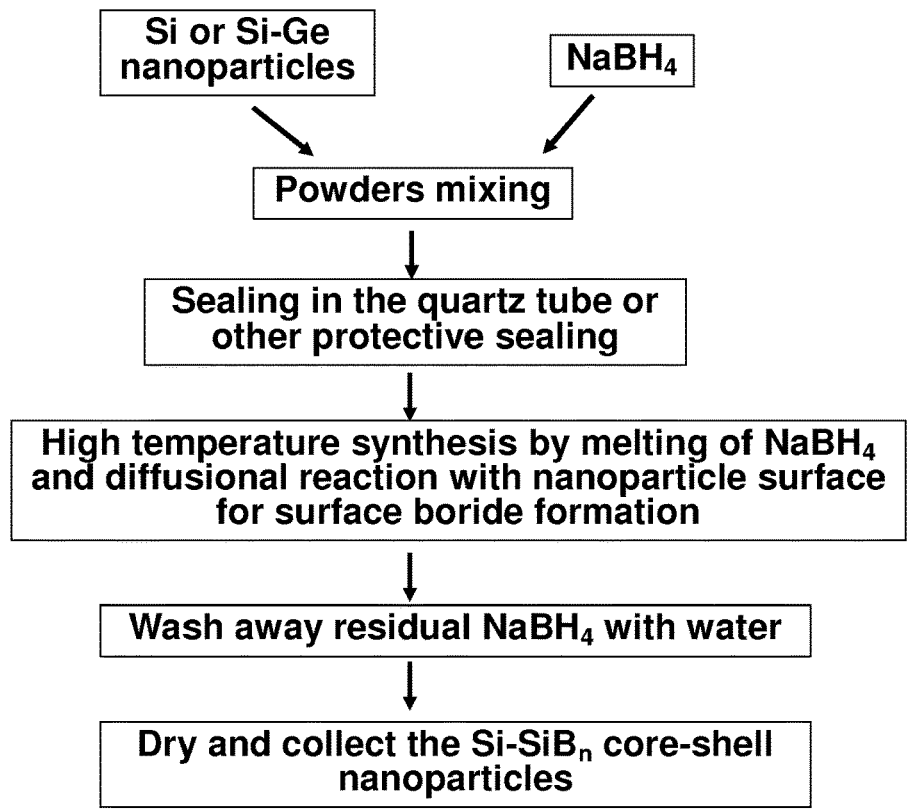
FIG. 20 shows an exemplary process diagram for fabrication of Si—Si boride core-shell nanoparticles by reaction with molten sodium borohydride salt.

FIG. 20 shows an exemplary process diagram for fabrication of Si—Si boride core-shell nanoparticles by reaction with molten alkaline borohydride salt (e.g., sodium borohydride salt). The process can include mixing Si or Si—Ge nanoparticles (e.g., average particle size ~100 nm) and $NaBH_4$ particles, in which the mixing includes mechanical grinding in a mortar with Ar atmosphere. In some examples, the relative amount of $NaBH_4$ can be 50 to 95 wt % in the mixture of Si and $NaBH_4$ powders. The mixed powder material can then be placed inside a ~1.5 cm diameter quartz tube in Ar gas atmosphere, in which the tube is sealed, e.g., by heating with a torch flame. The sealed quartz tube can then be heat-treated, e.g., at 500° C. for 3 days, to synthesize the silicon boride shells on Si nanoparticle surfaces. After the high temperature synthesis, residual $NaBH_4$ can be dissolved, e.g., with D.I. water, and then the produced Si—$SiB_n$ core-shell nanoparticles can be centrifuged and collected.

Figure 21:
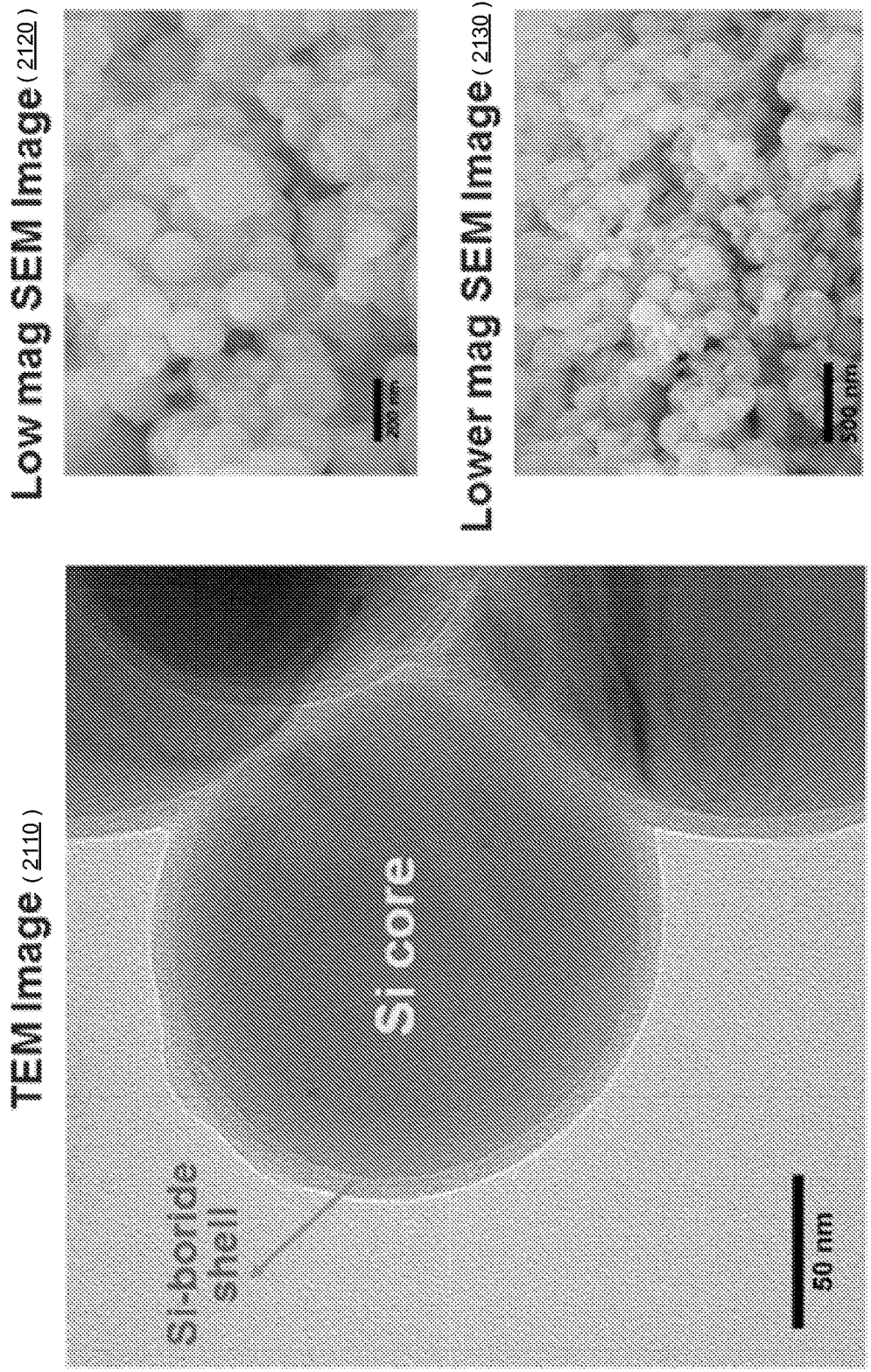
FIG. 21 shows TEM and SEM images of exemplary Si—$SiB_n$ core-shell nanoparticles.

FIG. 21 shows TEM and SEM images of exemplary Si—$SiB_n$ core-shell nanoparticles synthesized by exposure of Si nanoparticles to molten sodium borohydride salt. FIG. 21 includes a TEM image 2110 showing the Si boride shell structure, e.g., 5-15 nm thick, which is conformal and well defined. FIG. 21 includes a low magnification SEM micrograph 2120 showing the general particle size distribution of the exemplary Si—$SiB_n$ core-shell nanoparticles. FIG. 21 also includes a lower magnification SEM image 2130 (than that of the image 2120) also showing the exemplary Si—$SiB_n$ core-shell nanoparticles.

Figure 22A:
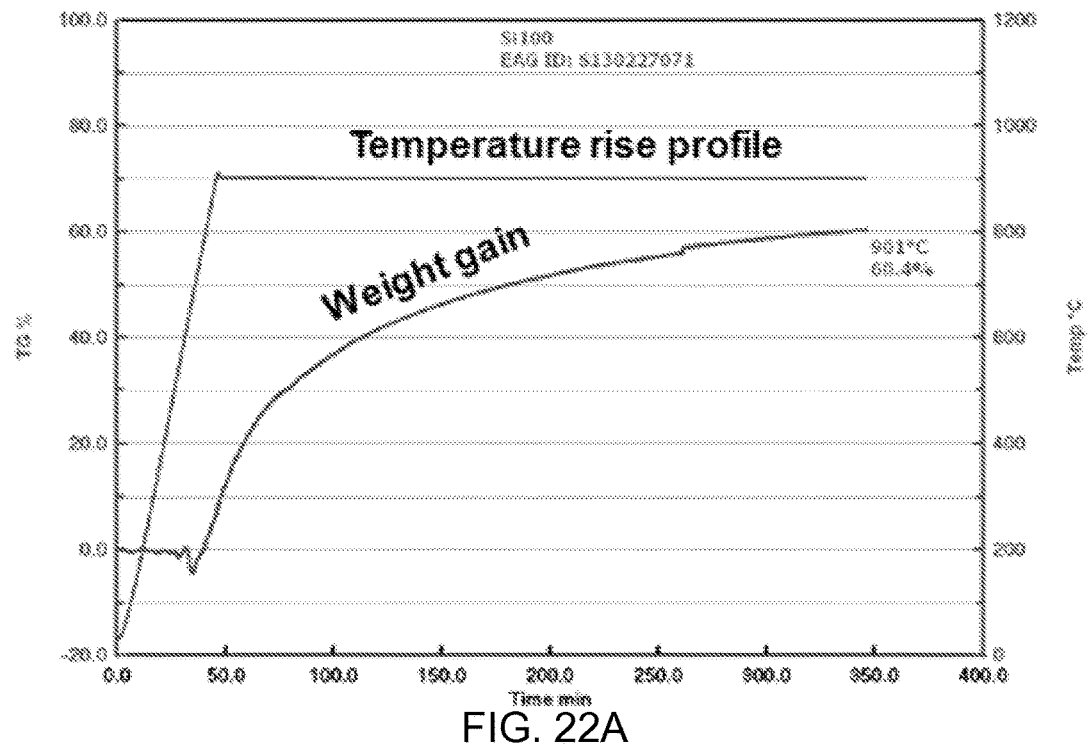
FIGS. 22A and 22B show plots of thermogravimetric analysis (TGA) for exemplary silicon boride ceramic-shell-coated Si nanoparticles and bare Si nanoparticles.
Figure 22B:
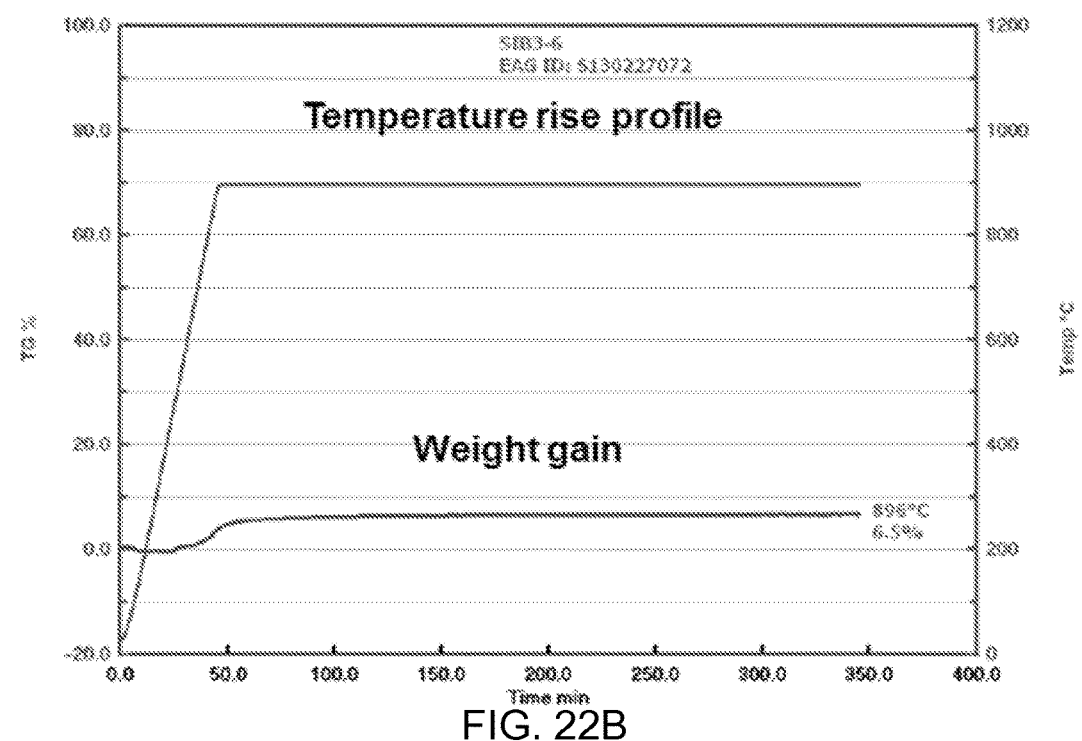

FIGS. 22A and 22B show plots of thermogravimetric analysis (TGA) data at 900° C./6 hr in pure $O_2$ atmosphere for the exemplary silicon boride ceramic-shell-coated Si nanoparticles as compared to bare Si nanoparticles (e.g., average particle size ~100 nm). FIG. 22A shows the TGA profile of the exemplary Si nanoparticles. FIG. 22B shows the TGA profile of the exemplary boride-coated Si NPs. The oxidation resistance of these core shell nanoparticles was tested using TGA to measure the weight gain on high temperature oxidation. For accelerated testing a higher temperature of 900° C./6 hr (e.g., a much higher temperature than the desired high temperature operation temperature of an exemplary CSP system, e.g., at 700° C. or greater), pure oxygen (rather than the air atmosphere) was employed. The accelerated oxidation test in $O_2$ by TGA analysis indicates that ceramic-shell coated Si nanoparticles exhibit a much higher resistance to thermal oxidation than bare Si nanoparticles. The exemplary core shell Si nanoparticles gained ~6.5 wt % during the accelerated oxidation procedure, while the unprotected, bare Si nanoparticles gained ~60.4 wt %, e.g., an order of magnitude smaller oxidation by the core-shell structure. Even this exemplary 6.5% weight gain for the exemplary core-shell structure occurred essentially only during the initial stage exposure to 900° C., followed by very little oxidation afterwards. Therefore, this exemplary 6.5% weight gain may be due to the presence of some portion of the Si particles that were not fully boride coated and hence tend to oxidize away and contribute to most of the observed weight gain, a phenomenon of this example implementation.

In some implementations, for example, the Si boride shell structure can be modified by intentional addition of oxygen, e.g., by annealing in an oxygen-containing atmosphere to form borosilicate type amorphous structured shell. For example, this exemplary embodiment can be employed since borosilicate shell material tends to be glassy and provides a good sealing to minimize further oxygen penetration into the core material, e.g., such as Si or Si—Ge alloy nanoparticles, or metallic nanoparticles containing Si.

In other examples, instead of using a boride shell coating, an aluminum oxide shell coating can be utilized to create the core-shell structure. An example process to make core-shell particles with $Al_2O_3$ shell includes preparing an $Al(NO_3)_3$ solution including a chelating agent ethylene diamine tetra acetic acid (EDTA) and tetra methyl ammonium hydroxide (TMAH), mixing the two solutions, evaporating the solvent (D.I. water), and applying a calcination heat-treatment above 500° C. For example, a first solution can be made by dissolving EDTA, TMAH and $Al(NO_3)_3 \cdot 9H_2O$ with D.I. water. The mole ratio of EDTA and $Al(NO_3)_3 \cdot 9H_2O$ can be set to 1.3, and TMAH can be added to make pH value of solution to be 9~10. A second solution with Si nanoparticles (e.g., having ~100 nm average diameter) can be made by dispersing Si nanoparticles in TMAH aqueous solution with pH 9~10. After mixing the prepared two solutions, a rapid evaporation process can be applied to dry D.I. water and obtain solid powders. Subsequently, a calcination heat treatment can be implemented, for example, at 550° C. for 3 hours in air atmosphere with a furnace to obtain the exemplary $Al_2O_3$ shell (e.g., 5-20 nm shell thickness) coated Si nanoparticles.

The described methods to create a core-shell structure (e.g., such as a silicon boride shell or an aluminum oxide shell) can be applicable to Si, Si—Ge alloy or any other Si based semiconductors and Si based intermetallic compounds, e.g., such as $SiB_3$, $SiB_6$ or generally $SiB_n$. In some examples, the silicon boriding process can be implemented using $NaBH_4$ or $KBH_4$ or a mixed $(Na,K)BH_4$, or a variation of compositions of these borohydride compounds with alloying or substitution with other Group IA elements, Group IIA elements, transition metal elements, or other elements in Group IIIA to Group VIIIA. The boriding can be implemented in a sealed environment, e.g., such as in quartz tubing or in a high pressure metallic chamber. An exemplary boriding temperature can be from 300-900° C., and in some examples from 400-700° C. The boriding time can depend on the reaction temperature and particle surface area. In some examples, the boriding time may be set to 0.1-200 hrs, or in other examples from 1-10 hrs. A variation of the method can include synthesizing oxyborides with the shell containing both boron, silicon and oxygen, for example, through a pre-oxidizing treatment to intentionally consolidate the shell structure and introduce a controlled amount of Si oxyborides layer that is very tightly sealing and protecting the core particles. A gradient shell structure, instead of sharply defined shell structure, can also be produced by this method.

Core-Shell Protected Oxide or Other Ceramic Semiconductor Nanoparticles

Generally, while oxide based semiconductor SSC nanoparticles are stable in oxidizing environment at high temperature, there may be some occasions where even the oxide nanoparticles may need to be further protected by core-shell structuring of the disclosed technology. Some exemplary cases of possible change in oxygen stoichiometry of the oxide SSC nanoparticles at high temperature can include (i) $Fe_2O_3$ nanoparticles may be converted to more oxidized FeO state, (ii) some of the complex oxides such as ferrites, manganites or cuprates are often made of a mixture of FeO and $Fe_2O_3$, e.g., and thus are subjected to possible oxygen content change, and (iii) some oxide semiconductors have substantial oxygen deficiency by design, e.g., as a result of processing environment, or with increased defect density in the material lattice. In these three exemplary cases as well as other possible cases, such oxide or other ceramic semiconductor nanoparticle surface can be protected by a shell structure of the disclosed technology.

Figure 23A:
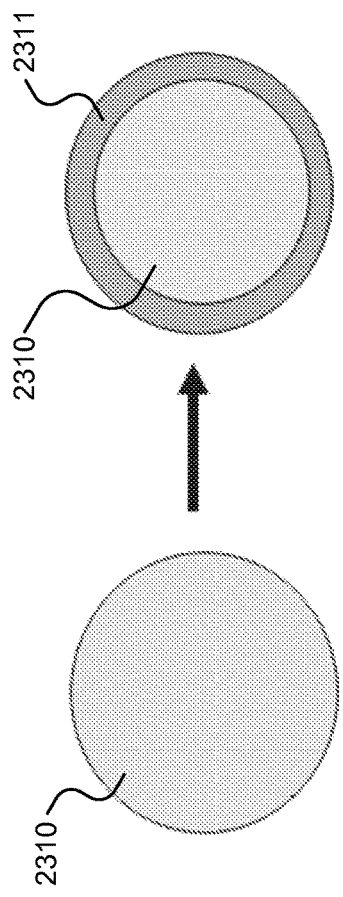
FIGS. 23A-23C show schematic illustrations of exemplary core-shell structures of oxide and/or metal core nanoparticles.
Figure 23C:
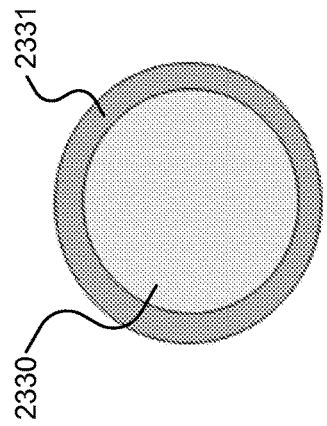
Figure 23B:
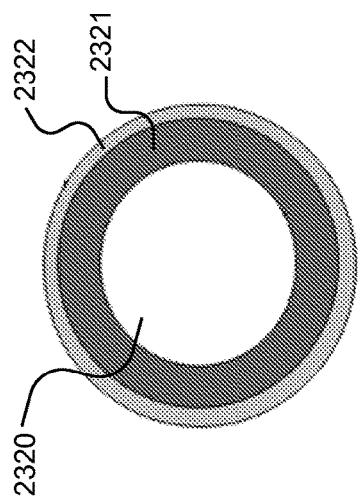

FIGS. 23A-23C show schematic illustrations of exemplary core-shell structures of oxide and/or metal core nanoparticles. FIG. 23A shows oxide or other ceramic semiconductor nanoparticle 2310 coated by an oxygen stoichiometry-maintaining/protecting shell 2311. In some examples, the nanoparticle 2310 can include semiconductor oxide nanoparticles, e.g., containing unsaturated oxide component or oxygen deficiency. The shell 2311 can be configured as a ceramic shell that protects the semiconductor oxide nanoparticle 2310 against further oxidation and/or associated bandgap change.

In some examples, including high operating temperatures of the exemplary SSC layer in CSP systems, even oxide semiconductor nanoparticles or core-shell nanoparticles can coarsen by diffusion and sintering if the time duration at high temperature is long. The disclosed technology can include a core-shell-shell structure for SSCs (e.g., additional diffusion barrier type shell structure). FIG. 23B shows an exemplary core-shell-shell structure for an oxide or other ceramic semiconductor core nanoparticle 2320 with an oxygen stoichiometry-maintaining shell 2321 and an outer higher melting temperature shell 2322 to prevent/minimize nanoparticle agglomeration or coarsening. For example, the outer shell 2322 can be configured as a ceramic shell including materials with melting points of 1500° C. or greater, or in some examples 2500° C. or greater, e.g. including $ZrO_2$, CaO, MgO, $HfO_2$, TaN, or $ZrBr_2$, or a mixture material including two or more of these exemplary materials.

Core-Shell Protected Metallic Nanoparticles

Metal nanoparticles (e.g., such as W, Cr, Mo, Cu, etc.) are excellent sunlight absorbers, e.g., particularly when their particle size is maintained to well below 500 nm, or in some examples less than 200 nm, or in other examples less than 100 nm. However, metallic nanoparticles are easily oxidizable at high temperatures. The disclosed technology includes techniques and structures to protect metallic nanoparticles against oxidation with a tight, conformal and oxidation-resistant ceramic shell. For example, if the thickness of the shell is maintained to be thin, e.g., such as less than 100 nm, or in other examples less than 30 nm, then high optical absorptivity can be obtained. For some of the specific CSP applications, e.g., such as the solar tower CSP, in which the solar concentration factor (the ratio of focused solar light intensity to the one sun intensity) is in the regime of C=500-1000, as compared to the lower concentration factor of C=100 or less for the parabolic trough CSP, the ratio of the IR emission loss to the incoming sunlight intensity is relatively small. In such circumstances, high light absorptivity is much more important than the reduction in black body IR emission loss, and hence the optimization of the light absorption is more desirable. Exemplary metallic nanoparticles of the disclosed technology can be quite efficient light absorber material, as long as they are protected by core-shell structure configuration, as illustrated in FIG. 23C. FIG. 23C shows an exemplary core-shell structure for a metal core nanoparticle 2330 protected by a ceramic shell 2331. In some examples, the metal core nanoparticle 2330 can include W, Cr, Mo, Cu, etc. and configured to be an excellent light absorption particle protected by the ceramic shell 2331 (e.g., such as boride or oxide or borosilicate).

In some examples, the blackbody emission loss can be reduced by introducing smaller nanoparticle size in the spectrally selective coating layer. To efficiently reduce the IR emission loss, e.g., especially when the solar concentration ratio is less than 100, small-sized metal or semiconductor nanoparticles can be employed in the exemplary SSC, e.g., in which the small-sized metal or semiconductor nanoparticles can be configured with the average particle size being less than 500 nm, or in some examples less than 200 nm, or in other examples less than 100 nm. For higher temperature operation of an exemplary concentrating solar power system or other solar thermal energy systems, the maintenance of the optical transparency of the semiconductor particles is important in order to avoid undesirable increased emission. At high temperatures, semiconductor particles may become more conductive with more charge carriers activated, which may lead to the reduction in optical transparency. Larger sized particles, for example 0.5-5 μm size, can interact more easily with the IR wavelength of 2-10 μm which may lead to undesirable free carrier excitation. However, if the semiconductors are made into nano dimension, e.g., smaller than 100 nm, this exemplary small size is less likely to interact with 2-10 μm IR light, and hence much less carrier excitation is anticipated. However, for example, to avoid potential oxidation and handling issues, too small particle size may not be desirable, and therefore in some implementations of the disclosed technology, the particle size can be configured to be larger than 5 nm, or in some examples larger than 20 nm. These exemplary dimensions also apply to the core-shell nanoparticles of the disclosed technology, with similar core size restrictions as mentioned.

Exemplary applications of the disclosed SSC technology are described below.

For example, the disclosed technology can include devices and applications that can be implemented for concentrated solar power type solar energy conversion to steam or electricity, or water heating, home/building heating or other energy conversion approaches.

Figure 24C:
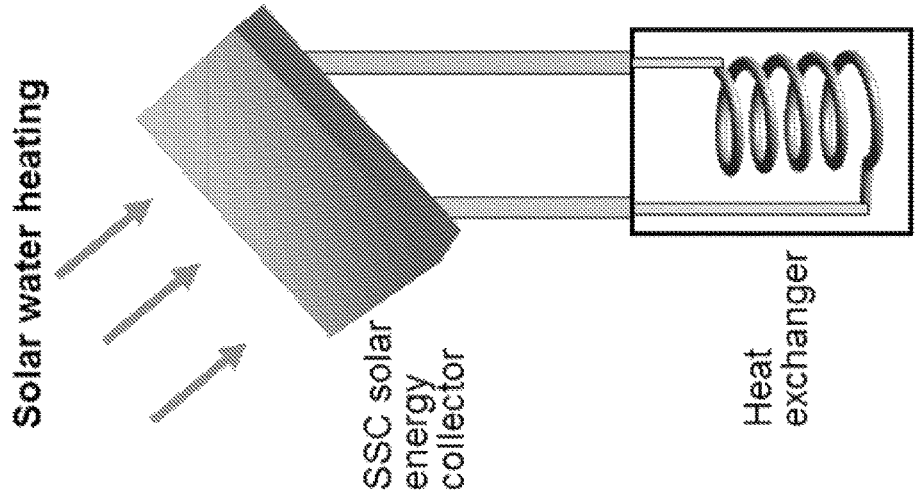
FIGS. 24A-24C show schematic illustrations of exemplary solar thermal energy devices using and efficient solar absorber including the disclosed SSC technology.
Figure 24A:
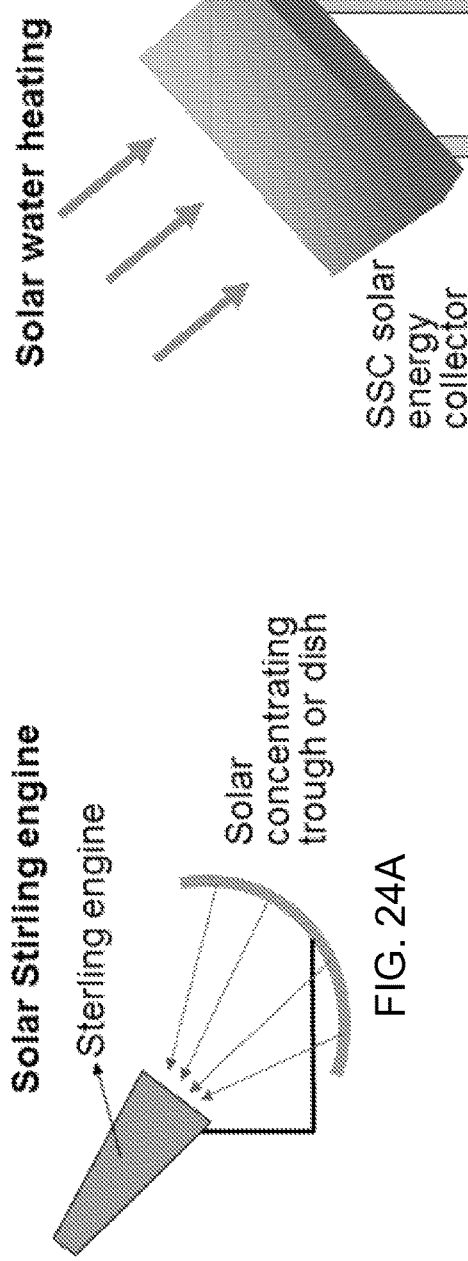
Figure 24B:
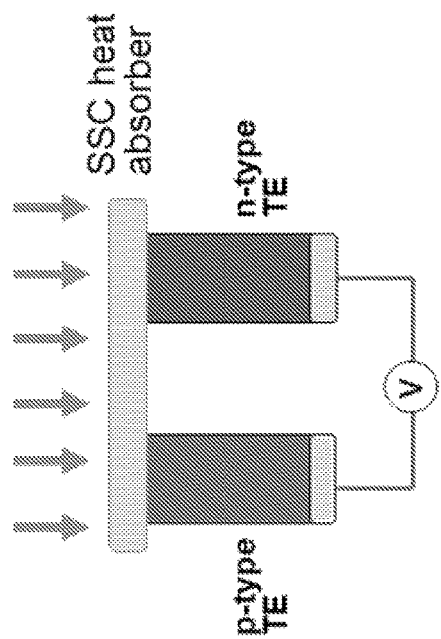

FIGS. 24A-24C show schematic illustrations of exemplary solar thermal energy devices using and efficient solar absorber including the disclosed SSC technology. FIG. 24A shows an exemplary solar Stirling engine including a solar concentrating trough or dish having an exemplary spectrally selective coating of the disclosed technology. FIG. 24B shows an exemplary solar concentrated thermoelectric generator including an exemplary spectrally selective coating of the disclosed technology on the solar energy collector, e.g., coupled to a p-type TE cell and an n-type TE cell electrically coupled to a voltage source or load. FIG. 24C shows an exemplary solar water heater including an exemplary spectrally selective coating of the disclosed technology on the solar energy collector, e.g., coupled between a heat exchanger unit.

Figure 25:
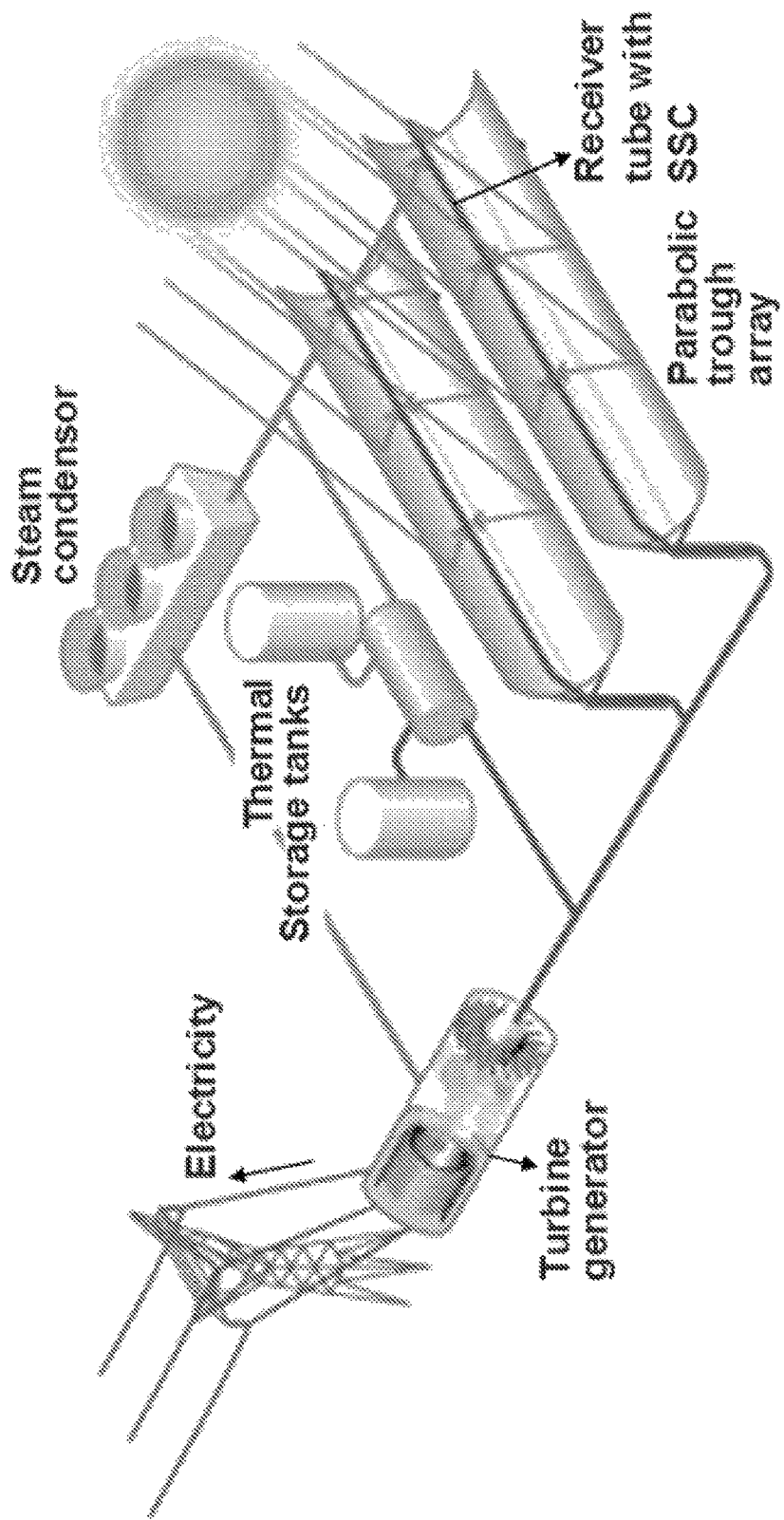
FIG. 25 shows a schematic illustration of an overall concentrating solar power system utilizing the disclosed SSC technology.

FIG. 25 shows a schematic illustration of an overall concentrating solar power system utilizing the disclosed SSC technology to selectively absorb solar energy while rejecting other solar energy. As shown in FIG. 25, sunlight is concentrated by solar concentrators (e.g., parabolic troughs in this exemplary CSP system), and focused onto receiver tubes which are coated with the disclosed SSCs. For example, solar energy absorbed in the receiver tubes via the disclosed SSCs heats up the heat transfer fluid running inside, e.g., which is then used to drive a turbine generator. For example, part of the HTF can also be used to charge the thermal energy storage system, e.g., shown as the storage tanks in FIG. 25. For example, the TES storage tanks can be discharged to provide the energy to run the turbine, e.g., even when there is no sunlight available. The overall system efficiency and hence the cost, depends largely on the operation temperature, which is largely impacted by the performance of the disclosed SSC technology.

FIGS. 26A-26C show three exemplary solar concentrating/collecting systems that can employ the disclosed SSC technology. FIG. 26A shows a solar concentrator system including a parabolic trough, e.g., like that employed in the CSP system of FIG. 25, that can be structured to include an exemplary SSC of the disclosed technology, e.g., configured on solar receivers where the light is concentrated. FIG. 26B shows a solar concentrator system including a solar tower that can be structured to include an exemplary SSC of the disclosed technology, e.g., configured on solar receivers where the light is concentrated. FIG. 26C shows a solar concentrator system including a dish engine that can be structured to include an exemplary SSC of the disclosed technology, e.g., configured on solar receivers where the light is concentrated.

Figures 27A, 27B:
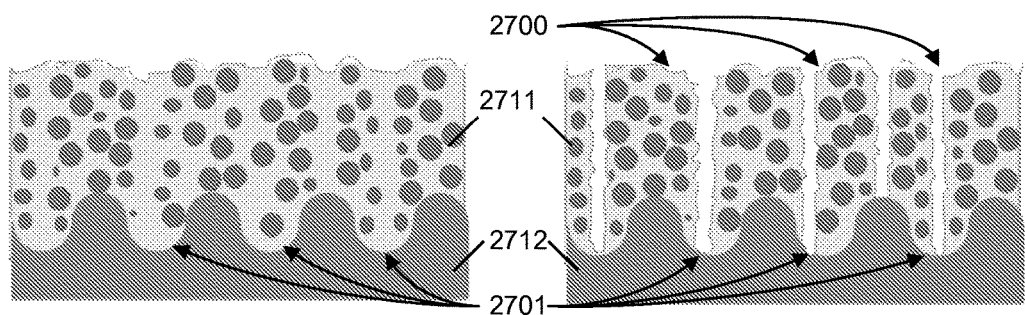
FIGS. 27A and 27B show illustrative diagrams of exemplary SSCs including locking structures.

FIGS. 27A and 27B show illustrative diagrams of exemplary spectrally selective coatings that include locking structures 2701 formed at an interface between an exemplary SSC layer 2711 coated on a substrate 2712 that can provide better bonding between the substrate and the SSC. For example, thermal expansion related stresses can occur between the dielectric material of the SSC layer 2711, e.g., such as a silica based SSC coating and a metal substrate (e.g., such as stainless steel or Ni super alloy tubing). The robustness of interfacial bonding can be improved by the grooved metal surface structure 2701. The SSC layer 2711 coated on a substrate 2712 in FIGS. 27A and 27B can be pre-patterned with groove structures using processes such as wet chemical etching or reactive ion etching. In some examples, the grooves and holes can be etched to have a reentrant geometry for further enhanced adhesion of the spectrally selective coating on the substrate 2712, e.g., a stainless steel or Ni superalloy type metallic substrate. The dimension and spacing of the grooves 2701 (e.g., having linear, circular, elipsoidal, or random geometry) can be made substantially greater than the wavelength of the infrared light. In some implementations, for example, an additive process can be utilized to add protruding grooves, islands, or various geometry structures to enable the lock-in structure to provide stronger and more robust adhesion of the SSC layer 2711 on the substrate 2712. The exemplary SSC film shown in FIG. 27B can also be further enhanced with the formation of vertical cracks 2700.

Figures 28A, 28B:
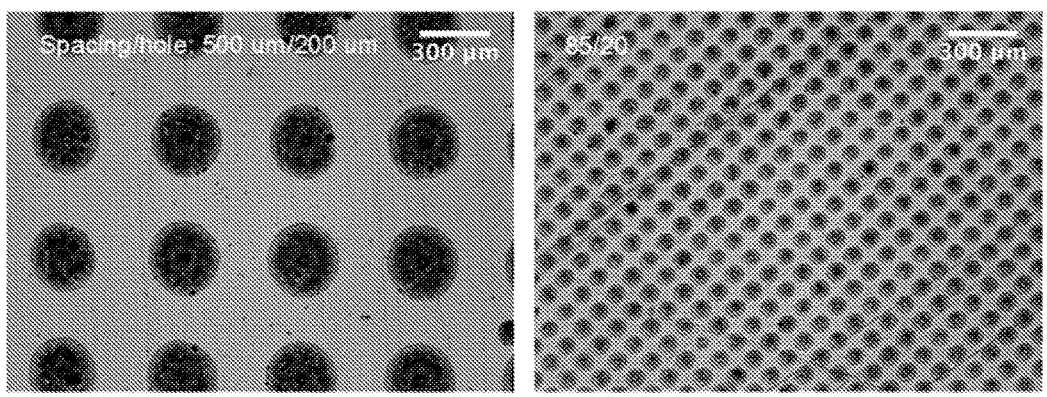
FIGS. 28A and 28B show images of exemplary patterned stainless steel substrates including exemplary locking structures.

FIGS. 28A and 28B show images of the patterned stainless steel substrates for use as locking structures of exemplary SSC layers of the disclosed technology and the substrates. The image of FIG. 28A shows a hole size and spacing configured to be 200 and 500 μm, respectively. The image of FIG. 28B shows a hole size and spacing are 80 and 20 μm, respectively. In some implementations, for example, the hole size and spacing can be configured to range from 1 μm to 1 mm, in some examples from 20 to 500 μm, or in other examples from 50-500 μm.

Figures 29A, 29B:
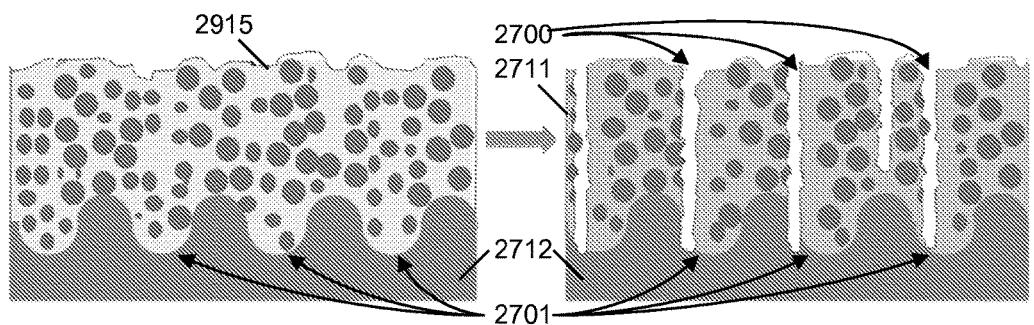
FIGS. 29A and 29B show a process diagram for forming crack structures in exemplary SSC coatings.

FIGS. 29A and 29B show a process diagram for forming crack structures in exemplary SSC coatings. An exemplary process can include a resin or spin-on-glass (SOG) containing exemplary semiconductor nanoparticles that is intentionally diluted with solvent (e.g., Toluene) by at least 10%, or in some examples at least 30%, to form an SSC slurry 2915. The process can include spin-coating the SSC slurry onto the patterned metal substrate 2712 to form the SSC layer 2711 with crack structures 2700. For example, upon curing and baking at elevated temperature, the solvent can be removed and the cracks are automatically formed.

The disclosed SSC technology can be applied in a variety of solar thermal energy applications, among others. For example, depending on the temperature ranges of the heat transfer fluids in the absorbers, exemplary applications of the absorbers can be targeted at various different markets involving solar thermal energy utilization, e.g., solar water heating systems (SWH, low temperature, T<100° C.) and concentrated solar power systems (CSP, high temperature T>400° C.).

Solar water heating systems (SWH): The market is primarily made up of solar installations on the residential, commercial and utility scales for heating applications. In 2008, the world solar thermal market was worth $12.4 billion (~126 $GW_{th}$ capacity, $W_{th}$ is an indication of power using the produced thermal energy). The current and near-future market is predominately located in China and EU (more than 80%), but the U.S. market is growing at a quick pace, setting it up to soon be one of the largest of solar markets. In 2010 alone, 35464 SWH systems were installed in the U.S. This growth has been steady for the last decade, where from 2000-2010, annual installation increased from and 25 to 158 $MW_{th}$.

Concentrated Solar Power (CSP): with very high concentration ratios (>100 times), the heat transfer fluids inside the solar absorbers can be heated up to above 400° C., which can be used to drive turbines or other engines to generate electricity in the CSP system. The CSP capacity reaches an installed capacity of ~1.17 GW as of 2011. About 17 GW of CSP projects are under development worldwide (US: 8 GW; Spain: 4.46 GW; China: 2.5 GW). The IEA publication (ETP 2008) lists CSP as one of the many cost-effective technologies that will lower $CO_2$ emissions. In the ETP BLUE Map scenario, CSP produces 2,200 TWh annually by 2050 from 630 GW capacities. CSP is expected to contribute ~5% of the annual global electricity production in 2050 in this scenario. In the Advanced scenario of CSP Global Outlook 2009, the estimated global CSP capacity by 2050 is 1,500 GW, with an annual output of 7,800 TWh.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of fabricating a spectrally selective coating, comprising:
    producing, by a spark erosion process, nanoparticles that are oxidation resistant to air exposure at a temperature higher than 650° C.;
    forming a nanoparticle-dispersed solution including the nanoparticles contained within a solvent fluid including a dielectric material;
    depositing the nanoparticle-dispersed solution onto a surface of a light absorbing material; and
    drying or curing the nanoparticle-dispersed solution to form a coating having a particular spectral absorptivity and spectral emissivity, the coating formed of a composite material including the nanoparticles embedded in the dielectric material.

2. The method as in claim 1, further comprising producing the nanoparticles by one or more of chemical synthesis, mechanical pulverization, or atomization.

3. The method as in claim 1, wherein the depositing includes implementing at least one of spin coating, drop casting, spray coating, or inkjet printing.

4. The method as in claim 1, wherein the solvent fluid includes at least one of water, an organic fluid, a glass precursor, or a sol-gel precursor.

5. The method as in claim 1, wherein the nanoparticles include a semiconductor material including at least one of silicon (Si), germanium (Ge), SiGe, silicon boride, PbTe, PbSe, PbS, or metal silicides.

6. The method as in claim 1, wherein the nanoparticles include a metallic material including at least one of tungsten (W), chromium (Cr), nickel (Ni), or molybdenum (Mo).

7. The method as in claim 1, wherein the light absorbing material includes a metallic substrate and is capable of reflecting infrared radiation.

8. The method as in claim 1, further comprising:
    forming pillar structures in the coating,
    wherein the coating is structured to include a base layer formed of the composite material and attached to the surface of the light absorbing material, and a surface layer over the base layer having the pillar structures extending outward.

9. The method as in claim 1, wherein the light absorbing material includes a surface of a solar thermal energy collector device.

10. The method as in claim 1, further comprising, prior to forming the nanoparticle-dispersed solution, forming a protective coating over the nanoparticles, the protective coating providing resistance to oxidation of the nanoparticles.

11. The method as in claim 10, wherein the protective coating includes silicon boride.

12. The method as in claim 10, wherein the forming the protective coating includes performing at least one of chemical vapor deposition (CVD), combustion synthesis deposition, physical vapor deposition (PVD), electroless plating, chemical functionalization of the external surface of the nanoparticles, or heat-assisted diffusion by mixing of the nanoparticles and the protective coating material or a precursor of the protective coating material.

* * * * *